(12) United States Patent
Ouchi et al.

(10) Patent No.: US 9,456,429 B2
(45) Date of Patent: Sep. 27, 2016

(54) TERMINAL DEVICE, COMMUNICATION METHOD, AND INTEGRATED CIRCUIT

(71) Applicant: Sharp Kabushiki Kaisha, Osaka-shi, Osaka (JP)

(72) Inventors: Wataru Ouchi, Osaka (JP); Tatsushi Aiba, Osaka (JP); Shoichi Suzuki, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

(21) Appl. No.: 14/889,529

(22) PCT Filed: Apr. 3, 2014

(86) PCT No.: PCT/JP2014/059842
§ 371 (c)(1),
(2) Date: Nov. 6, 2015

(87) PCT Pub. No.: WO2014/181618
PCT Pub. Date: Nov. 13, 2014

(65) Prior Publication Data
US 2016/0150490 A1    May 26, 2016

(30) Foreign Application Priority Data

May 9, 2013   (JP) ................................. 2013-098927
Aug. 5, 2013  (JP) ................................. 2013-162121

(51) Int. Cl.
*H04B 7/00*    (2006.01)
*H04W 52/54*   (2009.01)
*H04W 72/04*   (2009.01)

(52) U.S. Cl.
CPC ......... *H04W 52/54* (2013.01); *H04W 72/0446* (2013.01)

(58) Field of Classification Search
None
See application file for complete search history.

(56) References Cited

U.S. PATENT DOCUMENTS

| 7,307,977 | B1 * | 12/2007 | Eran ................... | H04B 1/7117 370/342 |
| 9,019,922 | B2 * | 4/2015 | Oizumi ................. | H04L 5/001 370/329 |
| 9,042,277 | B2 * | 5/2015 | Chen ................... | H04L 5/001 370/280 |
| 2010/0074207 | A1 * | 3/2010 | Pan ................... | H04B 7/0452 370/329 |
| 2011/0165906 | A1 * | 7/2011 | Papasakellariou .... | H04L 1/1692 455/522 |
| 2012/0236767 | A1 * | 9/2012 | Zhu .................... | H04W 52/325 370/280 |
| 2013/0178221 | A1 * | 7/2013 | Jung ................... | H04L 9/0844 455/450 |
| 2013/0188516 | A1 * | 7/2013 | He ..................... | H04W 28/16 370/254 |

(Continued)

FOREIGN PATENT DOCUMENTS

JP   2013-077926 A   4/2013
WO   2012/119513 A1  9/2012

OTHER PUBLICATIONS

Official Communication issued in International Patent Application No. PCT/JP2014/059842, mailed on Jun. 24, 2014.

(Continued)

*Primary Examiner* — Dominic Rego
(74) *Attorney, Agent, or Firm* — Keating & Bennett, LLP

(57) ABSTRACT

Provided is a terminal device that performs communication with a base station device, the terminal device including a reception unit that receives information relating to a first configuration, information relating to a second configuration, and a downlink control information (DCI) format; and a transmission unit that transmit an uplink signal to the base station device in a case where the uplink signal is scheduled based on the DCI format, and switching between DCI formats that are applied to subframe sets, respectively.

9 Claims, 10 Drawing Sheets

(56) References Cited

U.S. PATENT DOCUMENTS

| | | | |
|---|---|---|---|
| 2013/0190358 A1* | 7/2013 | Boeck | A61K 31/4439 514/338 |
| 2013/0195079 A1* | 8/2013 | Xu | H04W 72/1284 370/335 |
| 2013/0336272 A1 | 12/2013 | Lin et al. | |
| 2014/0161060 A1* | 6/2014 | Nam | H04L 5/0055 370/329 |
| 2014/0226551 A1 | 8/2014 | Ouchi et al. | |
| 2014/0328292 A1* | 11/2014 | Yang | H04L 1/1812 370/329 |

OTHER PUBLICATIONS

NTT DOCOMO, "Issues Regarding Additional Carrier Type in Rel-11 CA", 3GPP TSG RAN WG1 Meeting #67, R1-114071, Nov. 14-18, 2011, pp. 1-5.

"3rd Generation Partnership Project; Technical Specification Group Radio Access Network; Evolved Universal Terrestrial Radio Access (E-UTRA); Physical layer; Measurements (Release 10)," 3GPP TS 36.214 V10.1.0, Mar. 2011, pp. 1-13.

Ericsson et al., "On standardization impact of TDD UL-DL adaptation", 3GPP TSG-RAN WG1 #69, R1-122016, May 21-25, 2012, pp. 1-3.

"3rd Generation Partnership Project; Technical Specification Group Radio Access Network; Evolved Universal Terrestrial Radio Access (E-UTRA); Physical Channels and Modulation (Release 8)," 3GPP TS 36.211 V8.8.0, Sep. 2009, pp. 1-83.

Samsung, "Power control in flexible subframes for eIMTA", 3GPP TSG RAN WG1 #72, R1-130290, Jan. 28-Feb. 1, 2013, pp. 1-3.

* cited by examiner

FIG. 3

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

S Special subframe   U Uplink subframe   D Downlink subframe

FIG. 5

| TPC Command Field | Accumulated $\delta_{PUSCH,c}$ [dB] | Absolute $\delta_{PUSCH,c}$ [dB] |
|---|---|---|
| 0 | -1 | -4 |
| 1 | 0 | -1 |
| 2 | 1 | 1 |
| 3 | 3 | 4 |

(a) FIRST TPC COMMAND FIELD

| TPC Command Field | Accumulated $\delta_{PUSCH,c}$ [dB] | Absolute $\delta_{PUSCH,c}$ [dB] |
|---|---|---|
| 0 | -7 | -10 |
| 1 | -5 | -7 |
| 2 | -3 | -4 |
| 3 | -1 | -1 |
| 4 | 0 | 1 |
| 5 | 1 | 4 |
| 6 | 3 | 7 |
| 7 | 5 | 10 |
| 8 | 7 | 13 |

(b) SECOND TPC COMMAND FIELD

FIG. 6

| TPC Command Field | Accumulated $\delta_{PUSCH,c}$ [dB] | Absolute $\delta_{PUSCH,c}$ [dB] |
|---|---|---|
| 0 | -1 | -4 |
| 1 | 0 | -1 |
| 2 | 1 | 1 |
| 3 | 3 | 4 |

(a) FIRST TPC COMMAND FIELD

| TPC Command Field | Accumulated $\delta_{PUSCH,c}$ [dB] | Absolute $\delta_{PUSCH,c}$ [dB] |
|---|---|---|
| 0 | -3 | -6 |
| 1 | 0 | -1 |
| 2 | 3 | 4 |
| 3 | 6 | 9 |

(b) SECOND TPC COMMAND FIELD

FIG. 8
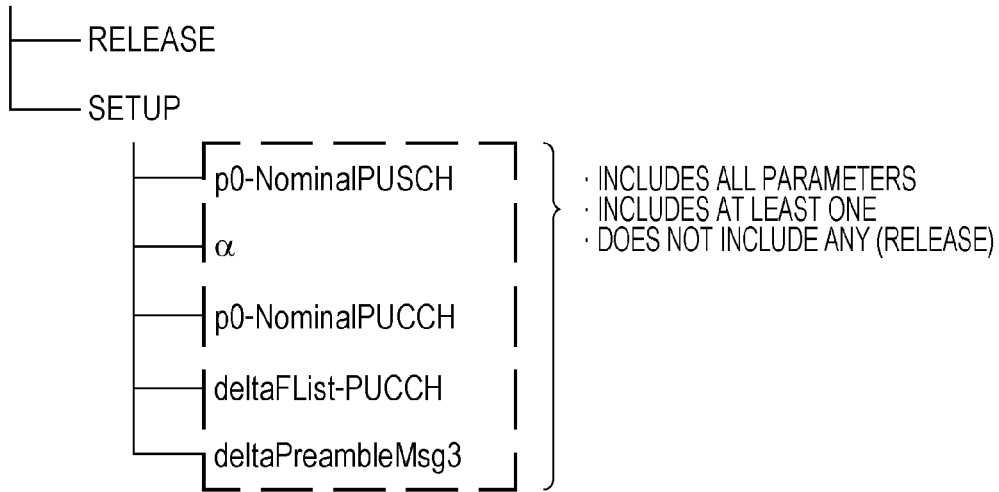
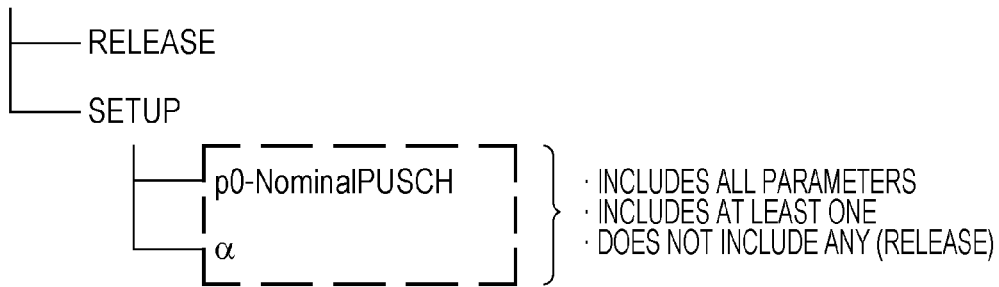

FIG. 9

EXAMPLE OF DEDICATED INFORMATION RELATED TO FIRST UPLINK POWER CONTROL (FOR PRIMARY CELL)
└── PATH LOSS REFERENCE RESOURCE

EXAMPLE OF DEDICATED INFORMATION RELATED TO FIRST UPLINK POWER CONTROL FOR SECONDARY CELL
└── PATH LOSS REFERENCE RESOURCE

EXAMPLE OF DEDICATED INFORMATION RELATED TO SECOND UPLINK POWER CONTROL (FOR PRIMARY CELL)
├── RELEASE
└── SETUP

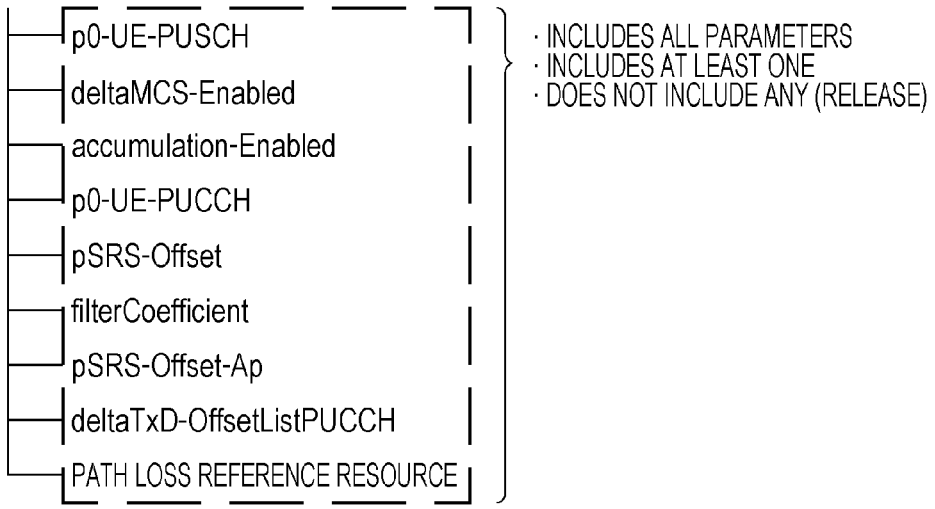

- p0-UE-PUSCH
- deltaMCS-Enabled
- accumulation-Enabled
- p0-UE-PUCCH
- pSRS-Offset
- filterCoefficient
- pSRS-Offset-Ap
- deltaTxD-OffsetListPUCCH
- PATH LOSS REFERENCE RESOURCE · INCLUDES ALL PARAMETERS
· INCLUDES AT LEAST ONE
· DOES NOT INCLUDE ANY (RELEASE)

EXAMPLE OF DEDICATED INFORMATION RELATED TO SECOND UPLINK POWER CONTROL FOR SECONDARY CELL
├── RELEASE
└── SETUP

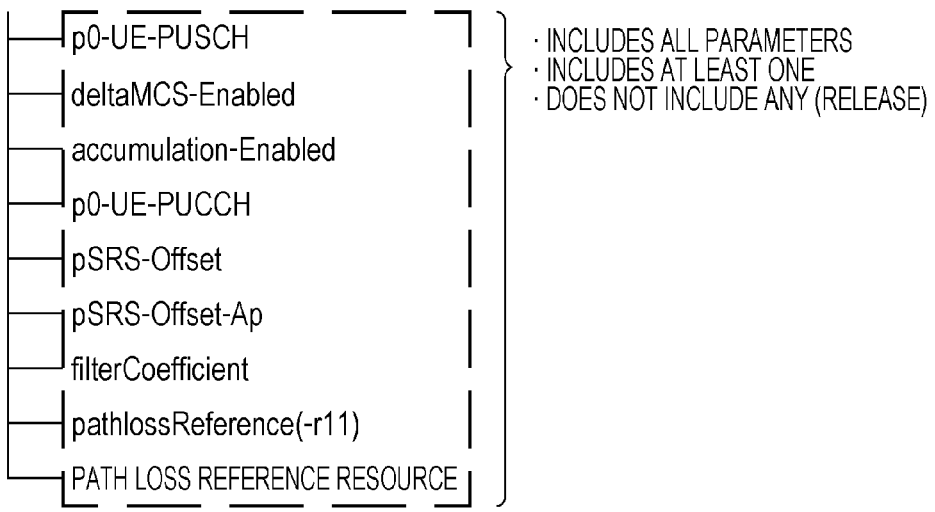

- p0-UE-PUSCH
- deltaMCS-Enabled
- accumulation-Enabled
- p0-UE-PUCCH
- pSRS-Offset
- pSRS-Offset-Ap
- filterCoefficient
- pathlossReference(-r11)
- PATH LOSS REFERENCE RESOURCE · INCLUDES ALL PARAMETERS
· INCLUDES AT LEAST ONE
· DOES NOT INCLUDE ANY (RELEASE)

TERMINAL DEVICE, COMMUNICATION METHOD, AND INTEGRATED CIRCUIT

TECHNICAL FIELD

The present invention relates to a terminal device, a communication method, and an integrated circuit.

BACKGROUND ART

In communication systems approved by Third Generation Partnership Project (3GPP), such as Wideband Code Division Multiple Access (WCDMA) (a registered trademark), Long Term Evolution (LTE), and LTE-Advanced (LTE-A), or in communication systems approved by the Institute of Electrical and Electronics Engineers (IEEE), such as Wireless LAN and Worldwide Interoperability for Microwave Access (WiMAX), a base station device (a cell, a first communication device (a communication device that is different from the terminal device), or an eNodeB) and a terminal device (a mobile terminal, a mobile station device, a second communication device (a communication device that is different from the base station device), or user equipment (UE)) each include multiple transmit and receive antennas, and spatial-multiplex a data signal and realize high-speed data communication by using a Multi Input Multi Output (MIMO) technology.

In the communication system, in order to realize the data communication between the base station device and the terminal device, the base station device needs to perform various control processes on the terminal device. For this reason, the base station device notifies the terminal device of control information using a predetermined resource, and thus performs the data communication for downlink and uplink. For example, the base station device notifies the terminal device of resource allocation information, data signal modulation and coding information, information about the number of spatial multiplexing in the data signal, transmit power control information, and the like, and thus realizes the data communication.

The communication system supports Time Division Duplex (TDD). LTE that employs a TDD scheme is also referred to as TD-LTE or LTE TDD. TDD is a technology that makes downlink and uplink communication possible in a single frequency band (a carrier frequency or a component carrier) by time-division multiplexing an uplink signal and a downlink signal. In LTE, with pre-setting, the downlink and the uplink can be switched on the subframe basis. Moreover, in TDD, a subframe (a downlink subframe, or a subframe reserved for downlink transmission) on which the downlink transmission is possible, a subframe (an uplink subframe, or a subframe reserved for uplink transmission) on which the uplink transmission is possible, and a guard period (GP) are provided, and thus for the downlink transmission and the uplink transmission, a subframe (a special subframe) is defined that is switchable in a time domain (a symbol region). Moreover, in the special subframe, the time domain on which the downlink transmission is possible is referred to as a downlink pilot time slot (DwPTS), and the time domain on which the uplink transmission is possible is referred to as an uplink pilot time slot (UpPTS). For example, in a case where a subframe i is the downlink subframe, the terminal device can receive the downlink signal that is transmitted from the base station device, and in a case where a subframe j that is different from the subframe i is the uplink subframe, the terminal device can transmit the uplink signal from the terminal device to the base station device. Furthermore, in a case where a subframe k that is different from the subframe i or the subframe j is the special subframe, the downlink signal can be received in the time domain DwPTS of the downlink, and the uplink signal can be transmitted in the time domain UpPTS of the uplink (NPL 1). Furthermore, in order to perform communication in compliance with a TDD scheme in LTE or LTE-A, notification is provided with a special information element (TDD UL/DL configuration (TDD uplink-downlink configuration(s)), TDD configuration (tdd-Config or TDDconfig), or UL/DL configuration (uplink-downlink configuration(s))). The terminal device regards a certain subframe as any of the uplink subframe, the downlink subframe, and the special subframe, and can perform transmission and reception processing based on information that is notified. Furthermore, a configuration (lengths of the DwPTS, the UpPTS, and a GP within the special subframe) of the special subframe is defined by multiple patterns, and is managed using a table. The multiple patterns are associated with their respective values (indexes) and the value is notified, and thus the terminal device performs processing of the special subframe based on a pattern that is associated with the value that is notified.

Furthermore, it is considered that according to traffic (an amount of information, an amount of data, or an amount of communication) of the uplink and traffic (an amount of information, an amount of data, or an amount of communication) of the downlink, a traffic adaptive control technology that changes a ratio between an uplink resource and a downlink resource is applied to TD-LTE. For example, it is considered that a ratio between the downlink subframe and the uplink subframe is changed dynamically. As this method, a flexible subframe that is adaptively switched between the downlink subframe and the uplink subframe is considered (NPL 2). The base station device can perform reception of the uplink signal or transmission of the downlink signal on the flexible subframe. Furthermore, as long as the base station device does not instruct the terminal device to transmit the uplink signal on the flexible subframe, the terminal device regards the flexible subframe as the downlink subframe and can perform reception processing. Furthermore, in some cases, TDD in which the ratio between the downlink subframe and the uplink subframe, the subframes for the uplink and the downlink, or the TDD UL/DL (re-) configuration is changed dynamically is referred to as dynamic TDD (DTDD).

The communication system is a cellular communication system in which an area is divided in the cellular pattern into multiple areas, each covered by the base station device. Furthermore, a single base station device may manage multiple cells. Furthermore, a single base station device may manage multiple remote radio heads (RRH). Furthermore, a single base station device may manage multiple local areas. Furthermore, a single base station device may manage multiple heterogeneous networks (HetNets). Furthermore, a single base station device may manage multiple low power base station devices (low power nodes (LPNs)).

In the communication system, the terminal device can measure a reference signal received power (RSRP) based on a cell-specific reference signal (CRS) (NPL 3).

In the communication system, communication may be performed using a carrier (a component carrier) that is defined in LTE and in which one portion of a physical channel or signal is not allocated or mapped. At this point, such a carrier is referred to as a new carrier type (NCT). For example, a cell-specific reference signal, a physical downlink control channel, a synchronization signal (a primary synchronization signal or a secondary synchronization signal) may not be mapped in the new carrier type. Furthermore, it has been considered that a physical channel (a physical discovery channel (PDCH) or a new discovery signal (NDS)) for performing mobility measurement and time/frequency synchronization detection is introduced in a cell for which the new carrier type is set (NPL 4). Moreover, in some cases, the new carrier type is also referred to as an additional carrier type (ACT). Furthermore, in some cases, in contrast to the NCT, a known carrier type is also referred to as a legacy carrier type (LCT).

CITATION LIST

Non Patent Literature

[NPL 1] 3rd Generation Partnership Project Technical Specification Group Radio Access Network; Evolved Universal Terrestrial Radio Access (E-UTRA); Physical Channels and Modulation (Release 8), TS36.211 v8.8.0 (2009 September).
[NPL 2] "On standardization impact of TDD UL-DL adaptation", R1-122016, 3GPP TSG-RAN WG1 Meeting #69, Prague, Czech Republic, 21-25 May 2012.
[NPL 3] 3rd Generation Partnership Project Technical Specification Group Radio Access Network; Evolved Universal Terrestrial Radio Access (E-UTRA); Physical layer; Measurements (Release 10) 30 Mar. 2011, TS36.214 v10.1.0 (2011-03).
[NPL 4] "Issues Regarding Additional Carrier Type in Rel-11 CA", R1-114071, 3GPP TSG-RAN WG1 Meeting #67, San Francisco, USA, 14-18 Nov. 2011.

SUMMARY OF INVENTION

Technical Problem

Transmission timings of various uplink physical channels each are set implicitly or explicitly. In a communication system that performs dynamic time division duplex (DTDD), a subframe that can be switched between an uplink subframe and a downlink subframe is set. For this reason, there occurs a problem that in such a subframe, a signal that is transmitted from each of the base station device and the terminal device causes interference with each other and suitable communication is not performed.

An object of the present invention, which is made in view of the problems described above, is to provide a terminal device, a communication method, and an integrated circuit, in each of which suitable transmit power control is possible.

Solution to Problem

The present invention is made to solve the problems described above and therefore according to an aspect of the present invention, there is provided a terminal device that performs communication with a base station device, the terminal device including: a reception unit that receives information relating to a first configuration, information relating to a second configuration, and a downlink control information (DCI) format; and a transmission unit that transmits an uplink signal to the base station device in a case where the uplink signal is scheduled based on the DCI format, in which, in a case where both of the first configuration and the second configuration are set, the transmission unit sets transmission power for the uplink signal that is transmitted on an uplink subframe (a first subframe) which belongs to a first subframe set, based on a power control adjustment value that is obtained by a transmit power control (TPC) command which is included in a DCI format (a first DCI format) that is used for the scheduling of the uplink signal or a DCI format (a second DCI format) that is used for transfer of the TPC command, and sets the transmission power for the uplink signal that is transmitted on an uplink subframe (a second subframe) which belongs to a second subframe set, based on the power control adjustment value that is obtained by the TPC command which is included in the first DCI format.

Furthermore, according to another aspect of the present invention, there is provided a communication method for use in a terminal device that performs communication with a base station device, the method including: a step of receiving information relating to a first configuration, information relating to a second configuration, and a downlink control information (DCI) format; and a step of transmitting an uplink signal to the base station device in a case where the uplink signal is scheduled based on the DCI format, in which, the step of transmitting the uplink signal includes a step of setting transmission power for the uplink signal that is transmitted on an uplink subframe (a first subframe) which belongs to a first subframe set, based on a transmit power control (TPC) command which is included in a DCI format (a first DCI format) that is used for the scheduling of the uplink signal or a DCI format (a second DCI format) that is used for transfer of the TPC command, and a step of setting the transmission power for the uplink signal that is transmitted on an uplink subframe (a second subframe) which belongs to a second subframe set, based on the TPC command which is included in the first DCI format, in a case where both of the first configuration and the second configuration are set.

Furthermore, according to still another aspect of the present invention, there is provided an integrated circuit that is built in a terminal device that performs communication with a base station device, the circuit causing the terminal device to perform: a function of receiving information relating to a first configuration, information relating to a second configuration, and a downlink control information (DCI) format; and a function of transmitting an uplink signal to the base station device in a case where the uplink signal is scheduled based on the DCI format, in which, the function of transmitting the uplink signal includes a function of setting transmission power for the uplink signal that is transmitted on an uplink subframe (a first subframe) which belongs to a first subframe set, based on a power control adjustment value that is obtained by a transmit power control (TPC) command which is included in a DCI format (a first DCI format) that is used for the scheduling of the uplink signal or a DCI format (a second DCI format) that is used for transfer of the TPC command, and a function of setting the transmission power for the uplink signal that is transmitted on an uplink subframe (a second subframe) which belongs to a second subframe set, based on the power control adjustment value that is obtained by the TPC command which is included in the first DCI format, in a case where both of the first configuration and the second configuration are set.

Advantageous Effects of Invention

According to the present invention, in a communication system in which a base station device and a terminal device communicate with each other, the terminal device performs suitable transmit power control and thus communication efficiency can be improved.

BRIEF DESCRIPTION OF DRAWINGS

FIG. 3 is a diagram illustrating a configuration of a subframe pattern in a TDD UL/DL configuration.

FIG. 5 is a diagram illustrating one example of a TPC command extension.

FIG. 6 is a diagram illustrating another example of the TPC command extension.

FIG. 8 is a diagram illustrating one example of shared information relating to a second uplink power control.

FIG. 9 is diagram illustrating one example of dedicated information relating to the first uplink power control and dedicated information relating to the second uplink power control.

DESCRIPTION OF EMBODIMENTS

Figure 1:
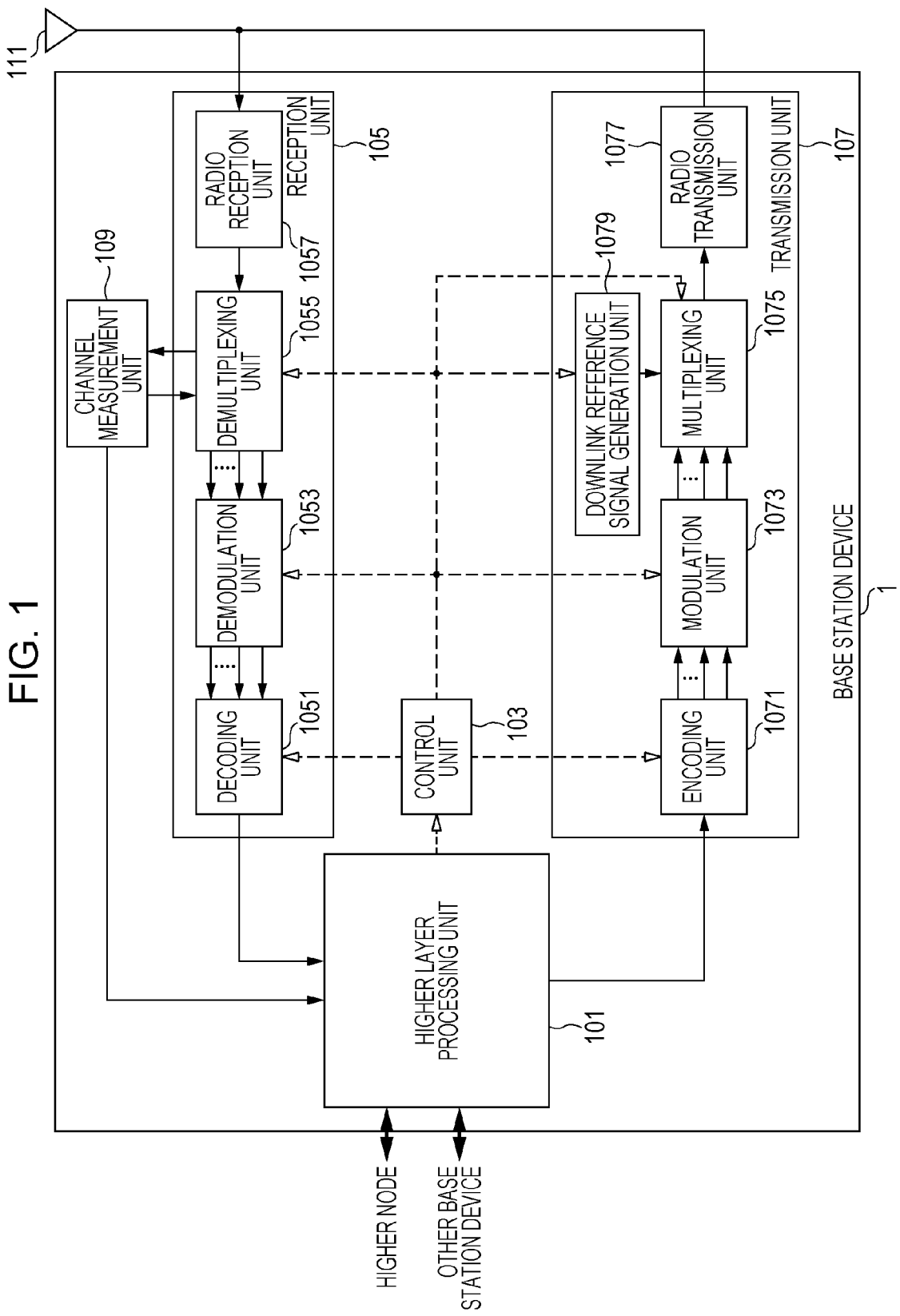
FIG. 1 is a schematic block diagram illustrating a configuration of a base station device 1 according to a first embodiment of the present invention.

A time division duplex (TDD) scheme is applied to a communication system according to the present embodiment. In a case of cell aggregation, the TDD scheme may be applied to all multiple cells. Furthermore, in the case of the cell aggregation, a cell to which the TDD scheme is applied and a cell to which a frequency division duplex (FDD) scheme is applied may be aggregated. In a case where the cell to which the TDD is applied and the cell to which the FDD is applied are aggregated, the present invention can be applied to the cell to which the TDD is applied.

Multiple serving cells that are set includes one primary cell and one or multiple secondary cells. The primary cell is a cell in which an initial connection establishment procedure is performed, a serving cell in which a connection re-establishment procedure is started, or a cell that is prescribed as a primary cell during a handover procedure. At a point of time when an RRC connection is set, or later, the secondary cell may be set.

According to the present embodiment, multiple cells are set for a terminal device 2. A technology in which the terminal device 2 performs communication through multiple cells is referred to as cell aggregation or carrier aggregation. The present invention may be applied to each of the multiple cells that are set for the terminal device 2. Furthermore, the present invention may be applied to some of the multiple cells that are set. A cell that is for the terminal device 2 is also referred to as a serving cell.

According to the present embodiment, "X/Y" includes the meaning of "X or Y". According to the present embodiment, "X/Y" includes the meaning of "X and Y". According to the present embodiment, "X/Y" includes the meaning of "X and/or Y".

Physical Channel

A main physical channel (or a physical signal) that is used in LTE and LTE-A is described. A channel means a medium that is used for signal transmission. The physical channel means a physical medium that is used for signal transmission. There is a likelihood that, in LTE and LTE-A, and in standard releases after LTE and LTE-A, a physical channel will be added from now on or a structure or format type of the physical channel will be changed or added, but even in such a case, the addition and change do not have an effect on a description of each embodiment of the present invention.

In LTE and LTE-A, physical channel scheduling is managed using a radio frame. 1 radio frame is 10 ms, and 1 radio frame is configured from 10 subframes. Moreover, 1 subframe is configured from 2 slots (that is, 1 slot is 0.5 ms). Furthermore, management is performed using a resource block as a minimum unit of scheduling for arranging the physical channel. The resource block is defined by a given frequency region that is configured from a set of multiple subcarriers (for example, 12 subcarriers) along a frequency axis and by a domain that is configured from given transmission time intervals (for example, 1 slot, or 7 symbols).

The physical channel corresponds to a set of resource elements on which information that is output from a higher layer is transmitted. The physical signal is used in a physical layer, does not carry the information that is output from the higher layer. To be more precise, higher layer control information, such as a radio resource control (RRC) message, system information (SI), or the like, is transmitted on the physical channel.

As downlink physical channels, there are a physical downlink shared channel (PDSCH), a physical broadcast channel (PBCH), a physical multicast channel (PMCH), a physical control format indicator channel (PCFICH), a physical downlink control channel (PDCCH), a physical hybrid ARQ indicator channel (PHICH), and an enhanced physical downlink control channel (EPDCCH). Furthermore, as downlink physical signals, there are various reference signals and various synchronization signals. As downlink reference signals, there are a cell-specific reference signal (CRS), a UE-specific reference signal (UERS), and a channel state information reference signal (CSI-RS). As synchronization signals, there are a primary synchronization signal (PSS) and a secondary synchronization signal (SSS).

As uplink physical channels, there are a physical uplink shared channel (PUSCH), a physical uplink control channel (PUCCH), and a physical random access channel (PRACH). Furthermore, as uplink physical signals, there are various reference signals. As uplink reference signals, there are a demodulation reference signal (DMRS) and a sounding reference signal (SRS).

The synchronization signal is configured from three types of primary synchronization signals (PSSs) and a secondary synchronization signal (SSS) that is configured from 31 types of codes which are alternately mapped in a frequency region. 504 types of cell identifiers (a physical layer cell identity (PCI), a physical cell identity, or a physical cell identifier) for identifying base station devices and a frame timing for radio synchronization are indicated by a combination of the primary synchronization signal and the secondary synchronization signal. The terminal device 2 specifies a cell identifier of the synchronization signal that is received through cell search.

The physical broadcast channel (PBCH) is transmitted for the purpose of notifying a control parameter (broadcast information or system information) that is used in a manner that is common to terminal devices 2 within a cell. Furthermore, broadcast information (for example, SIB 1 or one portion of system information) that is not notified on the PBCH is transmitted on the PDSCH through a DL-SCH. As pieces of broadcast information, a cell global identifier (CGI) indicating an identifier of an individual cell, a tracking area identifier (TAI) for managing a waiting area by paging, random access configuration information (a transmission timing timer or the like), common radio resource configuration information (shared radio resource configuration information), and the like are notified.

The downlink reference signals are categorized by their usage into multiple types. For example, a cell-specific reference signal (CRS) is a pilot signal that is transmitted with predetermined power for every cell, and is a downlink reference signal that is periodically repeated in a frequency region and a time domain based on a predetermined rule. The terminal device 2 measures reception quality for every cell by receiving the cell-specific reference signal. Furthermore, the terminal device 2 uses the cell-specific reference signal also as a reference signal for demodulation of the physical downlink control channel that is transmitted at the same antenna port as the cell-specific reference signal, or of the physical downlink shared channel. As a sequence that is used for the cell-specific reference signal, a sequence that is identifiable for every cell is used. This sequence may be generated based on a pseudo random sequence. Furthermore, the sequence may be generated based on a Zadoff-Chu sequence. Furthermore, the sequence may be generated based on a gold sequence.

Furthermore, the downlink reference signal is used for downlink channel change estimation as well. The downlink reference signal that is used for the channel change estimation may be referred to as a channel state information reference signal (CSI-RS) or a CSI reference signal. Furthermore, the CSI reference signal that is not actually signal-transmitted or that is transmitted with zero power may be referred to as a zero power channel state information reference signal (zero power CSI-RS) or a zero power CSI reference signal. Furthermore, the CSI reference signal that is not actually signal-transmitted may be referred to as a non-zero power channel state information reference signal (zero power CSI-RS) or a non-zero power CSI reference signal.

Furthermore, a downlink resource that is used for measuring an interference component may be referred to as a channel state information interference measurement resource (CSI-IMR) or a CSI-IM resource. The terminal device 2 may perform measurement of an interference signal for calculating a CQI value, using the zero power CSI reference signal that is included in the CSI-IM resource. Furthermore, the downlink reference signal that is dedicatedly set for every terminal device 2 is referred to as a UE-specific reference signal (UERS), a dedicated reference signal, a downlink demodulation reference signal (DL DMRS), or the like, and is used for demodulation of a physical downlink control channel or a physical downlink shared channel.

The physical downlink shared channel (PDSCH) is used for transmitting downlink data (DL-SCH). Furthermore, the PDSCH is also used in a case where the system information is transmitted on the DL-SCH. Information on allocation of a radio resource to the physical downlink shared channel is indicated with the physical downlink control channel. Furthermore, the PDSCH is also used for notifying a parameter (an information element or an RRC message) relating to uplink and downlink.

The physical downlink control channel (PDSCH) is transmitted on several OFDM symbols starting from the head of each subframe, and is used for the purpose of instructing the terminal device 2 as to resource allocation information in accordance with scheduling by a base station device 1, or an amount of adjustment for an increase or a decrease in transmission power. The terminal device 2 monitors the physical downlink control channel that is destined for the terminal device 2 itself before transmitting and receiving a layer 3 message (paging, a handover command, an RRC message, or the like), and needs to acquire the resource allocation information that is referred to as an uplink grant at the time of transmission and as a downlink grant (also referred to as a downlink assignment) at the time of reception, from the physical downlink control channel that is destined for the terminal device 2 itself. Moreover, in addition to being transmitted on the OFDM symbol described above, it is also possible that the physical downlink control channel is configured to be transmitted on a region of the resource block that is dedicatedly allocated from the base station device 1 to the terminal device 2. In some cases, the physical downlink control channel that is transmitted on the region of the resource block which is dedicatedly allocated from the base station device 1 to the terminal device 2 is also referred to as an enhanced physical downlink control channel (enhanced PDCCH (EPDCCH)). Furthermore, in some cases, a PDCCH that is transmitted on the OFDM symbol described above is also referred to as a first control channel. Furthermore, in some cases, the EPDCCH is also referred to as a second control channel. Furthermore, in some cases, a resource region to which the PDCCH is allocable is also referred to as a first control channel region and a resource region to which the EPDCCH is allocable is also referred to as a second control channel region. Moreover, the PDCCH that will be described below basically includes the EPDCCH.

The base station device 1 may transmit a PCFICH, a PHICH, a PDCCH, an EPDCCH, a PDSCH, a synchronization signal, and a downlink reference signal, in the DwPTS of a special subframe. Furthermore, the base station device 1 may not transmit a PBCH in the DwPTS of the special subframe.

Furthermore, the terminal device 2 may transmit a PRACH and an SRS in the UpPTS of the special subframe. Furthermore, the terminal device 2 may not transmit a PUCCH, a PUSCH, and a DMRS in the UpPTS of the special subframe.

Furthermore, in a case where a special subframe is configured from only the GP and the UpPTS, the terminal device 2 may transmit a PUCCH and/or a PUSCH and/or a DMRS in the UpPTS of the special subframe.

At this point, the terminal device 2 monitors a set of PDCCH candidates and/or a set of EPDCCH candidates. The PDCCH hereinafter includes the EPDCCH for the sake of brief description. The PDCCH candidate refers to a candidate for the PDCCH that has the likelihood of being allocated or transmitted by the base station device 1. Furthermore, the PDCCH candidate is configured from one or multiple control channel elements (CCEs). Furthermore, the monitoring means that the terminal device 2 attempts to perform decoding on each of the PDCCHs within the set of PDCCH candidates, according to all DCI formats that are monitored.

At this point, the set of PDCCH candidates that the terminal device 2 monitors is also referred to as a search space. The search space is a set of resources that have a likelihood of being used by the base station device 1 for transmission of the PDCCH. In a PDCCH region, a common search space (CSS) and a UE-specific search space (USS) are configured (defined or set).

The CSS is used for transmission of downlink control information to multiple terminal devices 2. That is, the CSS is defined by resources that are common to multiple terminal devices 2. Furthermore, a USS is used for the transmission of the downlink control information to a certain specific terminal device 2. That is, the USS is dedicatedly set for a certain specific terminal device 2. Furthermore, the USS may be shared among multiple terminal devices 2.

The downlink control information (DCI) is transmitted in a specific format (configuration or type) from the base station device 1 to the terminal device 2. The format may be referred to as a DCI format. Moreover, the transmission of the DCI format includes transmitting the DCI in a certain format. In other words, it can be said that the DCI format is a format for transmitting the DCI. Multiple formats are prepared for the DCI formats that are transmitted from the base station device 1 to the terminal device 2 (for example, a DCI format 0/1/1A/1B/1C/1D/2/2A/2B/2C/2D/3/3A/4).

In a case where common DCI (single DCI) is transmitted in a certain DCI format to multiple terminal device 2, the base station device 1 transmits the DCI in a PDCCH (or EPDCCH) CSS, and, in a case where DCI is transmitted dedicatedly in a DCI format to the terminal device 2, transmits the DCI in a PDCCH (or EPDCCH) USS.

As pieces of DCI transmitted in a DCI format, there are resource allocation to the PUSCH or the PDSCH, a modulation coding scheme, a sounding reference signal request (an SRS request), a channel state information request (a CSI request), an indication of initial transmission or re-transmission of a single transport block, a transmit power control command for the PUSCH, a transmit power control command for the PUCCH, a cyclic shift of a UL DMRS and an index of an orthogonal code cover (OCC), and the like. In addition to these, various pieces of DCI are defined by specifications.

A format that is used for uplink transmission control (for example, PUSCH scheduling or the like) may be referred to as an uplink DCI format (for example, a DCI format 0/4) or DCI relating to uplink. A format that is used for downlink reception control (for example, PDSCH scheduling or the like) may be referred to as a downlink DCI format (for example, a DCI format 1/1A/1B/1C/1D/2/2A/2B/2C/2D) or DCI relating to downlink. A format that is used for adjusting transmission power of each of the multiple terminal devices 2 may be referred to as a group triggering DCI format (for example, a DCI format 3/3A).

For example, the DCI format 0 is used for transmitting information relating to resource allocation to the PUSCH that is necessary for performing scheduling of one PUSCH in one serving cell, information relating to a modulation scheme, information relating to transmit power control (TPC) command for the PUSCH, or the like. Furthermore, these pieces of DCI are transmitted on the PDCCH/EPDCCH. The DCI format is said to be configured from at least one piece of DCI.

In the CSS and/or the USS of the PDCCH region, the terminal device 2 monitors the PDCCH and detects the PDCCH that is destined for the terminal device 2 itself.

Furthermore, an RNTI that is allocated by the base station device 1 allocates to the terminal device 2 is employed in the transmission (the transmission on the PDCCH) of the downlink control information. Specifically, a cyclic redundancy check (CRC) parity bit is attached to the DCI format (also possibly to the downlink control information). After being attached, the CRC parity bit is scrambled by the RNTI.

The terminal device 2 attempts to perform the decoding on the DCI format to which the CRC parity bit scrambled by the RNTI is attached, and detects the DCI format that succeeds in the CRC, as the DCI format that is destined for the terminal device 2 itself (which is also called blind decoding). That is, the terminal device 2 attempts to perform the decoding on the PDCCH that is accompanied by the CRC that is scrambled by the RNTI, and detects the PDCCH that succeeds in the CRC, as the PDCCH that is destined for the terminal device 2 itself.

At this point, a cell-radio network temporary identifier (C-RNTI) is included in the RNTI. The C-RNTI is a unique identifier that is used for RRC connection and scheduling identification. The C-RNTI is used for unicast transmission that is dynamically scheduled.

Furthermore, a temporary C-RNTI is included in the RNTI. The temporary C-RNTI is an identifier that is used for a random access procedure. For example, the terminal device 2 may decode only in the CSS the DCI format (for example, the DCI format 0) relating to the uplink to which the CRC scrambled by the temporary C-RNTI is attached. Furthermore, the terminal device 2 may attempt to decode in the CSS and the USS the DCI format (for example, the DCI format 1A) relating to the downlink to which the CRC scrambled by the temporary C-RNTI is attached.

Furthermore, in a case where the DCI is transmitted in the CSS, if the CRC parity bit scrambled with the temporary C-RNTI or the C-RNTI is attached to the DCI (DCI format) and the DCI is transmitted in the USS, the base station device 1 may add the CRC scrambled with the C-RNTI to the DCI (DCI format).

The physical uplink shared channel (PUSCH) is mainly used for transmitting uplink data and uplink control information (UCI). The UCI that is transmitted on the PUSCH includes channel state information (CSI) and/or an ACK/NACK. Furthermore, the CSI that is transmitted on the PUSCH includes aperiodic CSI (A-CSI) and periodic CSI (P-CSI). Furthermore, as is the case with the downlink, the information on allocation of a resource to the physical uplink shared channel is indicated with the physical downlink control channel. Furthermore, the uplink data is transferred on the PUSCH that is scheduled by a dynamic scheduling grant. Furthermore, information (for example, identification information of the terminal device 2, or message 3) of the terminal device 2 itself, which relates to random access, is transmitted on the PUSCH that is scheduled by a random access response grant. Furthermore, parameters that are used for setting transmission power for transmission on the PUSCH may differ according to a type of detected grant. Moreover, control data is transmitted in the form of a channel quality indicator (CQI and/or PMI), a HARQ-ACK, or an RI. To be more precise, the control data is transmitted in the form of uplink control information.

The physical uplink control channel (PUSCH) is used for notifying a reception acknowledgement response (acknowledgement/negative acknowledgement (ACK/NACK)) of the downlink data that is transmitted on the physical downlink shared channel or channel information (channel state information) on the downlink, or for making a scheduling request (SR) that is a request (a radio resource request) for allocation of uplink resource. The channel state information (CSI) includes a channel quality indicator (CQI), a precoding matrix indicator (PMI), a precoding type indicator (PTI), and a rank indicator (RI). In some cases, each indicator is expressed as an indication, but the indicator and the indication have the same application and meaning. Furthermore, a format of the PUCCH may be switched according to the UCI that is transmitted. For example, in a case where the UCI is configured from the HARQ ACK and/or the SR, the UCI may be transmitted on the PUCCH in the format 1/1a/1b/3. Furthermore, in a case where the UCI is configured from the periodic CSIs, the UCI may be transmitted on the PUCCH in the format 2.

As types of CSI reporting, there are periodic CSI reporting by which the channel state information is reported periodically or in a case where an event condition for triggering the CSI reporting is satisfied, and aperiodic CSI reporting by which the channel state information is reported in a case where a report is requested with the CSI request that is included in the DCI format. The periodic CSI reporting is performed on the PUCCH or the PUSCH, and the aperiodic CSI reporting is performed on the PUSCH. The terminal device 2, when given an instruction based on information (CSI request) included in the DCI format, can transmit the CSI that is not accompanied by the uplink data, on the PUSCH.

The uplink reference signal includes the demodulation reference signal (DMRS) that is used by the base station device 1 for demodulating the physical uplink control channel (PUSCH) and/or the physical uplink shared channel (PUSCH), and the sounding reference signal (SRS) that is used by the base station device 1 mainly for estimating an uplink channel state. Furthermore, as the sounding reference signals, there are a periodic sounding reference signal (periodic SRS (P-SRS)) that is set in such a manner that the periodic sounding reference signal is transmitted periodically by the higher layer, and an aperiodic sounding reference signal (aperiodic SRS (A-SRS)) of which transmission is requested by the SRS request that is included in a downlink control information format. In some cases, the uplink reference signal is also referred to as an uplink pilot signal or an uplink pilot channel.

Furthermore, in some cases, the periodic sounding reference signal is also referred to as a periodic sounding reference signal or a trigger type 0 sounding reference signal (trigger type 0 SRS). Furthermore, in some cases, the aperiodic sounding reference signal is also referred to as an aperiodic sounding reference signal or a trigger type 1 sounding reference signal (trigger type 1 SRS).

Moreover, in cooperative communication, the aperiodic sounding reference signal may be divided into a signal (for example, which, in some cases, is referred to as a trigger type 1a SRS) that is a specialized signal for uplink channel estimation, in cooperative communication, and a signal (for example, which, in some cases, is referred to as a trigger type 1b SRS) that is used for causing the base station device 1 to measure the channel state (the CSI, the CQI, the PMI, or the RI) using channel reciprocity, in TDD. Moreover, the DMRS is set to correspond to each of the PUSCH and the PUCCH. Furthermore, the DMRS is time-multiplexed onto the same subframe as with the PUSCH or the PUCCH.

Furthermore, in the case of the PUSCH and in the case of the PUCCH, the DMRS may differ in terms of a time multiplexing method. For example, while the DMRS for the PUSCH is allocated within 1 slot that is configured from 7 symbols, using only 1 symbol, the DMRS for the PUCCH is mapped within 1 symbol that is configured from 7 symbols, using 3 symbols.

Furthermore, for the sounding reference signal, a subframe on which the sounding reference signal is transmitted is determined in accordance with information relating to a transmission subframe, which is included in a configuration of a sounding reference signal, and which is notified by higher layer signaling. As pieces of information relating to the transmission subframe, there are information (shared information) that is set to be cell-specific, and information (dedicated information) that is set to be UE-specific. The information that is set to be cell-specific includes information indicating a subframe on which the sounding reference signal that is shared among all terminal devices 2 within a cell is transmitted. Furthermore, the information that is set to be UE-specific includes information indicating a subframe offset and periodicity that are a subset of subframes which are set to be cell-specific. With these pieces of information, the terminal device 2 can determine a subframe (which, in some cases, is referred to as an SRS subframe or an SRS transmission subframe) on which the sounding reference signal can be transmitted. Furthermore, in the subframe on which the sounding reference signal that is set to be cell-specific is transmitted, in a case where the physical uplink shared channel is transmitted, the terminal device 2 can puncture as many time resources for the physical uplink shared channel as symbols on which the sounding reference signal is transmitted, and can transmit the physical uplink shared channel on the time sources. By doing this, a collision can be avoided between the transmission of the physical uplink shared channel and the transmission of the sounding reference signal between the terminal devices 2. Performance degradation can be prevented from the point of view of the terminal device 2 that transmits the physical uplink shared channel. Furthermore, from the point of view of the terminal device 2 that transmits the sounding reference signal, precision of channel estimation can be secured. At this point, the information that is set to be UE-specific may be independently with the periodic sounding reference signal and or the aperiodic sounding reference signal. In a case where various parameters are set by the higher layer signaling, a first uplink reference signal is periodically transmitted in accordance with the transmission subframe that is set. Furthermore, in a case where a transmission request is made, a second uplink reference signal is a periodically transmitted by a field (an SRS request) relating to a request for transmission of the second uplink reference signal, which is included in a downlink control information format. In a case where the SRS request that is included in a certain downlink control information format indicates a positive or positive-equivalent index (value), the terminal device 2 transmits the A-SRS on a predetermined transmission subframe. Furthermore, in a case where the detected SRS request indicates a negative or negative-equivalent index (value), the terminal device 2 does not transmit the A-SRS on a predetermined subframe. Moreover, information (shared parameter or shared information) that is set to be cell-specific is notified using system information or a dedicated control channel (DCCH). Furthermore, information (a dedicated parameter, an individual parameter, dedicated information, or individual information) that is set to be UE-specific is notified using a common control channel (CCCH). These pieces of information may be notified with the RRC message. The RRC message may be notified by the higher layer.

The physical random access channel (PRACH) is a channel that is used for notifying a preamble sequence and has a guard time. The preamble sequence is configured in such a manner that 64 types of sequences are prepared to express G-bit information. The physical random access channel is used as a means by which the terminal device 2 has access to the base station device 1. The terminal device 2 uses the physical random access channel in order to make a request to the base station device 1 for the radio resource when the physical uplink control channel is not set, in response to the scheduling request (SR), or to make a request to the base station device 1 for transmission timing alignment information (also referred to as timing advance (TA)) necessary to adjust uplink transmission timing to a reception timing window of the base station device.

Specifically, the terminal device 2 transmits the preamble sequence using the radio resource for the physical random access channel that is set by the base station device 1. The terminal device 2 that receives the transmission timing alignment information sets the transmission timing timer that counts the effective time of the transmission timing alignment information that is commonly set by the broadcast information (or is dedicatedly set with the layer 3 message), and manages an uplink state as a transmission timing alignment state during the effective time of the transmission timing timer (while the counting is in progress) and as a transmission timing non-alignment state (a state where the transmission timing is not aligned) during the non-effective time (after the transmission timing timer expires). The layer 3 message is a control-plane (C-plane) message that is exchanged with a radio resource control (RRC) layer between the terminal device 2 and the base station device 1, and is used as a message that has the same meaning as RRC signaling or the RRC message. Furthermore, in some cases, the RRC signaling is also referred to as the higher layer signaling or dedicated signaling.

Random access procedures include two random access procedures. One is a contention-based random access procedure and the other is a non-contention-based random access procedure. The contention-based random access procedure is a random access procedure in which there is a likelihood that a collision will occur between multiple terminal devices 2.

Furthermore, the non-contention-based random access procedure is a random access procedure in which a collision does not occur between multiple terminal devices 2.

The non-contention-based random access procedure is made up of 3 steps, and random access preamble assignment is notified, by the dedicated signaling for the downlink, from the base station device 1 to the terminal device 2. At this time, with the random access preamble assignment, the base station device 1 allocates a random access preamble for non-contention to the terminal device 2, and the random access preamble assignment is transmitted by a source base station device (source eNB) for handover, and is signaled by the handover command that is generated by a target base station device (target eNB) or, in a case of a downlink data arrival, is signaled by the PDCCH.

The terminal device 2 that receives the random access preamble assignment transmits the random access preamble (message 1) on the RACH in the uplink. At this time, the terminal device 2 transmits the random access preamble for non-contention that is allocated.

The base station device 1 that receives the random access preamble transmits a random access response to the terminal device 2 on the downlink data (downlink shared channel (DL-SCH)). Furthermore, information that is transmitted with the random access response includes an initial uplink grant (a random access response grant) for and timing alignment information for handover, timing alignment information for downlink data arrival, and a random access preamble identifier. In some cases, the downlink data is also referred to as downlink shared channel data (DL-SCH data).

At this point, the non-contention-based random access procedure is applied to the handover, the downlink data arrival, and positioning. The contention-based random access procedure is applied to initial access from RRC_IDLE, RRC connection re-establishment, the handover, the downlink data arrival, and an uplink data arrival.

The random access procedure according to the present invention is the contention-based random access procedure. An example of the contention-based random access procedure is described.

The terminal device 2 acquires system information block type 2 (SIB 2) that is transmitted by the base station device 1. SIB 2 is a setting (common information) that is common to all terminal devices 2 (or multiple terminal devices 2) within a cell. For example, the common setting includes a setting of the PRACH.

The terminal device 2 randomly selects a number of the random access preamble. Furthermore, the terminal device 2 transmits a random access preamble (message 1) of which a number is selected, to the base station device 1 using the PRACH. The base station device 1 estimates uplink transmission timing using the random access preamble.

The base station device 1 transmits a random access response (message 2) using the PDSCH. The random access response includes multiple pieces of information for the random access preamble that is detected by the base station device 1. For example, the pieces of information include a number of the random access preamble, the temporary C-RNTI, a timing advance command (TA command), and the random access response grant.

The terminal device 2 transmits (initially transmits) the uplink data (message 3) on the PUSCH that is scheduled using the random access response grant. The uplink data includes an identifier (information indicating InitialUE-Identity or the C-RNTI) for identifying the terminal device 2.

In a case where the base station device 1 fails to decode the uplink data, the base station device 1 gives an instruction for re-transmission of the uplink data using the DCI format to which the CRC parity bit scrambled by the temporary C-RNTI is attached. The terminal device 2, when instructed by the DCI format to re-transmit the uplink data, re-transmits the same uplink data on the PUSCH that is scheduled using the DCI format to which the CRC parity bit scrambled by the temporary C-RNTI is attached.

Furthermore, in a case where the base station device 1 fails to decode the uplink data, the base station device 1 can give an instruction for re-transmission of the uplink data using the PHICH (NACK). The terminal device 2, when is instructed by the NACK to re-transmit the uplink data, re-transmits the same uplink data on the PUSCH.

In a case where the base station device 1 succeeds in decoding the uplink data, the base station device 1 can know which of the terminal devices 2 performs transmission of the random access preamble and the uplink data, by acquiring the uplink data. That is, before succeeding in decoding the uplink data, the base station device 1 cannot know which of the terminal devices 2 performs the transmission of the random access preamble and the uplink data.

In a case where message 3 including InitialUE-Identity is received, the base station device 1 transmits a contention resolution identifier (a contention resolution identity) (message 4) that is generated based on InitialUE-Identity that is received, to the terminal device 2, using the PDSCH. In a case where the received contention resolution identifier and InitialUE-Identity are matched to each other, the terminal device 2 (1) regards contention resolution of the random access preamble as being successful, (2) sets a value of the temporary C-RNTI to the C-RNTI, (3) discards the temporary C-RNTI, and (4) regards the random access procedure as being correctly completed.

Furthermore, in a case where message 3 is received that includes information indicating the C-RNTI, the base station device 1 transmits to the terminal device 2 the DCI format (message 4) to which the CRC parity bit scrambled by the received C-RNTI is attached. In a case where the DCI format to which the CRC parity bit scrambled by the C-RNTI is attached is decoded, the terminal device 2 (1) regards the contention resolution of the random access preamble as being successful, (2) discards the temporary C-RNTI, and (3) regards the random access procedure as being correctly completed.

That is, the base station device 1 schedules the PUSCH, using the random access response grant, as part of the contention-based random access procedure.

The terminal device 2 transmits the uplink data (message 3) on the PUSCH that is scheduled using the random access response grant. That is, the terminal device 2 performs transmission on the PUSCH that corresponds to the random access response grant, as part of the contention-based random access procedure.

Furthermore, the base station device 1 schedules the PUSCH, using the DCI format to which the CRC scrambled by the temporary C-RNTI is attached, as part of the contention-based random access procedure. Furthermore, the base station device 1 schedules the transmission on the PUSCH or gives an instruction for the transmission on the PUSCH, using the PHICH (the NACK), as part of the contention-based random access procedure.

The terminal device 2 transmits (re-transmits) the uplink data (message 3) on the PUSCH that is scheduled using the DCI format to which the CRC scrambled by the temporary C-RNTI is added. Furthermore, the terminal device 2 transmits (re-transmits) the uplink data (message 3) on the PUSCH that is scheduled, according to the reception of the PHICH. That is, the terminal device 2 performs the transmission on the PUSCH that corresponds to re-transmission of the same uplink data (a transport block), as part of the contention-based random access procedure.

A logical channel will be described. The logical channel is used for transferring an RRC message or an information element. Furthermore, the logical channel is transmitted on the physical channel through a transport channel.

A broadcast control channel (BCCH) is a logical channel that is used for broadcasting system control information. For example, system information or information that is necessary for initial access is transmitted using this channel. A master information block (MIB) or system information block type 1 (SIB 1) is transferred using this logical channel.

The common control channel (CCCH) is a logical channel that is used for transmitting control information between the terminal device that does not have the RRC connection to a network and the network. For example, UE-specific control information or configuration information is transmitted using this logical channel.

The dedicated control channel (DCCH) is a logical channel that is used for transmitting dedicated control information in both directions between the terminal device that has the RRC connection and the network. For example, cell-specific re-configuration information is transmitted using this logical channel.

In some cases, signaling that uses the CCCH or the DCCH is collectively referred to as the RRC signaling.

As pieces of information relating to uplink power control, there are information as broadcast information, information that is notified as information (shared information) which is shared among the terminal devices 2 within the same cell, and information that is notified as UE-specific dedicated information. The terminal device 2 sets transmission power based on only information that is notified as the broadcast information, or based on information that is notified as the broadcast information/shared information, and on information that is notified as the dedicated information.

Radio resource control configuration shared information may be notified as the broadcast information (or the system information). Furthermore, the radio resource control configuration shared information may be notified as the dedicated information (mobility control information).

Radio resource configurations include a random access channel (RACH) configuration, a broadcast control channel (BCCH) configuration, a paging control channel (PCCH) configuration, a physical random access channel (PRACH) configuration, a physical downlink shared channel (PDSCH) configuration, a physical uplink shared channel (PUSCH) configuration, a physical uplink control channel (PUCCH) configuration, a sounding reference signal (SRS) configuration, a configuration relating to the uplink power control, and a configuration relating to uplink cyclic prefix length, and the like. To be more precise, the radio resource configuration is set to notify a parameter that is used for generating the physical channel/physical signal. In a case where information is notified as the broadcast information, and in a case where information is notified as re-configuration information, parameters (information elements) that are notified may be different from each other.

Each of the information elements, necessary for setting parameters relating to various physical channels/physical signals (the PRACH, the PUCCH, the PUSCH, the SRS, the UL DMRS, the CRS, the CSI-RS, the PDCCH, the PDSCH, the PSS/SSS, the DL DMRS, the PBCH, the PMCH, and the like), are configured from shared configuration information that is shared among the terminal devices 2 within the same cell and dedicated configuration information that is set for every terminal device 2. The shared configuration information may be transmitted with the system information. Furthermore, the shared configuration information may be transmitted as the dedicated information in a case where re-setting is performed. This setting includes setting of a parameter. The parameter setting includes setting of a parameter value. Furthermore, in a case where a parameter is managed using a table, the parameter setting includes setting of an index value.

Information relating to a parameter for the physical channel described above is transmitted to the terminal device 2 using the RRC message. To be more precise, based on the received RRC message, the terminal device 2 sets resource allocation or transmission power for each physical channel. As the RRC messages, there are a message relating to a broadcast channel, a message relating to a multi-casting channel, a message relating to a paging channel, a message relating to each channel for the downlink, a message relating to each channel for the uplink, and the like. Each RRC message may be configured to include information elements (IEs). Furthermore, the information element may include information that is equivalent to a parameter. Moreover, in some cases, the RRC message is also referred to as a message. Furthermore, a message class is a set of one or more messages. The message may include the information element. As the information elements, there are an information element relating to the radio resource control, an information element relating to security control, an information element relating to mobility control, an information element relating to measurement, an information element relating to a multimedia broadcast multicast service (MBMS), and the like. Furthermore, the information element may include a lower-level information element. The information element may be set as a parameter. Furthermore, the information element may be defined as control information indicating one or more parameters.

The information element (IE) is used for stipulating (designating or setting) a parameter for various channels/signals/pieces of information by the system information (SI) or the dedicated signaling. Furthermore, a certain information element includes one or more fields. The information element may be configured from one or more information elements. Moreover, in some cases, the field that is included in the information element is also referred to as a parameter. To be more precise, the information element may include one or more types of parameters (one or more parameters). Furthermore, the terminal device 2 performs radio resource allocation control, uplink power control, transmission control, and the like based on various parameters. Furthermore, the system information may be defined as the information element.

The information element may be set to be in the field that constitutes the information element. Furthermore, a parameter may be set to be in the field that constitutes the information element.

The RRC message includes one or more information elements. Furthermore, the RRC message for which multiple RRC messages are set is referred to as the message class.

As parameters relating to uplink transmit power control that is notified to the terminal device 2 using the system information, there are a nominal power for the PUSCH, a nominal power for the PUCCH, a channel loss compensation coefficient $\alpha$, a list of power offsets that are set for every PUCCH format, and a power offset for the preamble and message 3. Additionally, as parameters relating to the random access channel, which is notified to the terminal device 2 using the system information, there are a parameter relating to the preamble, a parameter relating to the transmit power control for the random access channel, and a parameter relating to the transmission control for the random access preamble. These parameters are used at the time of the initial access, or when a re-connection/re-establishment is made after a radio link failure (RLF) occurs.

Information that is used for setting the transmission power may be notified as the broadcast information to the terminal device 2. Furthermore, the information that is used for setting the transmission power may be notified as the shared information to the terminal device 2. Furthermore, the information that is used for setting the transmission power may be notified as the dedicated information (the individual information) to the terminal device 2.

Basic Mode of a First Embodiment

A basic mode of a first embodiment of the present invention will be described below. A communication system according to the basic mode of the first embodiment includes a primary base station device (also referred to as a macro base station device, a first base station device, a first communication device, a serving base station device, an anchor base station device, a first access point, a first point, a first transmission point, a first reception point, a macro cell, a first cell, and a primary cell) as a base station device 1 (hereinafter also referred to as an access point, a point, a transmission point, a reception point, a cell, a serving cell, a transmission device, a reception device, a transmission station, a reception station, a transmit antenna group, a transmit antenna port group, a receive antenna group, a receive antenna port group, a communication device, a communication terminal, and an eNodeB). Moreover, the communication system according to the first embodiment may include a secondary base station device (also referred to as a remote radio head (RRH)), a remote antenna, a forward-extending antenna, a distributed antenna, a second access point, a second point, a second transmission point, a second reception point, a reference point, a low power base station device (a low power node (LPN), a macro base station device, a pico base station device, a femto base station device, a small base station device, a local area base station device, a phantom base station device, a home (indoor) base station device (a home eNodeB, a home NodeB, a HeNB, or a HNB), a second base station device, a second communication device, a cooperative base station device group, a cooperative base station device set, a cooperative base station device, a micro cell, a pico cell, a femto cell, a small cell, a phantom cell, a local area, a second cell, and a secondary cell). Furthermore, the communication system according to the first embodiment includes a terminal device 2 (hereinafter also referred to as a mobile station, a mobile station device, a mobile terminal, a reception device, a transmission device, a reception terminal, a transmission terminal, a third communication device, a receive antenna group, a receive antenna port group, a transmit antenna group, a transmit antenna port group, a user device, and user equipment (UE)). Here, the secondary base station device may be described as multiple secondary base station devices. For example, the master base station device and the secondary base station device may perform communication with the terminal device using a heterogeneous network arrangement, with some or all portions of a coverage of the secondary base station device being included in a coverage of the master base station device.

Furthermore, the communication system according to the basic mode of the first embodiment is configured from the base station device 1 and the terminal device 2. A single base station device 1 may manage one or more terminal devices 2. Furthermore, a single base station device 1 may manage one or more cells (the serving cell, the primary cell, the secondary cell, the femto cell, the pico cell, the small cell, and the phantom cell). Furthermore, a single base station device 1 may manage one or more frequency bands (a component carrier and a carrier frequency). Furthermore, a single base station device 1 may manage one or more low power base station devices (low power nodes (LPNs)). Furthermore, a single base station device 1 may manage one or more home (indoor) base station devices (home eNodeBs (HeNBs)). Furthermore, a single base station device 1 may manage one or more access points. The base station devices 1 may be connected to one another in a wired manner (an optical fiber, a copper wire, or a coaxial cable), or a wireless manner (an X2 interface or an X3 interface). Furthermore, the multiple base station devices may be managed with a network. Furthermore, a single base station device 1 may one or more relay station devices (relays).

Furthermore, the communication system according to the basic mode of the first embodiment may realize the coordination communication (coordination multiple points (CoMP)) with multiple base station devices, low power base station devices, or home base station devices. To be more precise, the communication system according to the basic mode of the first embodiment may perform dynamic point selection (DPS) that dynamically switches among points (transmission points and/or reception points) through which communication with the terminal device 2 is performed. Furthermore, the communication system according to the basic mode of the first embodiment may perform coordinated scheduling (CS) or coordinated beamforming (CB). Furthermore, the communication system according to the basic mode of the first embodiment may perform joint transmission (JT) or joint reception (JR).

Furthermore, multiple low power base station devices or small cells, which are arranged adjacent to one another, may be clustered (clustering or grouping). The multiple low power base station devices that are clustered may notify the same configuration information. Furthermore, in some cases, areas (coverage) of the small cells that are clustered are referred to a local area.

In downlink transmission, in some cases, the base station device 1 is also referred to as a transmission point (TP). Furthermore, in some cases, in uplink transmission, the base station device 1 is also referred to as a reception point (RP). Furthermore, a downlink transmission point and an uplink reception point are path loss reference points (reference points) for measuring downlink path loss. Furthermore, the reference point for measuring the path loss may be set independently of the transmission point or the reception point.

Furthermore, the small cell, the phantom cell, or the local area cell may be set as a third cell. Furthermore, the small cell, the phantom cell, or the local area cell may be re-set as the primary cell. Furthermore, the small cell, the phantom cell, or the local area cell may be re-set as the secondary cell. The small cell, the phantom cell, or the local area cell may be re-set as the serving cell. Furthermore, the small cell, the phantom cell, or the local area cell may be included in the serving cell.

The base station device 1 that can constitute the small cell may perform discrete reception (DRX) or discrete transmission (DTX) whenever necessary. Furthermore, the base station device 1 that can constitute the small cell may intermittently perform powering-on or powering-off.

In some cases, an independent identifier (identity (ID)) is set for the base station device 1 that constitutes the macro cell and the base station device 1 that constitutes the small cell. To be more precise, in some cases, the identifiers of the macro cell and the small cell are set independently. For example, in a case where the cell-specific reference signals (CRSs) are transmitted from the macro cell and the small cell, respectively, although the transmission frequency band and the radio resources are the same, in some cases, the cell-specific reference signals are scrambled with different identifiers. The cell-specific reference signal to the macro cell may be scrambled with a physical layer cell ID (a physical layer cell identity (PCI)), and the cell-specific reference signal to the small cell may be scramble with a virtual cell ID (a virtual cell identity (VCI)). The scrambling may be performed with the physical layer cell ID (the physical layer cell identity (PCI)) in the macro cell, and may be performed with a global cell ID (a global cell identity (GCI)) in the small cell. The scrambling may be performed with a first physical layer cell ID in the macro cell, and maybe performed with a second physical layer cell ID in the small cell. The scrambling may be performed with a first virtual cell ID in the macro cell, and may be performed with a second virtual cell ID in the small cell. At this point, the virtual cell ID may be an ID that is set for the physical channel/physical signal. Furthermore, the virtual cell ID may be an ID that is set independently of the physical layer cell ID. Furthermore, the virtual cell ID may be an ID that is used for scrambling.

Furthermore, one portion of the physical channel or of the physical signal may be transmitted in the small cell, the serving cell that is set as the small cell, or the component carrier that corresponds to the small cell. For example, the cell-specific reference signal (CRS) or the physical downlink control channel (PDCCH) may not be transmitted. Furthermore, a new physical channel/physical signal may be transmitted in the small cell, the serving cell that is set as the small cell, or the component carrier that corresponds to the small cell.

According to the basic mode of the first embodiment, the base station device 1 transmits information relating to a first configuration and/or information relating to a second configuration to the terminal device 2. In a case where the information relating to the first configuration or the information relating to the second configuration is received (that is, either of the first configuration and the second configuration is set), the terminal device 2 sets the transmission power based on a parameter relating to first uplink power control. In a case where the information relating to the first configuration and the information relating to the second configuration are received from the base station device 1 (that is, the first configuration and the second configuration are set), the terminal device 2 sets the transmission power based on the parameter relating to the first uplink power control, or a parameter relating to second uplink power control, according to a situation. For example, in some cases, the terminal device 2 needs to receive information on the parameter relating to the second uplink power control in order to set the transmission power based on the parameter relating to the second uplink power control. Furthermore, in a case where it is determined that it is possible to set the transmission power based on the parameter relating to the second uplink power control, the terminal device 2 sets the transmission power based on the parameter relating to the second uplink power control. For example, in a case where the information on the parameter relating to the second uplink power control is transmitted from the base station device 1, that is, if the parameter relating to the second uplink power control is set for the terminal device 2, the terminal device 2 sets the transmission power based on the parameter relating to the second uplink power control. In a case where the information on the parameter relating to the second uplink power control is not transmitted, that is, in a case where the parameter relating to the second uplink power control is not set for the terminal device 2, the terminal device 2 does not set the transmission power based on the parameter relating to the second uplink power control. At this time, the terminal device 2 sets the transmission power for an uplink signal based on the parameter relating to the first uplink power control.

Moreover, according to the present invention, the parameter relating to the uplink power control may include a set of parameters relating to the uplink power control. That is, the parameters relating to the uplink power control include at least one parameter. In other hands, the parameters relating to the uplink power control may not include multiple parameters. Furthermore, according to the present invention, the parameter relating to the uplink power control may be notified with the information relating to the uplink power control from the base station device 1 to the terminal device 2. Furthermore, according to the present invention, the information relating to the uplink power control may be notified with the RRC message or the system information.

FIG. 1 is a schematic block diagram illustrating a configuration of the base station device 1 according to the present invention. As illustrated, the base station device 1 is configured to include a higher layer processing unit 101, a control unit 103, a reception unit 105, a transmission unit 107, a channel measurement unit 109, and a transmit and receive antenna 111. Furthermore, the reception unit 105 is configured to include a decoding unit 1051, a demodulation unit 1053, a demultiplexing unit 1055, and a radio reception unit 1057. Furthermore, reception processing by the base station device 1 is performed in the higher layer processing unit 101, the control unit 103, the reception unit 105, and the transmit and receive antenna 111. Furthermore, the transmission unit 107 is configured to include a coding unit 1071, a modulation unit 1073, a multiplexing unit 1075, a radio transmission unit 1077, and a downlink reference signal generation unit 1079. Furthermore, transmission processing by the base station device 1 is performed in the higher layer processing unit 101, the control unit 103, the transmission unit 107, and the transmit and receive antenna 111.

The higher layer processing unit 101 performs processing of a medium access control (MAC) layer, a packet data convergence protocol (PDCP) layer, a radio link control (RLC) layer, and a radio resource control (RRC) layer.

The higher layer processing unit 101 generates information that is arranged in each channel for downlink, or acquires such information from a higher node, and outputs the generated or acquired information to the transmission unit 107. Furthermore, the higher layer processing unit 101 allocates the radio resource in which the terminal device 2 arranges the physical uplink shared channel (PUSCH) that is uplink data information, from uplink radio resources. Furthermore, the higher layer processing unit 101 allocates the radio resource to which the physical downlink shared channel (PDSCH) that is downlink data information is allocated, from downlink radio resources.

The higher layer processing unit 101 generates downlink control information indicating the allocation of the radio resource, and transmits the generated downlink control information to the terminal device 2 through the transmission unit 107.

When the radio resource in which the PUSCH is allocated is allocated, the higher layer processing unit 101 preferentially allocates the radio resource that has good channel quality, based on a result of uplink channel measurement that is input from the channel measurement unit 109. To be more precise, the higher layer processing unit 101 generates pieces of information relating to configurations of various downlink signals and pieces of information relating to configurations of various uplink signals for a certain terminal device or a certain cell.

Furthermore, the higher layer processing unit 101 may generate the pieces of information relating to the configurations of the various downlink signals and the pieces of information relating to the configurations of the various uplink signals for every cell. Furthermore, the higher layer processing unit 101 may generate the pieces of information relating to the configurations of the various downlink signals and the pieces of information relating to the configurations of the various uplink signals for terminal device 2.

Furthermore, the higher layer processing unit 101 may generate pieces of information relating to first to n-th configurations (n is a natural number), for a certain terminal device 2 or a certain cell, to be more precise, in a UE-specific and/or cell-specific manner, and may transmit the pieces of information relating to the first to n-th configuration to the terminal device 2 through the transmission unit 107. For example, the information relating to the configuration of the downlink signal and/or the uplink signal may include a parameter relating to the resource allocation.

Furthermore, the information relating to the configuration of the downlink signal and/or the uplink signal may include a parameter that is used for sequence calculation. Moreover, in some cases, the radio resource described above is referred to as a time frequency resource, a subcarrier, a resource element (RE), a resource element group (REG), a control channel element (CCE), a resource block (RB), a resource block group (RBG), or the like.

The configuration information and the control information are may be defined as the information element. Furthermore, the configuration information and the control information may be defined as the RRC message. Furthermore, the configuration information and the control information may be transmitted with the system information to the terminal device 2. Furthermore, the configuration information and the control information may be transmitted with the dedicated signaling to terminal device 2.

Furthermore, the higher layer processing unit 101 sets at least one TDD UL/DL configuration (TDD config, tdd-Config, or uplink-downlink configuration(s)) for a system information block type 1. The TDD UL/DL configuration may be defined as illustrated in FIG. 3. A configuration of TDD may be indicated by setting an index. Additionally, a second TDD UL/DL configuration may be set as a downlink reference. Furthermore, multiple types of system information blocks may be prepared. For example, the system information block type 1 includes an information element relating to the TDD UL/DL configuration.

Furthermore, the system information block type 2 includes an information element relating to the radio resource control. Moreover, a parameter relating to a certain information element may be included as an information element, in the certain information element. For example, a so-called parameter in the physical layer may be defined as an information element in the higher layer.

Moreover, according to the present invention, an identity, an identifier, and an identification are referred to as an ID. As an ID (UE ID) that is set in a UE-specific manner, there are a cell radio network temporary identifier (C-RNTI), a semi-persistent scheduling C-RNTI (SPS C-RNTI), a temporary C-RNTI, a TPC-PUSCH RNTI, a TPC-PUCCH RNTI, and a random value for contention resolution. These IDs are used on a cell basis. The IDs are set by the higher layer processing unit 101.

Furthermore, the higher layer processing unit 101 sets various identifier for the terminal devices 2, and notifies the terminal device 2 of the various identifiers through the transmission unit 107. For example, the RNTI is set and notified to the terminal device 2. Furthermore, a physical cell ID, a virtual cell ID, or an ID that is equivalent to the virtual cell ID is set and is notified. For example, as the ID that is equivalent to the virtual cell ID, there are IDs (a PUSCH ID or a PUCCH ID, a scrambling initiation ID, a reference signal ID (RS ID), and the like) that can be set in a physical channel-specific manner. The physical cell ID or the virtual cell ID is used for sequence generation of the physical channel or of physical signal.

The higher layer processing unit 101 generates control information for controlling the reception unit 105 and the transmission unit 107, based on uplink control information (UCI) that is notified on the physical uplink control channel (PUCCH) from the terminal device 2, and on a buffer condition that is notified from the terminal device 2 or various pieces of configuration information (an RRC message, system information, a parameter, and an information element) of each of the terminal devices 2 that are set by the higher layer processing unit 101, and outputs the generated control information to the control unit 103. Moreover, the UCI includes at least one among the ACK/NACK, the scheduling request (SR), and the channel state information (CSI). Moreover, the CSI includes the CQI, the PMI, and the RI.

The higher layer processing unit 101 sets the transmission power for the uplink signal (the PRACH, the PUCCH, the PUSCH, the UL DMRS, the P-SRS, or the A-SRS) and the parameter relating to the transmission power. Furthermore, the higher layer processing unit 101 transmits the transmission power for the downlink signal (the CRS, the DL DMRS, the CSI-RS, the PDSCH, the PDCCH/EPDCCH, or the like) and the parameter relating to the transmission power to the terminal device 2 through the transmission unit 107. To be more precise, the higher layer processing unit 101 transmits the information relating to the uplink and downlink power control to the terminal device 2 through the transmission unit 107. In other words, the higher layer processing unit 101 generates information relating to the transmit power control for the base station device 1 and the terminal device 2. For example, the higher layer processing unit 101 transmits to the terminal device 2 a parameter relating to the transmission power for the base station device 1.

Furthermore, the higher layer processing unit 101 transmits to the terminal device 2 a parameter that is used for setting to maximum transmission power $P_{CMAX, c}$ and total maximum output power $P_{CMAX}$ of the terminal device 2. Furthermore, the higher layer processing unit 101 transmits to the terminal device 2 information relating to the transmit power control for various physical channels.

Furthermore, the higher layer processing unit 101 sets the transmission power for the terminal device 2, in such a manner that the PUSCH and the like satisfy predetermined channel quality according to information indicating an amount of interference from an adjacent base station device 1, information indicating an amount of interference, which is notified from the adjacent base station device and which is given to the base station device 1, channel quality that is input from the channel measurement unit 109, or the like, or considering interference to the adjacent base station device 1, and transmits information relating to this setting to terminal device 2 through the transmission unit 107.

Specifically, the higher layer processing unit 101 transmits nominal power ($P_{O\_NOMINAL\_PUSCH}$ or $P_{O\_NOMINAL\_PUCCH}$) for each of the PUSCH and the PUCCH, a channel loss compensation coefficient (attenuation coefficient) α, a power offset for message 3, a power offset that is stipulated for every PUCCH format, and the like, as information (information on a shared parameter relating to the uplink power control) that is shared among the terminal devices 2 or information that is set as a parameter common to the terminal devices 2, with the system information. At this time, a power offset in a PUCCH format 3 and a power offset in a delta PUCCH format 1bCS may be notified additionally. Furthermore, information on these shared parameters may be notified with the RRC message.

Furthermore, the higher layer processing unit 101 notifies UE-specific PUSCH power $P_{0\_UE\_PUSCH}$, a parameter (deltaMCS-Enabled) indicating whether or not delta MCS is enabled, a parameter (accumulationEnabled) indicating whether or not accumulation is enabled, UE-specific PUCCH power $P_{0\_UE\_PUCCH}$, a P-SRS power offset $P_{SRS\text{-}OFFSET}$ (0), and a filter coefficient, as information (information on a dedicated parameter relating to the uplink power control) that can be set for every terminal device 2, with the RRC message. At this time, a power offset for transmit diversity in each PUCCH format and an A-SRS power offset $P_{SRS\_OFFSET}$ (1) may be notified. Moreover, α that is mentioned here is a coefficient (an attenuation coefficient or a channel loss compensation coefficient) that, together with a path loss value, is used to set the transmission power, and by which to indicate the extent to which a path loss is compensated for, in other words, by which to determine to what extent the transmission power is increased or decreased according to the path loss (to be more precise, by which to determine to what extent the transmission power is adjusted). Normally, α is a value from 0 to 1. If α is 0, the adjustment of the power in accordance with the path loss is not made. If α is 1, the transmission power for the terminal device 2 is adjusted in such a manner that the path loss does not have an effect on the base station device 1. These pieces of information may be transmitted as re-configuration information to the terminal device 2. Moreover, each of the shared parameter and the dedicated parameter may be set independently for the primary cell and the secondary cell, or for multiple serving cells.

Furthermore, the higher layer processing unit 101 may set the transmission power for the downlink signal or for the uplink signal, or the parameter relating to the transmission power for every terminal device 2. Furthermore, the higher layer processing unit 101 may set the transmission power for a common downlink or uplink signal, or the parameter relating to the transmission power between the terminal devices 2. The higher layer processing unit 101 may transmit pieces of information on these parameters to the terminal device 2, as the information (the information on the parameter relating to the uplink power control) relating to the uplink power control and/or information (information on a parameter relating to downlink power control) relating to the downlink power control. At least one piece of parameter is transmitted to the terminal device 2 in a state of being included in the information on the parameter relating to the uplink power control and the information on the parameter relating to the downlink power control.

The higher layer processing unit 101 performs setting of various IDs relating to various physical channels or physical signals, and outputs information relating to the setting of the ID to the reception unit 105 and the transmission unit 107 through the control unit 103. For example, the higher layer processing unit 101 sets a value of the RNTI (UE ID) at which the CRC that is included in the downlink control information format is scrambled.

Furthermore, the higher layer processing unit 101 may set values of various identifiers, such as a cell radio network temporary identifier (C-RNTI), a temporary C-RNTI, a paging-RNTI (P-RNTI), a random access-RNTI (RA-RNTI), and a semi-persistent scheduling C-RNTI (SPS C-RNTI).

Furthermore, the higher layer processing unit 101 sets a value of an ID such as a physical cell ID, a virtual cell ID, or a scramble initialization ID. These pieces of configuration information are output to each processing unit through the control unit 103. Furthermore, the pieces of configuration information may be transmitted, as an RRC message, system information, UE-specific dedicated information, and an information element, to the terminal device 2. Furthermore, some of the RNTIs may be transmitted using a MAC control element (CE).

The control unit 103 generates a control signal for performing the control of the reception unit 105 and of the transmission unit 107, based on control information from the higher layer processing unit 101. The control unit 103 outputs the generated control signal to the reception unit 105 and the transmission unit 107, and performs the control of the reception unit 105 and of the transmission unit 107.

In accordance with a control signal that is input from the control unit 103, the reception unit 105 outputs information, which results from demultiplexing, demodulating, and decoding a reception signal that is received from the terminal device 2 through the transmit and receive antenna 111, to the higher layer processing unit 101. The radio reception unit 1057 converts (down-converts) an uplink signal received through the transmit and receive antenna 111 into an intermediate frequency (IF), removes an unnecessary frequency component, controls an amplification level in such a manner as to suitably maintain a signal level, performs orthogonal demodulation based on an in-phase component and an orthogonal component of the received signal, and converts the resulting orthogonally-demodulated analog signal into a digital signal. The radio reception unit 1057 removes a portion corresponding to a guard interval (GI) from the digital signal that results from the conversion. The radio reception unit 1057 performs Fast Fourier Transform (FFT) on the signal from which the guide interval is removed, and outputs the resulting signal to the demultiplexing unit 1055 that extracts the signal in the frequency region.

The demultiplexing unit 1055 demultiplexes the signal that is input from the radio reception unit 1057 into the signal such as the PUCCH, the PUSCH, the UL DMRS, and the SRS. Moreover, the demultiplexing is performed based on radio resource allocation information, which is determined in advance by the base station device 1 and is notified to each terminal device 2. Furthermore, the demultiplexing unit 1055 makes an adjustment of channels, that is, the PUCCH and the PUSCH, from a channel estimate that is input from the channel measurement unit 109. Furthermore, the demultiplexing unit 1055 outputs the UL DMRS and the SRS, which results from the demultiplexing, to the channel measurement unit 109.

The demodulation unit 1053 performs Inverse Discrete Fourier Transform (IDFT) on the PUSCH, acquires a modulation symbol, and performs demodulation of the received signal on each of the modulation symbols in the PUCCH and the PUSCH, using a modulation scheme that is prescribed in advance or that is notified by the base station device 1 to each of the terminal devices 2 with the downlink control information, such as Binary Phase Shift Keying (BPSK), Quadrature Phase Shift Keying (QPSK), 16 Quadrature Amplitude Modulation (16 QAM), or 64 quadrature amplitude modulation (64 QAM).

The decoding unit 1051 performs decoding on the demodulated coded bits in the PUCCH and the PUSCH at a coding rate in compliance with a coding scheme that is prescribed in advance, or at a coding rate that is prescribed in advance or is notified in advance by the base station device 1 to the terminal device 2 with the uplink grant (UL grant), and outputs the decoded data information and the uplink control information to the higher layer processing unit 101.

The channel measurement unit 109 measures the channel estimate, the channel quality, and the like from the UL DMRS and the SRS, which are uplink demodulation reference signals that are input from the demultiplexing unit 1055, and outputs a result of the measurement to the demultiplexing unit 1055 and the higher layer processing unit 101. Furthermore, the channel measurement unit 109 measures received power and/or reception quality of first to n-th signals, and outputs a result of the measurement to the demultiplexing unit 1055 and the higher layer processing unit 101.

The transmission unit 107 generates a reference signal for downlink (downlink reference signal) based on the control signal that is input from the control unit 103, codes and modulates the data information and the downlink control information that are input from the higher layer processing unit 101, and multiplexes the PDCCH (EPDCCH), the PDSCH, and the downlink reference signal, and transmits a downlink signal to the terminal device 2 through the transmit and receive antenna 111.

The coding unit 1071 performs coding, such as turbo coding, convolutional coding, and block coding, on the downlink control information that is input from the higher layer processing unit 101, and the data information. The modulation unit 1073 performs modulation on the coded bits with the modulation schemes such as the QPSK, the 16 QAM, and the 64 QAM. The downlink reference signal generation unit 1079 performs generation as the downlink reference signal with a sequence that is obtained according to a rule that is prescribed in advance based on a cell identifier (a cell ID, a cell identity, or a cell identification) and the like for identifying the base station device 1 and that is already known to the terminal device 2. The multiplexing unit 1075 multiplexes each modulated channel and the generated downlink reference signal.

The radio transmission unit 1077 performs Inverse Fast Fourier Transform (IFFT) on a modulation symbol that results from the multiplexing, performs the modulation in compliance with an OFDM scheme, adds the guard interval to the OFDM-modulated OFDM symbol, generates a digital signal in a baseband, converts the digital signal in the baseband into an analog signal, generates an in-phase component and an orthogonal component in an intermediate frequency from the analog signal, removes frequency components unnecessary for an intermediate frequency band, converts (up-converts) the signal in the intermediate frequency into a signal in a high frequency, removes unnecessary frequency components, and performs power amplification, and outputs a final result to the transmit and receive antenna 111 for transmission.

Figure 2:
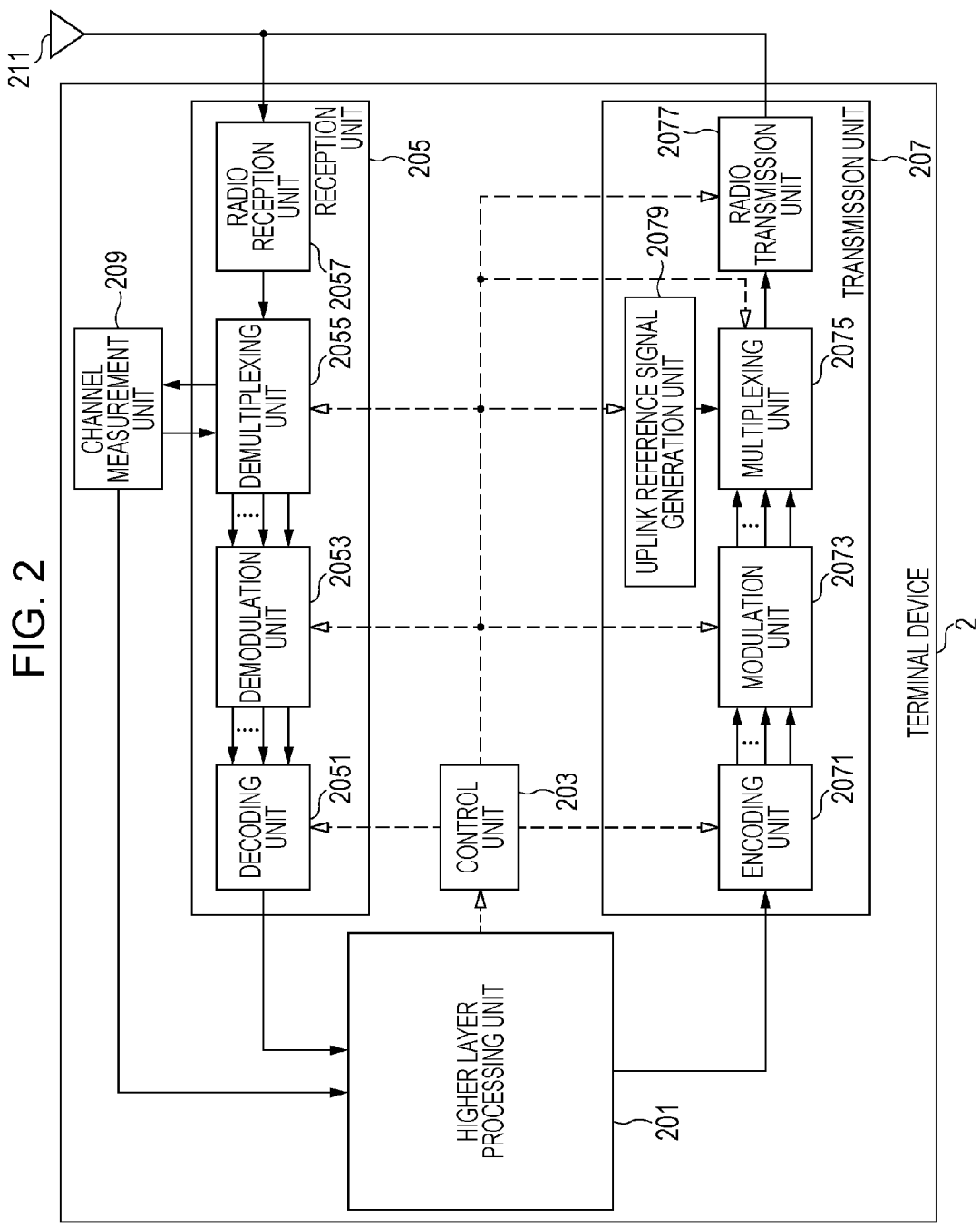
FIG. 2 is a schematic block diagram illustrating a configuration of a terminal device 2 according to the first embodiment of the present invention.

FIG. 2 is a schematic block diagram illustrating a configuration of the terminal device 2 according to the present embodiment. As illustrated, the terminal device 2 is configured to include a higher layer processing unit 201, a control unit 203, a reception unit 205, a transmission unit 207, a channel measurement unit 209, and a transmit and receive antenna 211. Furthermore, the reception unit 205 is configured to include a decoding unit 2051, a demodulation unit 2053, a demultiplexing unit 2055, and a radio reception unit 2057. The reception processing by the terminal station device 2 is performed in the higher layer processing unit 201, the control unit 203, the reception unit 205 and the transmit and receive antenna 211. Furthermore, the transmission unit 207 is configured to include a coding unit 2071, a modulation unit 2073, a multiplexing unit 2075, and a radio transmission unit 2077. Furthermore, the transmission processing by the terminal device 2 is performed in the higher layer processing unit 201, the control unit 203, the transmission unit 207, and the transmit and receive antenna 211.

The higher layer processing unit 201 outputs to a transmission unit the uplink data information that is generated by a user operation and the like. Furthermore, the higher layer processing unit 201 performs the processing of the medium access control (MAC) layer, the packet data convergence protocol (PDCP) layer, the radio link control (RLC) layer, and the radio resource control (RRC) layer.

The higher layer processing unit 201 manages various pieces of configuration information of the terminal device 2 itself. Furthermore, the higher layer processing unit 201 generates information that is arranged in each uplink channel and outputs the generated information to the transmission unit 207. The higher layer processing unit 201 generates the control information for performing the control of the reception unit 205 and of the transmission unit 207, based on various pieces of configuration information of the terminal device 2 itself, which is managed by the higher layer processing unit 201 for which the downlink control information that is notified from the base station device 1 on the PDCCH and radio resource control information that is notified on the PDSCH are set, and outputs the generated control information to the control unit 203. Furthermore, the higher layer processing unit 201 sets various parameters (an information element and an RRC message) of each signal, based on pieces of information relating to the first to n-th configurations, which are notified from the base station device 1. Furthermore, these pieces of information that are set are generated and are output to the transmission unit 207 through the control unit 203.

The higher layer processing unit 201 acquires from the reception unit 205 information indicating a sounding subframe (an SRS subframe and an SRS transmission subframe) that is a subframe for which to reserve a radio resource for transmitting the SRS that is broadcast by the base station device 1, and a bandwidth of the radio resource that is reserved to transmit the SRS within the sounding subframe, information indicating a subframe on which to transmit a periodic SRS that is notified by the base station device 1 to the terminal device 2, a frequency band, and an amount of cyclic shift that is used in a CAZAC sequence for the periodic SRS, and information indicating the frequency band in which to transmit an aperiodic SRS that is notified by the base station device 1 to the terminal device 2, and the amount of cyclic shift that is used in a CAZAC sequence for the aperiodic SRS.

The higher layer processing unit 201 performs control of SRS transmission in accordance with the information described above. Specifically, the higher layer processing unit 201 controls the transmission unit 207 in such a manner that the periodic SRS is transmitted one time or periodically in accordance with information relating to the periodic SRS described above. Furthermore, in a case where, in the SRS request (the SRS indicator) that is input from the reception unit 205, transmission of the aperiodic SRS is requested, the higher layer processing unit 201 transmits the aperiodic SRS only the number of times (for example, one time) that is prescribed in advance, in accordance with information relating to the aperiodic SRS.

Furthermore, the higher layer processing unit 201 performs the transmit power control for the PRACH, the PUCCH, the PUSCH, the periodic SRS, and the aperiodic SRS, based on information relating to the control of the transmission power for various uplink signals that are transmitted from the base station device 1. Specifically, the higher layer processing unit 201 sets the transmission power for the various uplink signals based on various pieces of information relating to the uplink power control, which are acquired from the reception unit 205. For example, the transmission power for the SRS is controlled based on $P_{O\_PUSCH}$, $\alpha$, a power offset $P_{SRS\_OFFSET}$ (0) (a first power offset (pSRS-Offset)) for the periodic SRS, a power offset $P_{SRS\_OFFSET}$ (1) (a second power offset (pSRS-OffsetAp)) for the aperiodic SRS, and a TPC command. Moreover, the higher layer processing unit 201 causes $P_{SRS\_OFFSET}$ to switch between the first power offset and the second power offset according to whether the SRS is the periodic SRS or the aperiodic SRS.

Furthermore, in a case where a third power offset is set for the periodic SRS and/or the aperiodic SRS, the higher layer processing unit 201 sets the transmission power based on the third power offset. Moreover, a value of the third power offset may be set in a wider range than the first power offset or the second power offset. The third power offset may be set for each of the periodic SRS and the aperiodic SRS. To be more precise, the information on the parameter relating to the uplink power control is an information element or an RRC message in which the parameter relating to the transmit power control for various uplink physical channels is included.

Furthermore, in a case where, in a certain serving cell and a certain subframe, the sum of the transmission power for the first uplink reference signal and the transmission power for the physical uplink shared channel exceeds the maximum transmission power (for example, $P_{CMAX}$ or $P_{CMAX,\ c}$) that is set for the terminal device 2, the higher layer processing unit 201 outputs indication information to the transmission unit 207 through the control unit 203, in such a manner that the physical uplink shared channel is transmitted.

Furthermore, in a case where, in a certain serving cell and a certain subframe, the sum of the transmission power for the first uplink reference signal and the transmission power for the physical uplink control channel exceeds the maximum transmission power (for example, $P_{CMAX}$ or $P_{CMAX,\ c}$) that is set for the terminal device 2, the higher layer processing unit 201 outputs the indication information to the transmission unit 207 through the control unit 203, in such a manner that the physical uplink control channel is transmitted.

Furthermore, in a case where, in a certain serving cell and a certain subframe, the sum of the transmission power for the second uplink reference signal and the transmission power for the physical uplink shared channel exceeds the maximum transmission power that is set for the terminal device 2, the higher layer processing unit 201 outputs the indication information to the transmission unit 207 through the control unit 203, in such a manner that the physical uplink shared channel is transmitted.

Furthermore, in a case where, in a certain serving cell (for example, a serving cell c) and a certain subframe (for example, a subframe i), the sum of the transmission power for the second uplink reference signal and the transmission power for the physical uplink control channel exceeds the maximum transmission power that is set for the terminal device 2, the higher layer processing unit 201 outputs the indication information to the transmission unit 207 through the control unit 203, in such a manner that the physical uplink control channel is transmitted.

Furthermore, in a case where multiple physical channels are transmitted at the same timing (for example, a subframe), the higher layer processing unit 201 can control the transmission power for the various physical channels or control the transmission of the various physical channels according to priority levels of various physical channels. The higher layer processing unit 201 outputs the control information to the transmission unit 207 through the control unit 203.

Furthermore, in a case where carrier aggregation that uses multiple component carriers which correspond to the multiple serving cells or each of the multiple serving cells is performed, the higher layer processing unit 201 can control the transmission power for the various physical channel or can control the transmission of the various physical channels according to the priority levels of the various physical channels.

Furthermore, the higher layer processing unit 201 may perform the transmission control of the various physical channels that are transmitted from a cell, according to a priority level of the cell. The higher layer processing unit 201 outputs the control information to the transmission unit 207 through the control unit 203.

The higher layer processing unit 201 outputs the indication information to the transmission unit 207 through the control unit 203 in such a manner that the generation of the uplink reference signal and so forth are performed based on the information relating to the configuration of the uplink reference signal, which is notified from the base station device 1. To be more precise, a reference signal control unit 2013 outputs the information relating to the configuration of the uplink reference signal to an uplink reference signal generation unit 2079 through the control unit 203.

Based on the control information from the higher layer processing unit 201, the control unit 203 generates the control signal for performing the control of the reception unit 205 and of the transmission unit 207. The control unit 203 outputs the generated control signal to the reception unit 205 and the transmission unit 207, and performs the control of the reception unit 205 and of the transmission unit 207.

In accordance with the control signal that is input from the control unit 203, the reception unit 205 demultiplexes, demodulates, and decodes a reception signal that is received from the base station device 1 through the transmit and receive antenna 211, and outputs the resulting information to the higher layer processing unit 201.

The reception unit 205 performs suitable reception processing according to whether or not the information relating to the first configuration and/or the information relating to the second configuration are received. For example, in a case where either of the information relating to the first configuration and the information relating to the second control information is received, a first control information field is detected from the received downlink control information format. In a case where the information relating to the first configuration and the information relating to the second control information are received, a second control information field is detected from the received downlink control information format.

The radio reception unit 2057 converts (down-converts) a downlink signal received through each receive antenna into an intermediate frequency, removes an unnecessary frequency component, controls an amplification level in such a manner that a signal level is suitably maintained, performs orthogonal demodulation based on an in-phase component and an orthogonal component of the received signal, and converts the resulting orthogonally-demodulated analog signal into a digital signal. The radio reception unit 2057 removes a portion equivalent to the guard interval from the digital signal that results from the conversion, performs the Fast Fourier Transform on the signal from which the guard interval is removed, and extracts a signal in the frequency region.

The demultiplexing unit 2055 demultiplexes the extracted signal into the physical downlink control channel (PDSCH), the PDSCH, and the downlink reference signal (DRS). Moreover, the demultiplexing is performed based on the radio resource allocation information and the like that are notified with the downlink control information. Furthermore, the demultiplexing unit 2055 makes an adjustment of channels, that is, the PDSCH and the PDSCH, from a channel estimate that is input from the channel measurement unit 209. Furthermore, the demultiplexing unit 2055 outputs the downlink reference signal, which results from the demultiplexing, to the channel measurement unit 209.

The demodulation unit 2053 performs demodulation in compliance with a QPSK modulation scheme on the PDCCH and outputs a result of the demodulation to the decoding unit 2051. In a case where the decoding unit 2051 attempts to decode the PDCCH and succeeds in the decoding, the decoding unit 2051 outputs the downlink control information that results from the decoding, to the higher layer processing unit 201. The demodulation unit 2053 performs the demodulation, which is in compliance with the modulation scheme that is notified with the downlink control information, such as the QPSK, the 16 QAM, and the 64 QAM, on the PDSCH, and outputs a result of the demodulation to the decoding unit 2051. The decoding unit 2051 performs the decoding on a coding rate that is notified with the downlink control information, and outputs the data information that results from the decoding, to the higher layer processing unit 201.

The channel measurement unit 209 measures a downlink path loss from the downlink reference signal that is input from the demultiplexing unit 2055, and outputs the measured path loss to the higher layer processing unit 201. Furthermore, the channel measurement unit 209 calculates a downlink channel estimate from the downlink reference signal and outputs the calculated downlink channel estimate to the demultiplexing unit 2055. Furthermore, the channel measurement unit 209 performs received power measurement or reception quality measurement of the first signal and/or the second signal in accordance with various pieces of information relating to measurement, which is notified from the reference signal control unit 2013 through the control unit 203, or various pieces of information relating to a measurement report. A result of the measurement is output to the higher layer processing unit 201. Furthermore, in a case where the channel measurement unit 209 is instructed to perform the channel estimation of the first signal and/or the second signal, the channel measurement unit 209 may output a result of the channel estimation of each signal to the higher layer processing unit 201. At this point, the first signal or the second signal is a reference signal (a pilot signal, a pilot channel, or a reference signal), and a third signal or a fourth signal other than the first signal or the second signal may be provided. To be more precise, the channel measurement unit 209 measures channels for one or more signals. Furthermore, the channel measurement unit 209 measures a signal for performing the channel measurement in accordance with the control information that is notified from the higher layer processing unit 201 through the control unit 203.

Based on the control signal (the control information) that is input from the control unit 203, the transmission unit 207 generates the uplink demodulation reference signal (UL DMRS) and/or the sounding reference signal (SRS), codes and modulates the data information that is input from the higher layer processing unit 201, multiplexes the PUCCH, the PUSCH, and the generated UL DMRS and/or SRS, adjusts the transmission power for the PUCCH, the PUSCH, the UL DMRS, and the SRS, and transmits a result of the multiplexing to the base station device 1 through the transmit and receive antenna 211.

Furthermore, in a case where information relating to a result of the measurement is output from the higher layer processing unit 201, the transmission unit 207 transmits the information that is output, to the base station device 1 through the transmit and receive antenna 211.

Furthermore, in a case where channel state information that is a result relating to channel estimation is output from the higher layer processing unit 201, the transmission unit 207 feeds the channel state information back to the base station device 1. To be more precise, the higher layer processing unit 201 generates the channel state information (CSI, CQI, PMI, or RI) based on the result of the measurement, which is notified from the channel measurement unit 209, and feeds the generated channel state information back to the base station device 1 through the control unit 203.

When a predetermined grant (or a predetermined downlink control information format) is detected in the reception unit 205, the transmission unit 207 transmits the uplink signal that corresponds to the predetermined grant, on the first uplink subframe after a predetermined subframe from a subframe from which the grant is detected. For example, when the grant is detected in the subframe i, the uplink signal can be transmitted on the first uplink subframe after a subframe i+k.

Furthermore, in a case where a transmission subframe for the uplink signal is the subframe i, the transmission unit 207 sets the transmission power for the uplink signal based on a power control adjustment value that is obtained by the TPC command which is received on a subframe i−k. At this point, a power control adjustment value f(i) (or g(i)) is set based on a correction value or an absolute value that is associated with a value which is set for the TPC command. In a case where the accumulation is enabled, the correction value that is associated with the value which is set for the TPC command is accumulated, and a result of the accumulation is applied as the power control adjustment value. In a case where the accumulation is not enabled, the absolute value that is associated with the value which is set for a single TPC command is applied as the power control adjustment value.

In a case where either of the information relating to the first configuration and the information relating to the second configuration is received in the reception unit 205, the transmission unit 207 sets the transmission power based on the parameter relating to the first uplink power control and transmits the uplink signal. In a case where the information relating to the first configuration and the information relating to the second configuration are received in the reception unit 205, the transmission unit 207 sets the transmission power based on the parameter relating to the second uplink power control, and transmits the uplink signal.

The coding unit 2071 performs the coding, such as the turbo coding, the convolutional coding, and the block coding, on the uplink control information that is input from the higher layer processing unit 201 and on the data information. The modulation unit 2073 modulates the coded bits that are input from the coding unit 2071 with the modulation scheme such as the BPSK, the QPSK, the 16 QAM, or the 64 QAM.

The uplink reference signal generation unit 2079 generates the uplink reference signal based on the information on the configuration of the uplink reference signal. To be more precise, the uplink reference signal generation unit 2079 generates the CAZAC sequence that is obtained according to the rule which is prescribed in advance based on the cell identifier for identifying the base station device 1, the bandwidth in which the uplink demodulation reference signal, the first uplink reference signal, and the second uplink reference signal are mapped, and the like, and that is already known to the base station device 1. Furthermore, based on the control signal that is input from the control unit 203, the uplink reference signal generation unit 2079 gives the cyclic shift to the CAZAC sequences for the uplink demodulation reference signal, the first uplink reference signal, and the second uplink reference signal that are generated.

The uplink reference signal generation unit 2079 may initialize reference sequences for the uplink demodulation reference signal, the sounding reference signal, and/or the uplink reference signal, based on a predetermined parameter. The predetermined parameter may be the same in each reference signal. Furthermore, the predetermined parameter may be a parameter that is set independently for each reference signal. To be more precise, if a parameter that is independently set is not present, the uplink reference signal generation unit 2079 can initialize a reference sequence for each reference signal with the same parameter.

Based on the control signal being input from the control unit 203, the multiplexing unit 2075 re-maps PUSCH modulation symbols in parallel and then performs the Discrete Fourier Transform (DFT) on the re-mapped PUSCH modulation symbols, and multiplexes PUSCH and PUSCH signals and the UL DMRS and the SRS that are generated.

The radio transmission unit 2077 performs the Inverse Fast Fourier Transform (IFFT) on a signal that results from the multiplexing, performs the modulation in compliance with an SC-FDMA scheme, adds the guard interval to the SC-FDMA-modulated SC-FDMA symbol, generates a digital signal in a baseband, converts the digital signal in the baseband into an analog signal, generates an in-phase component and an orthogonal component in an intermediate frequency from the analog signal, removes frequency components unnecessary for an intermediate frequency band, converts (up-converts) the signal in the intermediate frequency into a signal in a high frequency (radio frequency), removes unnecessary frequency components, performs power amplification, and outputs a final result to the transmit and receive antenna 211 for transmission.

Figure 4:
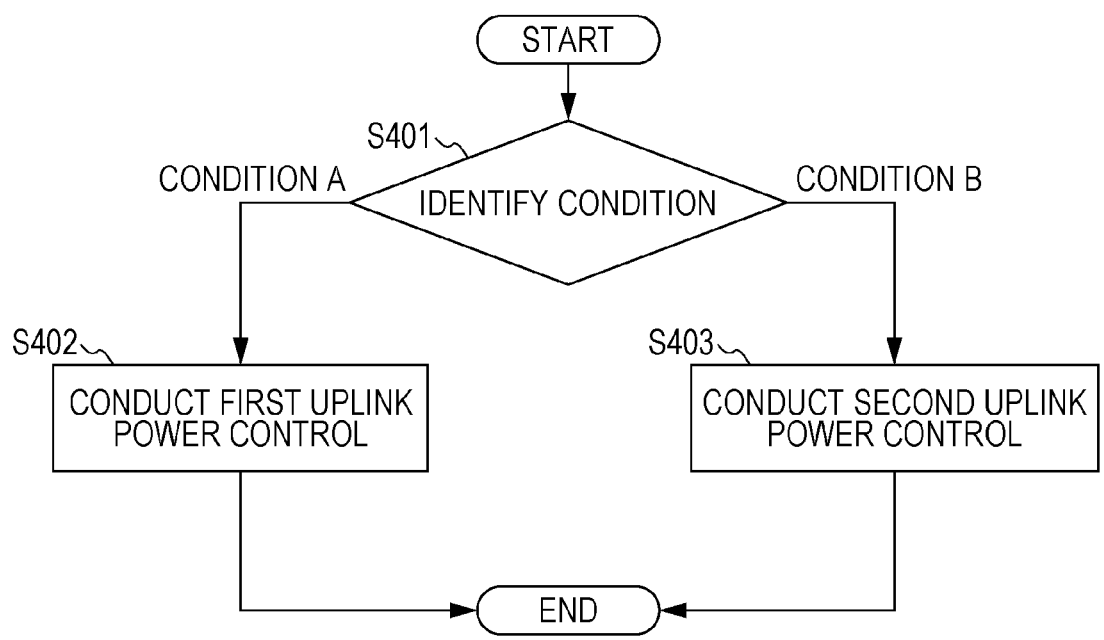
FIG. 4 is a flowchart illustrating a processing procedure that is performed by the terminal device 2 according to a basic mode of the first embodiment of the present invention.

FIG. 4 is a flowchart illustrating a processing procedure that is performed by the terminal device 2 according to the first embodiment. With information that is transmitted from the base station device 1, the terminal device 2 identifies whether condition A or condition B is satisfied (Step S401). In a case where condition A is satisfied, the terminal device 2 sets the transmission power based on the parameter relating to the first uplink power control (Step S402). In a case where condition B is satisfied, the terminal device 2 sets the transmission power based on the parameter relating to the second uplink power control (Step S403). At this point, the parameter relating to the first uplink power control and the parameter relating to the second uplink power control may be applied to all of the uplink subframes.

At this point, under condition A, the terminal device 2 receives either of the information relating to the first configuration and the information relating to the second configuration, and under condition B, the terminal device 2 receives the information relating to the first configuration and the information relating to the second configuration.

Moreover, one example of the parameter relating to the first uplink power control and the parameter relating to the second uplink power control will be described below using a modification example.

Moreover, the information relating to the first configuration and the information relating to the second configuration will be described in detail below.

According to the first embodiment, the transmit power control in accordance with a communication situation can be suitably performed by associating a certain piece of information and the uplink power control with each other.

First Modification of the First Embodiment

Next, a first modification example of the first embodiment is described. According to the first modification example of the first embodiment, the base station device 1 transmits the information relating to the first configuration and/or the information relating to the second configuration to the terminal device 2. Furthermore, the base station device 1 can transmit a field relating to a first transmit power control (TPC) command to the terminal device 2 in which either of the first configuration and the second configuration is set, with the field being included in a downlink control information (DCI) format. Furthermore, the base station device 1 can transmit a field relating to a second TPC command to the terminal device 2 in which the first configuration and the second configuration are set, with the field being included in the DCI format.

In the case where the information relating to the first configuration or the information relating to the second configuration is received, the terminal device 2 performs the reception processing (for example, demodulation/decoding processing, signal detection processing, or information extraction processing) on the field relating to the TPC command that accompanies the DCI format which is transmitted from the base station device 1, as a field relating to a first TPC command, and sets the transmission power for the uplink signal based on the first TPC command. In a case where the information relating to the first configuration and the information relating to the second configuration are set, the terminal device 2 performs the reception processing on the field relating to the TPC command that accompanies the DCI format which is transmitted from the base station device 1, as a field relating to the second TPC command, and sets the transmission power for the uplink signal based on the second TPC command.

At this point, based on a basic mode of the first embodiment, a difference between the field relating to the first TPC command and the field relating to the second TPC command may be described as lying in whether or not the field relating to the TPC command that is included in the DCI format is extended. To be more precise, the field relating to the first TPC command and the field relating to the second TPC command are different from each other in the number of bits (a bit size) that constitute the field relating to the TPC command. For example, the field relating to the first TPC command may be configured from 2 bits, and the field relating to the second TPC command may be configured from 3 bits. To be more precise, when the second configuration is set, the terminal device 2 recognizes that the field relating to the TPC command is extended, performs the demodulation/decoding processing, and sets uplink transmission power. When the parameter relating to the TPC command is extended, the terminal device 2 can dynamically control power correction in a wider range than before the field is extended. Moreover, the bit size that is illustrated here is one example, and therefore, the field may be extended in a different size than in this example.

Furthermore, according to the first modification example of the first embodiment, when the first configuration and the second configuration are set, the terminal device 2 may recognize that the field relating to the TPC command is extended. At this point, the extending of the field relating to the TPC command includes increasing the number of bits that are allocated to the field relating to the TPC command. Furthermore, the extending of the field relating to the TPC command includes enabling an applicable correction value or absolute value to be applied through the use of the TPC command until the applicable correction value or absolute value becomes higher or lower than a value that is applicable with the TPC command before the field is extended. To be more precise, the number of bits constituting the field relating to the TPC command does not change, and the applicable value changes.

Moreover, the information relating to the first configuration and the information relating to the second configuration may be transmitted to the terminal device 2 with the same RRC message (or the system information).

Moreover, the information relating to the first configuration and the information relating to the second configuration may be transmitted to the terminal device 2 with the different RRC message (or the system information).

Furthermore, the first configuration and the second configuration may be set as different information elements (parameters). To be more precise, when the first configuration and the second configuration are set, the terminal device 2 can demodulate/decode the field relating to the extended TPC command, and can extend a range of the uplink power control. To be more precise, the terminal device 2 can dynamically perform the power correction in a wider (broader) range on the subframe basis.

Furthermore, the terminal device 2 may set the field relating to the first TPC command and the field relating to the second TPC command in advance. FIGS. 5 and 6 illustrate one example of a configuration of the TPC command that is indicated by the field relating to the first TPC command and the field relating to the second TPC command. FIG. 5 illustrates a case where the bit size (the number of bits) is increased with the field relating to the first TPC command and the field relating to the second TPC command. The power correction in many more steps and in a wider range can be performed in the field relating to the second TPC command by increasing the bit size. Furthermore, in FIG. 6, the field relating to the first TPC command and the field relating to the second TPC command have the same bit size in configuration, but are different in selectable correction value or absolute value. At least one of the correction value and the absolute value that can be set in the field relating to the first TPC command and the field relating to the second TPC command may be different.

Furthermore, in a case where the field relating to the first TPC command and the field relating to the second TPC command correspond to different subframe sets, respectively, the field relating to the first TPC command and the field relating to the second TPC command may be configured to have the same bits size. To be more precise, the accumulation may be performed independently for every subframe set. Furthermore, it may be independently determined for every subframe set whether or not the accumulation is enabled. To be more precise, the accumulation may be enabled in a certain subframe set, and the accumulation may not be enabled in a different subframe set. Moreover, a subframe set may be referred to as a subframe subset or a subframe type.

In a case where the TPC command is extended by setting the first configuration and the second configuration, the terminal device 2 maps the DCI format that includes the extended TPC command field, to at least one among a UE-specific search space (USS) of the PDCCH, a common search space (CSS) of the EPDCCH, and a USS of the EPDCCH.

The higher layer processing unit 101 of the base station device 1 may transmit the DCI format that is accompanied by the extended TPC command, to the terminal device 2 in which the second configuration is set.

Furthermore, the base station device 1 may transmit the field relating to the first TPC command and the field relating to the second TPC command to the terminal device 2 in which the first configuration and the second configuration are set, with the two fields being included in the same DCI format.

Furthermore, the base station device 1 may transmit the field relating to the first TPC command in the same DCI format to the terminal device 2 in which the first configuration and the second configuration are set, with the field relating to the first TPC command in the same DCI format being set as the field relating to the second TPC command. To be more precise, the base station device 1 may transmit the field relating to the first TPC command, in a state of being switched to the field relating to the second TPC command.

Furthermore, the base station device 1 may transmit one portion of a control information field to the terminal device 2 in which the first configuration and the second configuration are set, with the one portion of the control information field being set as the field relating to the second TPC command. The terminal device 2 can detect the field relating to the second TPC command from the DCI format that is set by the base station device 1. Moreover, control information different from the information relating to the first configuration and the information relating to the second configuration may indicate to the terminal device 2 whether or not the second TPC command can be applied.

Second Modification of the First Embodiment

Next, a second modification example of the first embodiment is described. According to the second modification example of the first embodiment, the base station device 1 transmits the information relating to the first configuration and/or the information relating to the second configuration to the terminal device 2. Furthermore, the base station device 1 performs transmission to the terminal device 2 in which the first configuration and the second configuration are set, with a field indicating whether or not to apply a predetermined power offset to uplink power being included in the DCI format.

Furthermore, the base station device 1 transmits information relating to the predetermined power offset to terminal device 2 in which the first configuration and the second configuration are set. In the case where the information relating to the first configuration and the information relating to the second configuration are received, the terminal device 2 recognizes that the field indicating whether or not the predetermined power offset is applied to the uplink power is included in the DCI format, and performs reception processing (the demodulation/decoding processing or the detection processing) of the DCI format. In a case where it is indicated with the field that the predetermined power offset is applied, the terminal device 2 sets the transmission power for the uplink signal based on the predetermined power offset, and transmits the uplink signal to the base station device 1. For example, the predetermined power offset may be a power ratio between the transmission power for the uplink signal that is transmitted on a first subframe set and the transmission power for the uplink signal that is transmitted on a second subframe set. The predetermined power offset may be a power ratio that is set to a predetermined value. Furthermore, the predetermined power offset may be a power difference in the transmission power between the uplink signals that are transmitted on the first subframe set and on the second subframe set. Furthermore, the predetermined power offset may be a power ratio between the transmission power that is set based on the parameter relating to the first uplink power control and the transmission power that is set based on the parameter relating to the second uplink power control. Furthermore, the predetermined power offset may be a power difference between the transmission power that is set based on the parameter relating to the first uplink power control and the transmission power that is set based on the parameter relating to the second uplink power control. Furthermore, in a case where the predetermined power offset is 0, the transmission power that is set based on the parameter relating to the first uplink power control and the transmission power that is set based on the parameter relating to the second uplink power control may be the same.

Furthermore, in a case where the predetermined power offset is set for the terminal device 2, a difference between the parameter relating to the first uplink power control and the parameter relating to the second uplink power control may indicate whether or not the predetermined power offset in the DCI format is applied to the uplink power. To be more precise, when the first configuration and the second configuration are set, the terminal device 2 recognizes that the field indicating whether or not the predetermined power offset in the DCI format is applied to the uplink power, and performs the reception processing. In a case where it is indicated that the predetermined power offset is suitable for the uplink power, the terminal device 2 sets the uplink power based on the predetermined power offset. Moreover, the predetermined power offset may be notified to the terminal device 2 in a state of being included in the RRC message (the information element), and at this time, the field that is included in the DCI format may be set as one bit that serves as an on/off trigger bit. Furthermore, with the predetermined power offset, the extent to which offsetting is performed by the field indicating whether or not the predetermined power offset is applied to the uplink power may be set. To be more precise, the DCI format may include a new field relating to the uplink power control. The DCI format in which the new field is set may be allocated to at least one among the PDCCH, the USS of the EPDCCH, and the CSS of the EPDCCH.

Furthermore, in a case where the field relating to the predetermined power offset is configured from 2 bits, the predetermined power offset may not be used only for determining whether or not the predetermined power offset is applied to the uplink power. For example, in a case where a first value is set to be in the field relating to the predetermined power offset, the first power offset may be applied. In a case where a second value is set to be in the field relating to the predetermined power offset, the second power offset may be applied. In a case where a third value is set to be in the field relating to the predetermined power offset, the third power offset may be applied. In a case where a fourth value is set to be in the field relating to the predetermined power offset, a predetermined power offset may be applied. Moreover, values of the first to third power offsets are independently set, and are notified from the base station device 1 to the terminal device 2. Furthermore, in a case where the first to third power offsets are set, the terminal device 2 recognizes that the field relating to the predetermined 2-bit power offset is included in the DCI format, and may perform the reception processing.

Third Modification Example of the First Embodiment

Next, a third modification example of the first embodiment is described. According to the third modification example of the first embodiment, the base station device 1 transmits the information relating to the first configuration and/or the information relating to the second configuration to the terminal device 2. Furthermore, the base station device 1 can transmit a field indicating switching between the parameter relating to the first uplink power control and the parameter relating to the second uplink power control, to the terminal device 2 in which the first configuration and the second configuration are set, with the field indicating the switching being included in the downlink control information (DCI) format. In a case where it is indicated in the field that the parameter relating to the first uplink power control is applied, the base station device 1 can set the transmission power for the uplink signal based on the parameter relating to the first uplink power control for the terminal device 2. In a case where it is indicated in the field that the parameter relating to the second uplink power control is applied, the base station device 1 can set the transmission power for the uplink signal based on the parameter relating to the second uplink power control for the terminal device 2.

Moreover, according to the present embodiment, a field indicating the switching between the parameter relating to the first uplink power control and the parameter relating to the second uplink power control is available as the field, but the field may be the field indicating the switching from the parameter relating to the first uplink power control to third uplink power control. Furthermore, the field may be a field indicating the switching among 3 or more (sets) parameters relating to the uplink power control.

In the case where the information relating to the first configuration and the information relating to the second configuration are received, the terminal device 2 recognizes that the field indicating the switching between the parameter relating to the first uplink power control and the parameter relating to the second uplink power control is included in the DCI format that is transmitted from the base station device 1, performs the reception processing, and sets the transmission power for the uplink signal based on the indication by the field. Moreover, in a case where the field is configured from 2 or more bits, the switching among multiple parameters (multiple cells) relating to the uplink power control can be indicated. For example, in a case where the field is configured from 2 bits, if an indication is given by the first value (for example, "00"), the transmission power for the uplink signal is set based on the parameter relating to the first uplink power control. Furthermore, if an indication is given by the second value (for example, "01"), the transmission power for the uplink signal is set based on the parameter relating to the second uplink power control. Furthermore, if an indication is given by the third value (for example, "10"), the transmission power for the uplink signal is set based on the parameter relating to the third uplink power control. Furthermore, if an indication is given by the fourth value (for example, "11"), the transmission power for the uplink signal is set based on the parameter relating to fourth uplink power control. At this time, the parameter relating to the first uplink power control to the parameter relating to the fourth uplink power control are set in advance. Moreover, the parameter (the set of parameters) relating to the first uplink power control to the parameter (the set of parameters) relating to fourth uplink power control may be notified from the base station device 1 to the terminal device 2 with the RRC message.

In a case where the parameter relating to the first uplink power control and the parameter relating to the second uplink power control are set for the terminal device 2, a difference between the parameter relating to the first uplink power control and the parameter relating to the second uplink power control that are used by the first configuration and/or the second configuration being setting may lie in whether or not the field indicating the switching between the parameter relating to the first uplink power control and the parameter relating to the second uplink power control is included in the DCI format. To be more precise, in a case where the first configuration and the second configuration are set, the field indicating the switching among 2 parameters relating to the uplink power control is including in the DCI format. In a case where the first value (a first index) is set to be in the field indicating the switching between the parameters relating to the uplink power control, the uplink transmission power is set based on the parameter relating to the first uplink power control. In a case where the second value (a second index) is set to be in the field indicating the switching between the parameters relating to the uplink power control, the uplink transmission power is set based on the parameter relating to the second uplink power control. The base station device 1 transmits the parameter relating to the first uplink power control and the parameter relating to the second uplink power control, to the terminal device 2.

Moreover, the parameters relating to the uplink power control include at least one power control parameter relating to the uplink signal (the uplink physical channel). Furthermore, in a case where the parameter relating to the second uplink power control is not set, although the first configuration and the second configuration are set, the terminal device 2 does not recognize that the field indicating the switching between the parameter relating to the first uplink power control and the parameter relating to the second uplink power control is included in the DCI format.

Furthermore, the terminal device 2 that can set only either of the parameter relating to the first uplink power control and the parameter relating to the second uplink power control does not expect to receive the information relating to the second configuration.

At this time, the base station device 1 notifies the terminal device 2 of each parameter with pieces of information relating to multiple types of uplink power control. Multiple parameters that are set may be parameters that are notified with cell-specific information. Furthermore, the multiple parameters that are set may be parameters that are notified with UE-specific information. Furthermore, the multiple parameters may be parameters that are notified with cell-specific and UE-specific information. Furthermore, the multiple parameters may be specific parameters that are notified with cell-specific or UE-specific information. For example, the parameters that are notified with the information relating to the uplink power control include at least one parameter or one parameter set for controlling the transmission power for the PUSCH, the transmission power for the PUCCH, or the transmission power for the SRS. To be more precise, the parameter that is not notified with the information relating to the second uplink power control may substitute for the parameter that is notified with the information relating to the first uplink power control.

For example, a parameter (a set) relating to cell-specific uplink power control may be set independently with the parameter relating to the first uplink power control and the parameter relating to the second uplink power control, and the transmission power for the uplink signal may be set. Furthermore, a parameter (a set) relating to UE-specific uplink power control may be set independently with the parameter relating to the first uplink power control and the parameter relating to the second uplink power control, and the transmission power for the uplink signal may be set. Furthermore, a parameter (a set) relating to the cell-specific or UE-specific uplink power control may be set independently with the parameter relating to the first uplink power control and the parameter relating to the second uplink power control, and the transmission power for the uplink signal may be set. Furthermore, the power control adjustment value that is obtained by the accumulation of the TPC command for an independent loop may be applied with the parameter relating to the first uplink power control and the parameter relating to the second uplink power control.

Figure 7:
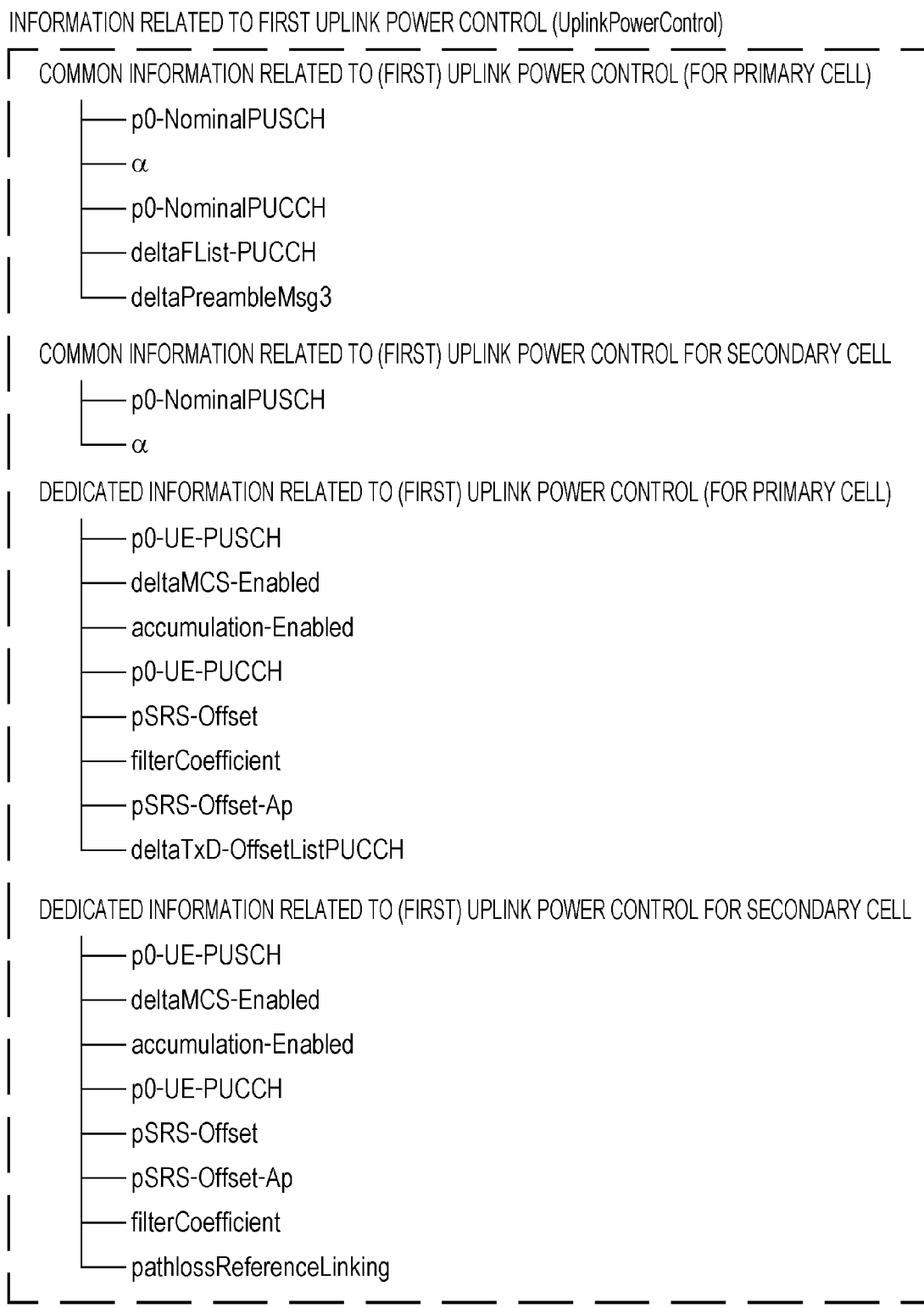
FIG. 7 is a diagram illustrating one example of a parameter (UplinkPowerControl) that is included in a parameter relating to a first uplink power control.

FIG. 7 is a diagram illustrating one example of a parameter that is included in the information (UplinkPowerControl) relating to first uplink power control. As the pieces of information relating to the first uplink power control, there are a shared parameter (a shared parameter (UplinkPowerControlCommon) relating to uplink power control) that is set to be cell-specific information (shared among the terminal devices 2 within a cell) and a dedicated parameter (dedicated information (UplinkPowerControlDedicated) relating to the uplink power control) that is set for every terminal device 2. As the shared parameters, there are nominal PUSCH power (p0-NominalPUSCH) that is PUSCH power which can be set to be cell-specific, an attenuation coefficient (a channel loss compensation coefficient) of fractional transmit power control α (alpha), nominal PUCCH power (p0-NominalPUCCH) that is PUCCH power which can be set to be cell-specific, power adjustment value (a power offset) $\Delta_{F\_PUCCH}$ (deltaFList-PUCCH) for every PUCCH format, and a power adjustment value (a power offset) (deltaPreambleMsg3) in a case where preamble message 3 is transmitted. Furthermore, as the dedicated parameters, there are UE-specific PUSCH power (p0-UE-PUSCH) that is PUSCH power which can be set to be UE-specific, a parameter (deltaMCS-Enabled) indicating whether a power adjustment value $K_s$ in compliance with a modulation coding scheme is enabled, a parameter (accumulationEnabled) indicating whether the accumulation is enabled, UE-specific PUCCH power (p0-UE-PUCCH) that is PUCCH power which can be set to be UE-specific, power offset $P_{SRS\_OFFSET}$ (pSRS-Offset or pSRS-OffsetAp) for the periodic SRS and the aperiodic SRS, and a filter coefficient (filterCoefficient) of received power (Reference Signal Received Power (RSRP)) for a reference signal. It is possible to set these parameters for a primary cell, but the same setting can also be notified to a secondary cell. Moreover, the dedicated parameters for the secondary cell may include a parameter (pathlossReferenceLinking) indicating that the primary cell performs calculation of a path loss using a path loss measurement reference signal for the secondary cell.

FIG. 8 is a diagram illustrating one example of shared information relating to the second uplink power control. Parameters that are notified with the shared information relating to the second uplink power (for the primary cell) or the shared information relating to the second uplink power control for the secondary cell may be notified in a state where all parameters that are illustrated in FIG. 8 are included. Furthermore, information elements that are included in the shared information relating to the second uplink power (for the primary cell) or the shared information relating to the second uplink power control for the secondary cell may include at least one parameter among all parameters that are illustrated in FIG. 8. Furthermore, the parameters that are notified with the shared information relating to the second uplink power control (for the primary cell) or the shared information relating to the second uplink power control for the secondary cell may not include any one of the parameters that are illustrated in FIG. 8. In such a case, the base station device 1 selects release and transmits information on the release to the terminal 2. Furthermore, the parameter that is not notified with the shared information relating to the second uplink power control may be set in the same manner as with the shared information relating to the first uplink power control. Moreover, in some cases, the parameter that is notified with the shared information may be referred to as the shared parameter.

FIG. 9 is a diagram illustrating one example of dedicated information relating to the first uplink power control and dedicated information relating to the second uplink power control. Parameters that are notified with the dedicated information relating to the first uplink power control for a primary cell/secondary cell may include a path loss reference resource that indicates the downlink reference signal (the downlink radio resource) for measuring a path loss. Furthermore, in addition to the parameters that are illustrated in FIG. 7, the parameters that are notified with the dedicated information relating to the second uplink power control for a primary cell/secondary cell may include the path loss reference resource. Parameters that are notified with the dedicated information relating to the second uplink power control (for the primary cell) or the dedicated information relating to the second uplink power control for the secondary cell may include all parameters that are illustrated in FIG. 9. Furthermore, the parameters that are notified with the dedicated information relating to the second uplink power control (for the primary cell) or the dedicated information relating to the second uplink power control for the secondary cell may include at least one parameter among all parameters that are illustrated in FIG. 9. Furthermore, any one of the parameters that are notified with the dedicated information relating to the second uplink power control (for the primary cell) or the dedicated information relating to the second uplink power control for the secondary cell may not set any one of the parameters that are illustrated in FIG. 9. In this case, the base station device 1 selects release, and transmits information on the release to the terminal device 2. Furthermore, the parameter that is not notified with the dedicated information relating to the second uplink power control may be set in the same manner as the parameter that is notified with the dedicated information relating to the first uplink power control. For example, in a case where the path loss reference resource is not notified in the dedicated parameter relating to the second uplink power control, calculation of the path loss may be performed based on the path loss reference resource that is notified with the dedicated information relating to the first uplink power control. Furthermore, in a case where the UE-specific PUSCH power is not notified in the dedicated information relating to the second uplink power control, the transmission power may be set based on the UE-specific PUSCH power that is notified with the dedicated information relating to the first uplink power control. Moreover, in some cases, the parameter that is notified with the dedicated information may be referred to as the dedicated parameter.

Moreover, the information relating to the first uplink power control and the information relating to the second uplink power control may be the terminal device 2, in a state of being included in the same information element or the same RRC message.

Fourth Modification Example of the First Embodiment

Next, a fourth modification example of the first embodiment is described. According to the fourth modification example of the first embodiment, the base station device 1 transmits the information relating to the first configuration and/or the information relating to the second configuration to the terminal device 2. Furthermore, the base station device 1 sets a DCI format 3B that includes the extended TPC command, for a DCI format 3/3A, and transmits the DCI format 3/3A to the terminal device 2. In a case where both of the first configuration and the second configuration are set, the terminal device 2 can read the received DCI format 3/3A as the DCI format 3B. In a case where only either of the first configuration and the second configuration is set, the terminal device 2 can set the transmission power for the uplink signal based on the DCI format that indicates the unextended TPC command. In the case where both of the first configuration and the second configuration are set, the terminal device 2 can set the transmission power for the uplink signal based on the DCI format that indicates the extended TPC command.

When the first configuration and the second configuration are set, the terminal device 2 recognizes a TPC command number which is included in the DCI format 3B, according to the bits size of the extended TPC command. For example, if it is assumed that a payload size of a DCI format 0 is L, a TPC command number is N, a bit size is M, the TPC command number that is set for the DCI format 3B is obtained with N=FLOOR (L/M). A TPC index is set for the DCI format 3B, independently of the DCI format 3/3A. Moreover, the DCI format 3B may be allocated only to the CSS of the EPDCCH. Furthermore, the DCI format 3B may be allocated to the PDCCH or the USS of the EPDCCH.

Furthermore, the identifier (the TPC-RNTI) for identifying the DCI format relating to the TPC command may be set for a new DCI format (the DCI format 3B) relating to the extended TPC command, independently of the DCI format 3/3A. Furthermore, the TPC index of the DCI format 3B may be set independently of the DCI format 3/3A.

According to the first embodiment, based on the first configuration and the second configuration, even in a case where two subframe set are configured, the terminal device 2 can perform the transmit power control that is common to different subframe sets.

According to the first to fourth modification example of the first embodiment, when the first configuration and the second configuration are set, the terminal device 2 recognizes that the DCI format is extended and thus may perform processing. Furthermore, when the first configuration and the second configuration are set, the terminal device 2 recognizes that a field of one portion of the DCI format is switched, and may perform processing. Furthermore, when the first configuration and the second configuration are set, the terminal device 2 recognizes that a new field (a control information field, a control field, an information bit field, or a bit field) is included in the DCI format, and may perform processing.

Moreover, according to the first embodiment, in a case where the first configuration and the second configuration are set for the terminal device 2, when it is assumed that the DCI format in which the new control information field is not included is a first DCI format, and that the DCI format in which the new control information field is set is a second DCI format, the second DCI format may be transmitted on the UE-specific search spaces (USS) of the PDCCH (first downlink control channel region) and/or the EPDCCH (a second downlink control channel region). Furthermore, the second DCI format may be transmitted on the common search space (CSS) of the EPDCCH. To be more precise, even in a case where the first configuration and the second configuration are set for the terminal device 2, the first DCI format is transmitted on the CSS of the PDCCH.

According to information (a condition) that is set for the terminal device 2, the terminal device 2 can perform suitable transmit power control by switching the transmit power control for the uplink signal, without depending on the setting of the transmission subframe.

Basic Mode of a Second Embodiment

Next, a basic mode of a second embodiment is described. According to the basic mode of the second embodiment, the base station device 1 transmits information relating to the first configuration and/or information relating to the second configuration to the terminal device 2. In a case where either of the first configuration and the second configuration is set, the terminal device 2 sets the transmission power for the uplink signal based on the parameter relating to the first uplink power control and in a case where both of the first configuration and the second configuration are set, the terminal device 2 sets the first subframe set and the second subframe set based on the first configuration and the second configuration. In such cases, the terminal device 2 sets the transmission power for the uplink signal that is transmitted on the uplink subframe which belongs to the first subframe set, based on the parameter relating to the first uplink power control, and sets the transmission power for the uplink signal that is transmitted on the uplink subframe which belongs to the second subframe set, based on the parameter relating to the second uplink power control.

Figure 10:
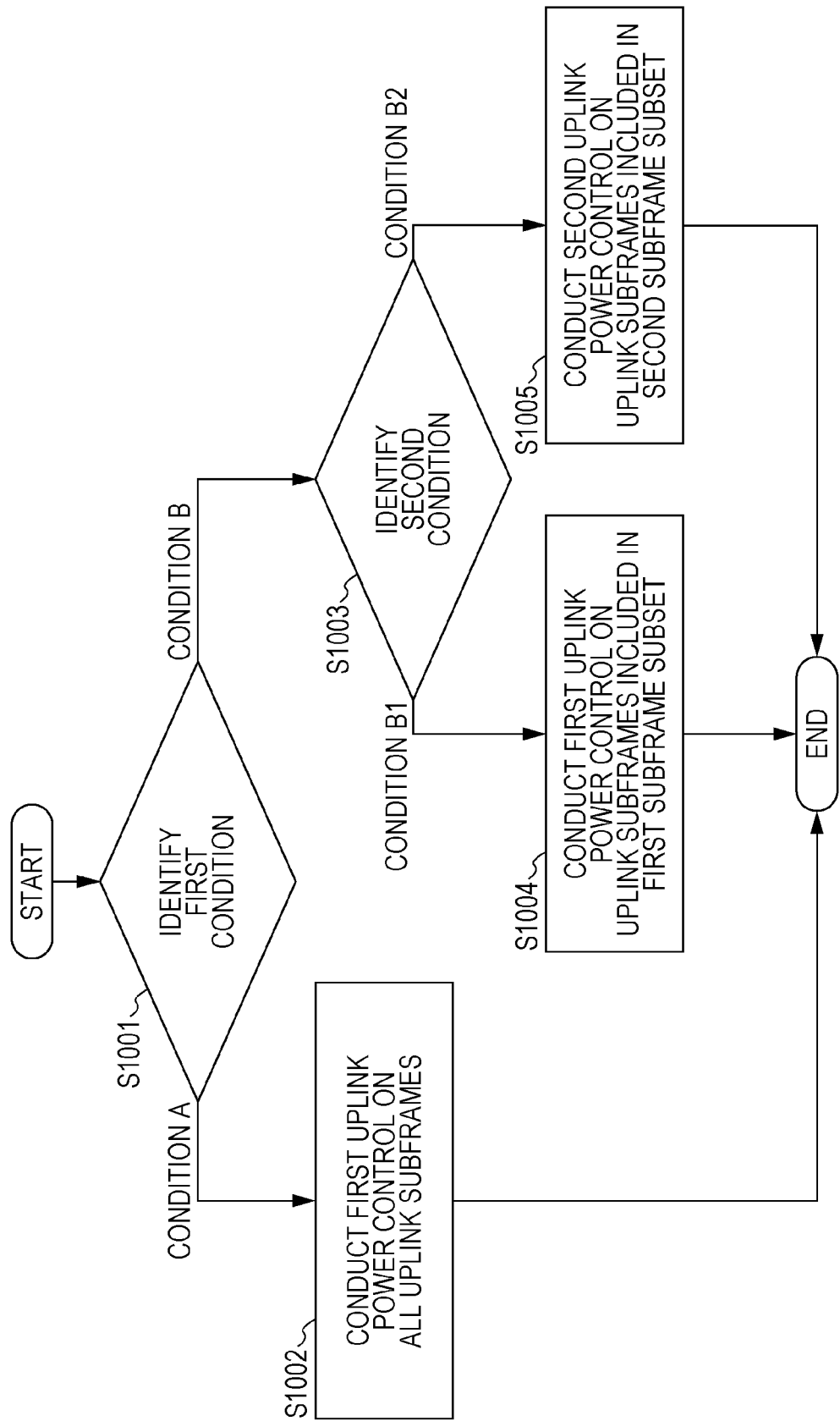
FIG. 10 is a flowchart illustrating a processing procedure that is performed by the terminal device 2 according to a basic mode of a second embodiment of the present invention.

FIG. 10 is a flowchart relating to the basic mode of the second embodiment. The terminal device 2 identifies a first condition (Step S1001). In a case of condition A, the terminal device 2 sets the transmission power based on the parameter relating to the first uplink power control, for all the uplink subframes (Step S1002). In a case of condition B, additionally, a second condition is identified (S1003). In a case of condition B1, the terminal device 2 sets the transmission power based on the parameter relating to the first uplink power control for the uplink subframe that belongs to the first subframe set (Step S1004). In a case of condition B2, the terminal device 2 sets the transmission power based on the parameter relating to the second uplink power control for the uplink subframe that belongs to the second subframe set (Step S1005). At this point, condition A is a case where either of the first configuration and the second configuration is set, and condition B is a case where the first configuration and the second configuration are set. Additionally, condition B1 is a case where the parameter relating to the uplink power control for the uplink subframe that belongs to the first subframe set is set independently, and condition B2 is a case where the parameter relating to the uplink power control for the uplink subframe that belongs to the second subframe set is set independently. At this point, the first subframe set and the second subframe set may be set based on the first configuration and the second configuration.

In a case where a new control information field for the uplink power control is set for the downlink control information format, this is done only for the transmission for a specific subframe according to the second embodiment. To be more precise, in the case where either of the first configuration and the second configuration is set, the downlink control information formats do not include the new control information field. The downlink control information formats, which correspond to the uplink subframe that belongs to the first subframe set for the terminal device 2 in which the first configuration and the second configuration are set, do not include the new control information field. Furthermore, the downlink control information formats, which correspond to the uplink subframe that belongs to the second subframe set for the terminal device 2 in which both of the first configuration and the second configuration are set, may include the new control information field.

First Modification Example of the Second Embodiment

Next, a first modification example of the second embodiment is described. According to the second modification example of the first embodiment, the base station device 1 transmits the information relating to the first configuration and/or the information relating to the second configuration to the terminal device 2. When the first configuration and the second configuration are set, the terminal device 2 recognizes the field relating to the TPC command that is included in the uplink grant (the downlink control information format) for transmitting the uplink signal on the uplink subframe which belongs to the first subframe set, as the field relating to the first TPC command, and performs the reception processing. Furthermore, the terminal device 2 recognizes the field relating to the TPC command that is included in the uplink grant (the downlink control information format) for transmitting the uplink signal on the uplink subframe which belongs to the second subframe set, as the field relating to the second TPC command, and performs the reception processing. The terminal device 2 sets the transmission power for the uplink signal based on the power control adjustment value that is obtained by the first TPC command or the second TPC command.

In a case where either of the first configuration and the second configuration is set, the terminal device 2 set the transmission power based on the field relating to the first TPC command for the all the uplink subframes. Furthermore, in the case where the first configuration and the second configuration are set, the terminal device 2 sets the transmission power for the uplink signal that is transmitted on the uplink subframe which belongs to the first subframe set, based on the power control adjustment value that is obtained by the field relating to the first TPC command, and sets the transmission power for the uplink signal that is transmitted on the uplink subframe which belongs to the second subframe set, based on the power control adjustment value that is obtained by the field relating to the second TPC command. Moreover, because the first TPC command and the second TPC command are the same as those in the first modification example of the first embodiment, descriptions thereof are omitted here.

In a case where the accumulation of the TPC command is performed for every subframe set, the accumulation of the TPC command may be performed independently with the TPC command of the DCI format that corresponds to each of the subframe sets. For example, the TPC command field of the DCI format that corresponds to the first subframe set and the TPC command field of the DCI format that corresponds to the second subframe set may have different sizes (bit sizes). At this time, the bits size itself of the DCI format may be the same in the first subframe set and the second subframe set. Furthermore, the DCI format may also be extended only by the TPC command field being extended.

Second Modification Example of the Second Embodiment

Next, a second modification example of the second embodiment is described. According to the second modification example of the second embodiment, the base station device 1 transmits the information relating to the first configuration and/or the information relating to the second configuration to the terminal device 2. Furthermore, the base station device 1 transmits information relating to a predetermined power offset to the terminal device 2. In a case where the information relating to the first configuration and the information relating to the second configuration are received, and if information relating to a predetermined power offset is received, the terminal device 2 sets the transmission power for the uplink signal that is transmitted on the uplink subframe which belongs to the second subframe set, based on the predetermined power offset. Moreover, in a case where the information relating to the predetermined power offset is not received, the terminal device 2 sets the transmission power for the uplink signal that is transmitted on the uplink subframe which belongs to the first subframe set and the second subframe set, without considering the predetermined power offset. For example, the predetermined power offset is a power ratio between the transmission power for the uplink signal that is transmitted on the first subframe set and the transmission power for the uplink signal that is transmitted on the second subframe set. Furthermore, the predetermined power offset may be a power difference in the transmission power between the uplink signals that are transmitted on the first subframe set and on the second subframe set.

Furthermore, when either of the first configuration and the second configuration is set, the terminal device 2 sets the transmission power for the uplink signal for all the uplink subframes, without considering the predetermined power offset. When the first configuration and the second configuration are set, the terminal device 2 sets the transmission power for the uplink signal that is transmitted on the uplink subframe which belongs to the first subframe set without the predetermined power offset, and sets the transmission power for the uplink signal that is transmitted on the uplink subframe which belongs to the second subframe set, based on the predetermined power offset.

Moreover, a parameter relating to the uplink power control other than the predetermined power offset may be common to the first subframe set and the second subframe set. To be more precise, a parameter other than the predetermined power offset may be set based on the parameter that is notified with the information relating to the same uplink power control.

Moreover, as another example, when either of the first configuration and the second configuration is set, the downlink control information format (for example, the DCI format 0) relating to the uplink for the all the uplink subframes does not include the field indicating whether or not a predetermined power offset is applied. Furthermore, when the first configuration and the second configuration are set, the terminal device 2 can recognize that the field indicating whether or not the predetermined power offset is applied is not added to the downlink control information format (for example, the DCI format 0) relating to the uplink for the uplink subframe that belongs to the first subframe set and that the field indicating whether or not the predetermined power offset is applied is added to the downlink control information format (for example, the DCI format 0) relating to the uplink for the uplink subframe that belongs to the second subframe set. In a case where it is indicated with the DCI format that the uplink power offset is applied, the terminal device 2 sets the transmission power for the uplink signal based on the uplink power offset. Moreover, the predetermined power offset may be applied only in a case where the uplink signal is transmitted on a subframe that is equivalent to a flexible subframe (a specific type subframe). At this point, in a case where, in each of the first configuration and the second configuration, different types of subframes are set for the same subframe (one subframe), such as an uplink subframe and a downlink subframe, a downlink subframe and a special subframe, or an uplink subframe and a special subframe, in some cases, such subframes are referred to as flexible subframes. To be more precise, the flexible subframe is a subframe that can be processed as a different type of subframe according to a situation.

Third Modification Example of the Second Embodiment

Next, a third modification example of the second embodiment is described. According to the third modification example of the second embodiment, the base station device 1 transmits the information relating to the first configuration and/or the information relating to the second configuration to the terminal device 2. Furthermore, the base station device 1 transmits the information relating to the first uplink power control and/or the information relating to the second uplink power control to the terminal device 2. In a case where the information relating to the first configuration and the information relating to the second configuration are received, if the parameter relating to the first uplink power control and the parameter relating to the second uplink power control are set, the terminal device 2 sets the transmission power for the uplink signal that is transmitted on the uplink subframe which belongs to the first subframe set, based on the parameter relating to the first uplink power control, and sets the transmission power for the uplink signal that is transmitted on the uplink subframe which belongs to the second subframe set, based on the parameter relating to the second uplink power control. Moreover, in a case where only either of the parameter relating to the first uplink power control and the parameter relating to the second uplink power control is set, the terminal device 2 sets the transmission power for the uplink signal that is transmitted on the uplink subframe which belongs to the first subframe set and the second subframe set, based on the received parameter relating to the uplink power control. To be more precise, the transmission power for the uplink signal is set based on one parameter (one set) relating to the uplink power control, for all the uplink subframes. At this time, in a case where the parameter relating to the first uplink power control and the parameter relating to the second uplink power control are set, the transmission power for the uplink signal is set based on either of the parameter relating to either of the first uplink power control and the second uplink power control. Moreover, because the parameter relating to the first uplink power control and the parameter relating to the second uplink power control are the same as those in the third modification example of the first embodiment, and a description thereof are omitted here.

Furthermore, when the first configuration and the second configuration are set, the terminal device 2 sets the transmission power for the uplink signal that is transmitted on the uplink subframe which belongs to the first subframe set, based on the parameter relating to the first uplink power control, and sets the transmission power for the uplink signal that is transmitted on the uplink subframe which belongs to the second subframe set, based on the parameter relating to the second uplink power control.

Moreover, in a case where the parameter that is not notified with the information relating to the second uplink power control is present, the terminal device 2 may set the transmission power for the uplink signal using the parameter that is notified with the information relating to the first uplink power control. Moreover, with the information relating to the second uplink power control, the parameter relating to the power offset between subframes (or the subframe sets) may be notified.

According to the third modification example of the second embodiment, the base station device 1 transmits the information relating to the first configuration and/or the information relating to the second configuration to the terminal device 2. Furthermore, the base station device 1 transmits the information relating to the first uplink power control and/or the information relating to the second uplink power control to the terminal device 2. When the first configuration and the second configuration are set, the terminal device 2 can configure the first subframe set and the second subframe set, based on the first configuration and the second configuration. Additionally, when the parameter relating to the first uplink power control and the parameter relating to the second uplink power control are set, in a case where the uplink signal is transmitted on the uplink subframe that belongs to the first subframe set, the terminal device 2 sets the transmission power for the uplink signal based on the parameter that is notified with the information relating to the first uplink power control. Furthermore, in a case where the uplink signal is transmitted on the uplink subframe that belongs to the second subframe set, the terminal device 2 sets the transmission power for the uplink signal based on the parameter that is notified with the information relating to the second uplink power control.

Moreover, as another example, when only either of the first configuration and the second configuration is set, the field indicating the switching between the parameter relating to the first uplink power control and the parameter relating to the second uplink power control is not included in the downlink control information format (for example, the DCI format 0 or the DCI format 4) relating to the uplink for all the uplink subframes. Furthermore, when the first configuration and the second configuration are set, the terminal device 2 can recognize that the field indicating the switching between the parameter relating to the first uplink power control and the parameter relating to the second uplink power control is not included in the downlink control information format (for example, the DCI format 0 or the DCI format 4) relating to the uplink for the uplink subframe that belongs to the first subframe set, and that the field indicating the switching between the parameter relating to the first uplink power control and the parameter relating to the second uplink power control is included in the downlink control information format (for example, the DCI format 0 or the DCI format 4) relating to the uplink for the uplink subframe that belongs to the second subframe set.

Moreover, according to the third modification example of the second embodiment, it may be independently set whether or not the accumulation of the TPC command is performed for every subframe set. To be more precise, the transmit power control (accumulation transmit power control or absolute transmit power control) by the TPC command may be performed independently for every subframe set. At this time, in a case where, for the accumulation transmit power control in each subframe set, power ($P_{0-UE-PUSCH}$, $P_{0-UE-PUCCH}$) for the physical channel (the PUSCH or the PUCCH), which is included in the information relating to the uplink power control that corresponds to each subframe set, and which is set for every terminal device 2, is re-set (changed), the terminal device 2 may initialize (re-set) the power control adjustment value (a total value, an accumulation value, an integration value, or an addition value) that is obtained by the accumulation of the TPC command. Furthermore, in a case where a random access response message is received on the downlink subframe that corresponds to the uplink subframe which belongs to each subframe set, terminal device 2 may initialize (re-set) the power control adjustment value (the power control adjustment value that corresponds to each subframe set) that is obtained by the accumulation of the TPC command which corresponds to each subframe set. Moreover, re-setting the power control adjustment value and re-setting the accumulation may have the same meaning.

Fourth Modification Example of the Second Embodiment

Next, a fourth modification example of the second embodiment is described. According to the fourth modification example of the second embodiment, the base station device 1 transmits the information relating to the first configuration and/or the information relating to the second configuration to the terminal device 2. Furthermore, the base station device 1 can transmit the DCI format (the DCI format 3B) in which a value is set for the extended TPC command, to the terminal device 2 in which the first configuration and the second configuration can be set, with the DCI format being arranged in the PDCCH/EPDCCH. In the case where only either of the first configuration and the second configuration is set, the terminal device 2 performs the reception processing with the format as the DCI format (the DCI format 3/3A) in which the unextended TPC command is included, and sets the transmission power for the uplink signal based on the power control adjustment value that is obtained from the TPC command which is included in the DCI format 3/3A. Furthermore, in a case where the first configuration and the second configuration are set, the terminal device 2 sets the transmission power for the uplink signal based on the power control adjustment value that is obtained from the TPC command which is included in the DCI format 3/3A, for the uplink subframe that belongs to the first subframe set, and sets the transmission power for the uplink signal based on the DCI format (the DCI format 3B) in which the extended TPC command is included, for the uplink subframe that belongs to the second subframe set. Because a definition of the DCI format 3B is the same as that in the fourth modification example of first embodiment, and a description thereof is omitted here.

Basic Mode of a Third Embodiment

Next, a basic mode of a third embodiment is described. According to the basic mode of the third embodiment, the base station device 1 transmits information relating to the first configuration and/or information relating to the second configuration to the terminal device 2. Furthermore, the base station device 1 transmits to the terminal device 2 the physical downlink control channel (the PDCCH or the EPDCCH) that includes a first grant, the physical downlink control channel that has a second grant, and/or the physical downlink control channel that has a third grant. At this point, the grant may be the DCI format. Furthermore, the physical downlink control channel that includes the grant and the physical downlink control channel that is accompanied by the grant may have the same meaning. That is, in the physical downlink control channel (through the physical downlink control channel), the grant is transmitted. In a case where either of the first configuration and the second configuration is set, when the transmission of the uplink signal (the uplink physical channel) is indicated by the first grant (a transmission resource is allocated and the uplink signal is scheduled), the terminal device 2 sets the transmission power for the uplink signal based on the parameter relating to the first uplink power control. Furthermore, in the case where both of the first configuration and the second configuration are set, when the transmission of the uplink signal (the uplink physical channel) is indicated by the first grant (the transmission resource is allocated and the uplink signal is scheduled), the terminal device 2 sets the transmission power for the uplink signal based on either of the parameter relating to the first uplink power control and the parameter relating to the second uplink power control. At this time, the transmission power for the uplink signal of which the transmission is indicated by the second grant may be controlled in the same manner as the transmit power control for the uplink signal of which the transmission is indicated by the first grant. Furthermore, the transmission power for the uplink signal of which the transmission is indicated by the third grant may be set based on the parameter relating to the third uplink power control, without depending on the information that is notified.

To be more precise, although the grants of the same type are present, the terminal device 2 can set the transmission power based on parameters relating to multiple types of uplink power control, according to the information that is set for the terminal device 2. To be more precise, in the case where either of the first configuration and the second configuration is set, the terminal device 2 sets the transmission power for the uplink signal (the uplink physical channel) that corresponds to the first grant, based on the parameter relating to the first uplink transmit power control. In the case where both of the first configuration and the second configuration are set, the terminal device 2 sets the transmission power for the uplink signal that corresponds to the first grant, based on either of the parameter relating to the first uplink power control and the parameter relating to the second uplink power control. At this time, the transmission power for the uplink signal that corresponds to the third grant is always set based on the parameter relating to the third uplink power control, without depending on whether or not the first configuration and/or the second configuration are set.

As the grants (uplink grants) relating to the uplink, there are a semi-persistent grant (semi-persistent scheduling grant), a dynamic scheduled grant, and a random access response grant. The semi-persistent grant is used for indicating transmission of periodic (regular or static) data. At this point, the semi-persistent grant includes the DCI format to which the CRC parity bit scrambled by the SPS C-RNTI is attached. The semi-persistent grant is used for indicating transmission of user data and resource allocation. At this point, the dynamic scheduled grant includes the DCI format to which the CRC parity bit scrambled by the C-RNTI is attached. The random access response grant is used for indicating transmission of data that includes user information (information of the terminal device 2) and resource allocation for the transmission of the data, in response to the random access response that is transmitted from the base station device 1. As described above, a random accelerator response grant includes the random access response grant in the contention-based random access procedure. Transmission of these pieces of data is performed using the PUSCH. To be more precise, these grants include resource allocation to the PUSCH, indication of the transmission of the PUSCH, scheduling of the PUSCH.

At this point, the indication of the transmission of the PUSCH by the semi-persistent grant includes indication of the resource allocation to the PUSCH by the semi-persistent grant or indication of the scheduling of the PUSCH. The indication of the transmission of the PUSCH by the dynamic scheduled grant includes indication of the resource allocation to the PUSCH by the dynamic scheduled grant or indication of the scheduling of the PUSCH. The indication of the transmission of the PUSCH by the random access response grant includes indication of the resource allocation to the PUSCH by the random access response grant or indication of the scheduling of the PUSCH. To be more precise, the indication of the transmission of the PUSCH by each grant includes indication of the resource allocation to the PUSCH by each grant or indication of the scheduling of the PUSCH.

For example, in a case where only either of the first configuration and the second configuration is set based on the received information, when the PUSCH is scheduled by the dynamic scheduled grant, the terminal device 2 sets the transmission power for the PUSCH based on the first uplink power control (a first uplink power control method or a parameter relating to the first uplink power control). In a case where both of the first configuration and the second setting is set, when the PUSCH is scheduled by the dynamic scheduled grant, the terminal device 2 sets the transmission power for the PUSCH based on the second uplink power control (a second uplink power control method or a parameter relating to the second uplink power control). At this time, in a case where the transmission of the SRS is requested by the same grant (a positive SRS request is detected), the transmission power for the SRS is set based on the uplink power control that is applied to the PUSCH. Furthermore, even in a case where the PUSCH is scheduled by the semi-persistent grant, the transmission power for the PUSCH may be set by performing the same processing. At this point, various power control parameters that are included in the information relating to the first uplink power control or the information relating to the second uplink power control may be the same as the parameters in FIG. 7, 8, or 9.

Furthermore, in a case where either of the first configuration and the second configuration is set based on the received information, the transmission power for the PUSCH that is scheduled by the random access response grant is set based on the parameter relating to the third uplink power control. Even in a case where both of the first configuration and the second configuration are set based on the received information, the transmission power for the PUSCH is set based on the parameter relating to the third uplink power control. To be more precise, in this case, the terminal device 2 sets the transmission power that is scheduled by the random access response grant, based on the parameter relating to common uplink power control, without depending on the configuration that is set.

Moreover, each of the information relating to the first uplink power control, the information relating to the second uplink power control, the information relating to the third uplink power control, and various parameters that are notified with these pieces of information may be notified independently. Furthermore, the parameter that is notified with the information relating to the first uplink power control and the parameter that is notified with the information relating to the second uplink power control are may be notified based on an example that is illustrated in FIG. 7, 8, or 9. Furthermore, the parameter that is notified with the information relating to the third uplink power control may be notified with the information relating to setting of the random access channel.

Independent parameters (preamble Initial Received Target Power ($P_{0\_PRE}$) and $\Delta_{PREAMBLE\_Msg3}$) may be set for information relating to the transmit power control for the uplink signal that corresponds to the random access response grant. Furthermore, a dedicated TPC command ($\delta_{msg2}$) may be applied to the uplink transmission power that corresponds to the random access response grant.

In a case where multiple pieces of information relating to the transmit power control for the uplink signal that corresponds to the random access response grant are set independently, processing may be performed in the same manner as with the transmit power control for the uplink signal that corresponds to a different grant.

That is, according to a type of received grant, switching between one type of uplink power control and two types of uplink power control is performed.

Moreover, according to the basic mode of the third embodiment, there are a grant that enables switching between two uplink power control methods depending on whether or not both of the first configuration and the second configuration are set and a grant that enables application of the same uplink power control method without depending on whether or not both of the first configuration and the second configuration are set. The grant that enables performing of suitable power control, considering interference, and the grant that enables performing of power control, without considering the interference, can be distinguished.

When the uplink signal is scheduled by the dynamic scheduled grant or the semi-persistent grant, the terminal device 2 in which either of the first configuration and the second configuration is set sets the transmission power for the uplink signal based on the first uplink power control method (the parameter relating to the first uplink power control). Furthermore, when the uplink signal is scheduled by the dynamic scheduled grant or the semi-persistent grant, the terminal device 2 in which both of the first configuration and the second configuration are set sets the transmission power for the uplink signal based on the second uplink power control method (the parameter relating to the second uplink power control). Furthermore, when the uplink signal is scheduled by the random access response grant, the terminal device 2 always sets the transmission power for the uplink signal based on the third uplink power control method (the parameter relating to the third uplink power control) without depending on the configuration that is set.

Modification Example of the Third Embodiment

Next, a modification example of the third embodiment is described. According to the modification example of the third embodiment, the base station device 1 transmits the information relating to the first configuration and/or the information relating to the second configuration to the terminal device 2. Furthermore, the base station device 1 transmits to the terminal device 2 the physical downlink control channel (the PDCCH or the EPDCCH) that includes the first grant, the physical downlink control channel that has the second grant, and/or the physical downlink control channel that has the third grant. In a case where either of the first configuration and the second configuration is set based on the received information, when the transmission of the uplink signal (the uplink physical channel) is indicated by the first grant (the transmission resource is allocated and the uplink signal is scheduled), the terminal device 2 sets the transmission power for the uplink signal based on the parameter relating to the first uplink power control. Furthermore, in a case where both of the first configuration and the second configuration are set based on the received information, the terminal device 2 can configure the first subframe set and the second subframe set. When the transmission of the uplink signal (the uplink physical channel) for the uplink subframe that belongs to the first subframe set is indicated by the first grant (the transmission resource is allocated and the uplink signal is scheduled), the terminal device 2 sets the transmission power for the uplink signal based on the parameter relating to the first uplink power control. When the transmission of the uplink signal (the uplink physical channel) for the uplink subframe that belongs to the second subframe set is indicated by the first grant (the transmission resource is allocated and the uplink signal is scheduled), the terminal device 2 sets the transmission power for the uplink signal based on the parameter relating to the second uplink power control.

At this point, in the case where the first configuration and the second configuration are set, when the random access response message is received, the terminal device 2 may set initialize (re-set) the power control adjustment value that is obtained by the accumulation of the TPC command that is included in the first uplink power control and/or the second uplink power control. Furthermore, in a case where UE-specific power parameter ($P_{0\_U\_EPUSCH}$, $P_{0\_UE\_PUCCH}$) is set for each of the information relating to the uplink power control and the information relating to the second uplink power control for the terminal device 2, when these power parameters are re-set (value-changed), the power control adjustment value that is obtained by the accumulation of the TPC command which is included in each of the first uplink power control and the second uplink power control may be initialized (re-set). That is, in a case where a certain condition is satisfied, the terminal device 2 re-sets the power control adjustment value that corresponds to each of the first uplink power control and the second uplink power control.

At this point, in a case where the transmit power control for the uplink signal that is scheduled by the random access response grant is common to the first subframe set and the second subframe set, that is, to multiple subframe sets, when the random access message is received, the terminal device 2 re-sets the power control adjustment value that is obtained by the accumulation. To be more precise, although the power control by the accumulation is independently performed with multiple subframe sets, the accumulation value that is obtained by each accumulation may be re-set.

Furthermore, in a case where the UE-specific power parameter ($P_{0\_UE\_PUSCH}$, $P_{0\_UE\_PUCCH}$) that is notified with the information relating to the first uplink power control and the information relating to the second uplink power control is common, when the UE-specific power parameter is re-set (a value is changed), the accumulation value by the accumulation is re-set. To be more precise, although the power control by the accumulation is independently performed for multiple subframe sets, the accumulation value that is obtained by each accumulation may be re-set.

In the case where both of the first configuration and the second configuration are set, when the PUSCH is scheduled by the semi-persistent grant, if the transmission subframe for the PUSCH is the fixed subframe (the first subframe), that is, if the PUSCH is scheduled for the fixed subframe, the terminal device 2 sets the transmission power for the PUSCH that corresponds to the semi-persistent grant, based on a parameter (for example, $P_{0\_NOMINAL\_PUSCH}$, $P_{0\_UE\_PUSCH}$, $\alpha$) that is notified with the information relating to the first uplink power control. Furthermore, if the transmission subframe for the PUSCH is the flexible subframe (the second subframe), that is, if the PUSCH is scheduled for the flexible subframe, the terminal device 2 sets the transmission power for the PUSCH that corresponds to the semi-persistent grant, based on a parameter (for example, $P_{0\_NOMINAL\_PUSCH}$, $P_{0\_UE\_PUSCH}$, $\alpha$) that is set for the information relating to the second uplink power control.

In the case where both of the first configuration and the second configuration are set, when the PUSCH is scheduled by the dynamic scheduled grant, if the transmission subframe for the PUSCH is the fixed subframe (the first subframe), that is, if the PUSCH is scheduled for the fixed subframe, the terminal device 2 sets the transmission power for the PUSCH that corresponds to the dynamic scheduled grant, based on a parameter (for example, $P_{0\_NOMINAL\_PUSCH}$, $P_{0\_UE\_PUSCH}$) that is notified with the information relating to the first uplink power control. Furthermore, if the transmission subframe for the PUSCH is the flexible subframe (the second subframe), that is, if the PUSCH is scheduled for the flexible subframe, the terminal device 2 sets the transmission power for the PUSCH that corresponds to the dynamic scheduled grant, based on a parameter (for example, $P_{0\_NOMINAL\_PUSCH}$, $P_{0\_UE\_PUSCH}$, $\alpha$) that is notified with the information relating to the second uplink power control.

In the case where both of the first configuration and the second configuration are set, when the PUSCH is scheduled by the random access response grant, the terminal device 2 sets the transmission power for the PUSCH that corresponds to the random access response grant, based on the parameter that is notified with the information relating to the same uplink power control, without depending on whether or not the transmission subframe for the PUSCH is the fixed subframe or the flexible subframe.

According to the modification example of the third embodiment, for the transmission power for the uplink signal, the uplink power control method is switched by the corresponding grant, according to the subframe set, and the same uplink power control method is applied to the transmission power for the uplink signal that corresponds to the second grant, without depending on the subframe set.

At this point, in a case where the grant and the DCI format 3/3A are detected with the same subframe, the terminal device 2 can switch between applying the TPC command that is set to be in the grant and apply the TPC command that is transmitted in the DCI format 3/3A, depending on which subframe the uplink signal that is scheduled by the grant corresponds to.

For example, in a case where the grant and the DCI format 3/3A are detected in the same subframe, if the grant schedules the uplink signal for the uplink subframe that belongs to a subset of fixed subframes, the terminal device 2 sets the transmission power for the uplink signal that corresponds to the grant, using the power control adjustment value that is obtained by the TPC command which is included in the grant. Furthermore, if the grant schedules the uplink signal for the uplink subframe that belongs to a subset of flexible subframes, the terminal device 2 sets the transmission power for the uplink signal that corresponds to the grant, using the power control adjustment value that is obtained by the TPC command which is included in the grant, and sets virtual transmission power for the uplink signal for the fixed subframe, using the power control adjustment value that is obtained by the TPC command which is included in the DCI format 3/3A.

In a case where the semi-persistent grant and the DCI format 3/3A are detected in the same subframe, the terminal device 2 sets the transmission power based on the TPC command that is included in the semi-persistent grant, without depending on whether the transmission subframe for the PUSCH that corresponds to the semi-persistent grant is a fixed subframe or a flexible subframe.

In a case where the dynamic scheduled grant and the DCI format 3/3A are detected in the same subframe, if the transmission subframe for the PUSCH that corresponds to the dynamic scheduled grant is the fixed subframe, the terminal device 2 sets the transmission power based on the TPC command that is included in the dynamic scheduled grant. Furthermore, if the transmission subframe for the PUSCH that corresponds to the dynamic scheduled grant is the flexible subframe, the terminal device 2 sets the transmission power based on the TPC command that is included in the dynamic scheduled grant, and sets the virtual transmission power based on the TPC command that is included in the DCI format 3/3A.

In a case where the random access response grant and the DCI format 3/3A are detected in the same subframe, the terminal device 2 sets the transmission power based on the TPC command that is included in the random access response grant, without depending on whether the transmission subframe for the PUSCH that corresponds to the random access response grant is a fixed subframe or a flexible subframe.

Moreover, an independent uplink power control method may be applied to the terminal device 2, in a case where the first configuration and the second configuration are set, in a case where the uplink signal is scheduled in the downlink control information (DCI) format that is detected in a common search space (CSS), and in a case where the uplink signal is scheduled in the downlink control information format that is detected in a UE-specific search space (USS). To be more precise, in the case where both of the first configuration and the second configuration are set, when the uplink signal is scheduled in the DCI format that is detected in the CSS, the terminal device 2 sets the transmission power for the uplink signal based on the first uplink control method. Furthermore, when the uplink signal is scheduled in the DCI format that is detected in the USS, the terminal device 2 sets the transmission power for the uplink signal based on the second uplink power control method. Furthermore, when the uplink signal is scheduled in the DCI format that is detected in the USS, the transmission power for the uplink signal may be set based on the first uplink power control method or the second uplink power control method.

Furthermore, in a case where the uplink signal is scheduled for the uplink subframe that belongs to the first subframe set, in the DCI format that is detected in the USS, and in a case where the uplink signal is scheduled for the uplink subframe that is included in the second subframe set, the transmit power control (the accumulation transmit power control or the absolute transmit power control) by the TPC command that is set in the DCI format may be independently performed.

Furthermore, in a case where the uplink signal is scheduled in the DCI format that is detected in the CSS, terminal device 2 may set the transmission power based on a common parameter, without depending on the first subframe set and the second subframe set.

Basic Mode of a Fourth Embodiment

Next, a basic mode of a fourth embodiment is described. According to the basic mode of the fourth embodiment, the base station device 1 transmits information relating to the first configuration and/or information relating to the second configuration to the terminal device 2. Furthermore, the base station device 1 adds the cyclic redundancy check (CRC) parity bit(s) that is scrambled by a first identifier or the CRC parity bit that is scrambled by a second identifier, to the downlink control information (DCI) format, and transmits a result of the addition to the terminal device 2 on the physical downlink control channel (PDCCH or the EPDCCH). In the case where either of the first configuration and the second configuration is set based on the received information, when it is assumed that the CRC parity bit that is attached to the DCI format is scrambled with the first identifier, the terminal device 2 sets the transmission power for the uplink signal based on the first uplink power control. Furthermore, the CRC parity bit that is attached to the DCI format is scrambled with the second identifier, the terminal device 2 sets the transmission power for the uplink signal based on the second uplink power control. Furthermore, in the case where both of the first configuration and the second configuration are set based on the received information, when it is assumed that the CRC parity bit that is attached to the DCI format is scrambled with the first identifier, the terminal device 2 sets the transmission power for the uplink signal based on the third uplink power control. Furthermore, the CRC parity bit that is attached to the DCI format is scrambled with the second identifier, the terminal device 2 sets the transmission power for the uplink signal based on the second uplink power control. To be more precise, the terminal device 2 can switch the uplink power control according to information that is set and a type of identifier with which the CRC parity bit that is attached to the DCI format is scrambled. Moreover, the CRC parity bit may be simply referred to as CRC.

Furthermore, in some cases, the CRC that is scrambled using the first identifier is referred to as first CRC, the CRC that is scrambled using the second identifier is referred to as second CRC, and the CRC that is scrambled using an n-th identifier (n is a natural number) is referred to as n-th CRC.

Furthermore, in some cases, the DCI format to which the first CRC is attached is referred to as the first DCI format, the DCI format to which the second CRC is attached is referred to as the second DCI format, and the DCI format to which the n-th CRC is attached is referred to as an n-th DCI format.

Moreover, according to the present invention, in some cases, the identifier that is used to scramble the CRC is also referred to as a scramble identifier.

Modification Example of the Fourth Embodiment

Next, a modification example of the fourth embodiment is described. According to the modification example of the fourth embodiment, the base station device 1 transmits the information relating to the first configuration and/or the information relating to the second configuration to the terminal device 2. Furthermore, the base station device 1 adds the cyclic redundancy check (CRC) parity bit(s) that is scrambled by the first identifier or the CRC parity bit that is scrambled by the second identifier, to the downlink control information (DCI) format, and transmits a result of the addition to the terminal device 2 on the physical downlink control channel (PDCCH or the EPDCCH). In a case where either of the first configuration and the second configuration is set, when it is assumed that the CRC that is attached to the DCI format is scrambled using the first identifier (a first RNTI), the terminal device 2 sets the transmission power based on the parameter relating to the first uplink power control. Furthermore, when it is assumed that the CRC that is attached to the DCI format is scrambled using the second identifier (a second RNTI), the terminal device 2 sets the transmission power based on the parameter relating to the second uplink power control. In a case where the both of the first configuration and the second configuration are set, the terminal device 2 sets the first subframe set and the second subframe set. Furthermore, when it is assumed that, in the uplink subframe that belongs to the first subframe set, the CRC which is attached to the DCI format indicating that the uplink signal is transmitted is scrambled using the first identifier, the terminal device 2 sets the transmission power based on the parameter relating to the first uplink power control. Furthermore, when it is assumed that, in the uplink subframe that belongs to the second subframe set, it is assumed that the CRC which is attached to the DCI format indicating that the uplink signal is transmitted is scrambled using the first identifier, the terminal device 2 sets the transmission power based on the parameter relating to the third uplink power control. Furthermore, when it is assumed that, in the uplink subframe that belongs to the first subframe set, it is assumed that the CRC which is attached to the DCI format indicating that the uplink signal is transmitted is scrambled using the second identifier, the terminal device 2 sets the transmission power based on the parameter relating to the second uplink power control. Furthermore, when it is assumed that, in the uplink subframe that belongs to the second subframe set, it is assumed that the CRC which is attached to the DCI format indicating that the uplink signal is transmitted is scrambled using the second identifier, the terminal device 2 sets the transmission power based on the parameter relating to the second uplink power control. Moreover, the first identifier may be the C-RNTI. The second identifier may be the temporary C-RNTI. At this point, as illustrated above, the DCI format to which the CRC parity bit is attached and which is scrambled by the temporary C-RNTI is used for the contention-based random access procedure. Furthermore, the first identifier may be a first C-RNTI, and the second identifier may be a second C-RNTI. Moreover, each of the power parameters that are used for the first uplink power control and the third uplink power control include cell-specific parameter (the parameter that is included in the shared information (or the system information)) and/or the UE-specific parameter (the parameter that is included in the dedicated information). The power parameter that is used for the second uplink power control includes only the cell-specific parameter.

Moreover, in a case where, in the second subframe set, the accumulation by the TPC command is possible, the second TPC command may be included in the DCI format to which the CRC that is scrambled using a specific identifier is attached.

To be more precise, according to the modification example of the fourth embodiment, in a case where either of the first configuration and the second configuration is set, when the transmission of the uplink signal is indicated by the first DCI format, the terminal device 2 sets the transmission power for the uplink signal based on the parameter relating to the first uplink power control. In a case where both of the first configuration and the second configuration are set, the terminal device 2 can configure the first subframe set and the second subframe set. Furthermore, when the transmission of the uplink signal is indicated by the first DCI format for the uplink subframe that belongs to the first subframe set, the terminal device 2 sets the transmission power for the uplink signal based on the parameter relating to the first uplink power control. Furthermore, when the transmission of the uplink signal is indicated by the first DCI format for the uplink subframe that belongs to the second subframe set, the terminal device 2 sets the transmission power for the uplink signal based on the parameter relating to the second uplink power control.

For example, in some cases, in the re-transmission of the PUSCH for the same uplink data (the transport block), the CRC that is attached to the DCI format that indicates the re-transmission on the PUSCH is scheduled using the C-RNTI, and is scheduled using the temporary C-RNTI. In a case where the CRC is scheduled using the C-RNTI, in the uplink subframe that belongs to the first subframe set, the transmission power for the PUSCH may be set based on the parameter relating to the first uplink power control, and in the uplink subframe that belongs to the second subframe set, the transmission power for the PUSCH may be set based on the parameter relating to the second uplink power control. In a case where the CRC is scheduled using the temporary C-RNTI, in the uplink subframe that belongs to the first subframe set and the uplink subframe that belongs to the second subframe set, the transmission power for the PUSCH may be set based on the parameter relating to the same uplink power control (for example, the third uplink power control).

Furthermore, in a case where the DCI format that indicates the re-transmission is detected, the terminal device 2 may set the transmission power for the uplink signal that is re-transmitted, based on the same uplink power control method, without depending on the subframe set.

In a case where an instruction to transmit the uplink signal (for example, the PUSCH) is given by the PDCCH (the EPDCCH) that includes the DCI format to which the CRC scrambled with the C-RNTI is attached (in a case where the resource for the uplink signal is allocated), when it is assumed that the transmission of the uplink signal is on the uplink subframe that belongs to the first subframe set, the transmission power for the uplink signal is set based on the parameter relating to the first uplink power control. Furthermore, when it is assumed that the transmission of the uplink signal is on the uplink subframe that belongs to the second subframe set, the transmission power for the uplink signal is set based on the parameter relating to the second uplink power control. At this time, in a case where transmission of a different uplink signal (for example, the SRS) is indicated, the transmission power for the different uplink signal is set based on the parameter relating to the same uplink power control as with the transmission power for the uplink signal. Furthermore, in a case where the instruction to transmit the uplink signal (for example, the PUSCH) is given by the PDCCH (the EPDCCH) that includes the DCI format to which the CRC scrambled with the temporary C-RNTI is attached, when it is assumed that the transmission of the uplink signal is on the uplink subframe that belongs to the first subframe set, the transmission power for the uplink signal is set based on the parameter relating to the third uplink power control. Furthermore, when it is assumed that the transmission of the uplink signal is on the uplink subframe that belongs to the second subframe set, the transmission power for the uplink signal is set based on the parameter relating to the third uplink power control.

If multiple conditions are satisfied, the terminal device 2 can switch between a case where the transmission power for the uplink signal on multiple subframe sets is set based on the parameter relating to common uplink power control and a case where the transmission power for the uplink signal on multiple subframe sets is set based on the parameter relating to independent uplink power control.

The terminal device 2 can switch the parameter (a set of parameters) relating to the uplink power control for a specific identifier, depending on whether the first configuration and/or the second configuration are set, and sets the transmission power, for a different identifier, based on a predetermined parameter relating to the uplink power control, without depending on whether the first configuration and/or the second configuration are set.

In the case where both of the first configuration and the second configuration are set, when it is assumed that the transmission of the uplink signal that is accompanied by the C-RNTI, with the uplink subframe that belongs to the first subframe set, the terminal device 2 sets the transmission power for the uplink signal based on the first uplink power control method. Furthermore, with the uplink subframe that belongs to the second subframe set, the terminal device 2 sets the transmission power for the uplink signal based on the second uplink power control method. When it is assumed that the transmission of the uplink signal that is accompanied by the temporary C-RNTI is performed, the transmission power for the uplink signal may be set based on the common power control method, regardless of the first subframe set or the second subframe set.

Fifth Embodiment

Next, a fifth embodiment is described. According to the fifth embodiment, the base station device 1 transmits the information relating to the first configuration, the information relating to the second configuration, and the downlink control information (DCI) format to the terminal device 2. For example, in a case where the first configuration or the second configuration is set, when the DCI format 0/4 and the DCI format 3/3A are detected in the same subframe, the terminal device 2 sets the transmission power for the uplink signal using a value of the transmit power control (TPC) format that is set to the DCI format 0/4, and transmits the uplink signal to the base station device 1. Furthermore, in a case where the first configuration and the second configuration are set, when the DCI format 0/4 and the DCI format 3/3A are detected in the same subframe, if the uplink subframe in which the uplink signal is scheduled by the DCI format 0/4 is the fixed subframe (the first subframe), the terminal device 2 sets the transmission power for the uplink signal using the power control adjustment value that is obtained by the transmit power control (TPC) command which is provided in the DCI format 0/4. Furthermore, if the uplink subframe in which the uplink signal is scheduled by the DCI format 0/4 is the flexible subframe (the second subframe), the terminal device 2 sets the transmission power for the uplink signal that corresponds to each DCI format, using independently the power control adjustment value that is obtained from the transmit power control (TPC) command which is prescribed in the DCI format 0/4, and the DCI format 3/3A. For example, the terminal device 2 may drop the DCI format 3/3A in a case where the DCI format 0/4 and the DCI format 3/3A are detected in the same subframe, and the uplink subframe in which the uplink signal is scheduled by the DCI format 0/4 is the fixed subframe (the first subframe). Moreover, the DCI format 0/4 is used for scheduling the PUSCH for one uplink cell. Furthermore, the DCI format 3/3A is used for transferring (notifying) the TPC command for the PUSCH or the PUSCH. The first subframe may be configured from the first subframe set. The second subframe may be configured from the second subframe set. To be more precise, multiple subframes may be configured from the first subframe set or the second subframe set. At this point, the DCI format 0/4 may indicate the DCI format 0 or the DCI format 4. Furthermore, the DCI format 3/3A may indicate the DCI format 3 or the DCI format 3A.

In a case where the first configuration and the second configuration are set, the terminal device 2 can determine whether or not the TPC command that is set to be in the DCI format 3/3A which is detected in the same subframe is applied, depending on which subframe the DCI format 0/4 is scheduled for. That is, the terminal device 2 can determine whether or not the TPC command that is set to be in the DCI format 3/3A which is detected in the same subframe is applied (can switch processing on the DCI format 3/3A), based on whether the transmission of the uplink signal in the fixed subframe is scheduled using the DCI format 0/4 or the transmission of the uplink signal in the flexible subframe is scheduled. That is, the terminal device 2 can determine whether or not the TPC command that is set to be in the DCI format 3/3A which is detected in the same subframe is applied, depending on whether the first transmit power control method (the first uplink power control method) is performed or the second transmit power control method (the second uplink power control method) is performed. For example, the terminal device 2 does not apply the TPC command that is set to be in the DCI format 3/3A, in a case where the DCI format 0/4 and the DCI format 3/3A are detected in the same subframe and the first transmit power control method is performed base on the DCI format 0/4. That is, only the first transmit power control method is performed based on the DCI format 0/4. Furthermore, the terminal device 2 apples the TPC command that is set to be in the DCI format 3/3A, in a case where the DCI format 0/4 and the DCI format 3/3A are detected in the same subframe and the second transmit power control method is performed base on the DCI format 0/4. That is, the terminal device 2 performs the first transmit power control method based on the TPC command that is set to be in the DCI format 3/3A. That is, terminal device 2 performs the second transmit power control method based on the DCI format 0/4 and performs the first transmit power control method based on the DCI format 3/3A.

In other words, in the first transmit power control method, the transmission power for the uplink signal is set using the TPC command that is set to be in the DCI format 0/4 and the DCI format 3/3A, and in the second transmit power control method, the transmission power for the uplink signal is set using the TPC command that is set to be in the DCI format 0/4.

In a case where the TPC command is set in multiple DCI formats, suitable transmit power control can be performed by setting the priority level.

The subframe set and The TPC command that is set to be in the DCI format may be linked to each other.

Moreover, according to each of the embodiment described above, the reception processing may include detection processing (detection). Furthermore, the reception processing may include demodulation processing (demodulation). Furthermore, the reception processing may include decoding processing (decode, decoding).

Moreover, according to each of the embodiments described above, for example, in a radio frame that is configured from 10 subframes, the subframe set may refer to a group of specific subframes. As one example, the first subframe set may be configured from #0, #1, #2, #5, #6, and #7 subframes, and the second subframe set may be configured from #3, #4, #8, and #9 subframes. These subframe sets may be configured based on specific information.

According to each of the embodiments described above, the base station device 1 transmits information relating to the setting of a subframe, which is for configuring a subframe set, to the terminal device 2. Furthermore, the base station device 1 transmits the information relating to the uplink power control to the terminal device 2. The terminal device 2 configures two subframe sets based on the information relating to the setting of the subframe. Furthermore, based on the information relating to the uplink power control, the terminal device 2 performs the first uplink power control, in a case where the uplink signal is transmitted on the uplink subframe in the first subframe set, and performs the second uplink power control in a case where the uplink signal is transmitted on the uplink subframe in the second subframe set.

According to each of the embodiments described above, the base station device 1 may transmit the information relating to the setting of the subframe for configuring the subframe set, to the terminal device 2. Furthermore, the base station device 1 transmits the information relating to the uplink power control to the terminal device 2. The terminal device 2 configures two subframe sets based on the setting of the subframe. Furthermore, based on the parameter relating to the uplink power control, the terminal device 2 sets the first uplink power, in a case where the uplink signal is transmitted on the uplink subframe that belongs to the first subframe set, and sets the second uplink power in a case where the uplink signal is transmitted on the uplink subframe that belongs to the second subframe set.

According to each of the embodiments described above, the parameters relating to the power control include at least one parameter. In other words, at least one or more parameters are included. To be more precise, the parameter relating to the power control may mean a set of parameters relating to the power control.

According to each of the embodiments described above, the terminal device 2 may configure the first subframe set and the second subframe set, based on the first configuration and the second configuration. At this point, in the first configuration and the second configuration, the first subframe set is a set of subframes in which the same subframes that are the same types of subframes (an uplink subframe and an uplink subframe, a downlink subframe and a downlink subframe, and a special subframe and a special subframe) are set. In the first configuration and the second configuration, the second subframe set is a set of subframes in which the same subframes that are different types of subframes (a downlink subframe and an uplink subframe, a downlink subframe and a special subframe, and an uplink subframe and a special subframe) are set. For example, the first configuration and the second configuration may be set based on the TDD UL/DL configuration.

According to each of the embodiments described above, in the case where both of the first configuration and the second configuration are set, terminal device 2 may set a subframe (an uplink subframe) on which an uplink signal is transmitted, based on the information relating to the first configuration, and may set a subframe (a downlink subframe) on which a downlink signal is received, based on the second configuration. At this point, in a case where a subframe that is set as an uplink subframe based on the first configuration and a subframe that is set as a downlink subframe based on the second configuration are the same, that is, in a case where both of the uplink subframe and the downlink subframe are set as the same subframe, in some cases, such a subframe is referred to as a flexible subframe. In a case where an uplink signal is transmitted on the flexible subframe, the transmit power control for the transmission of the uplink signal may be performed independently of a different uplink subframe.

Moreover, in addition to the setting method described above, in a case where the first subframe set and the second subframe set are configured based on the information relating to the first configuration and the information relating to the second configuration, the setting may be performed in a such a manner that information relating to the TDD UL/DL configuration is included in one of the information relating to the first configuration and the information relating to the second configuration, and information that indicates the flexible subframe or information that indicates the fixed subframe is included in the other. Moreover, the information indicating the fixed subframe is information indicating a subframe that is not processed as the flexible subframe, in the information relating to the first configuration. Furthermore, the information relating to the fixed subframe may be information that indicates a specific type of subframe.

Moreover, in a case where the first configuration and the second configuration are the same (or indicate the same configuration), multiple subframe sets may not be configured.

Moreover, the terminal device 2 may set or define, in advance, priority levels of the physical channel/physical signal that are transmitted according to a type of physical channel.

Moreover, according to each of the embodiments described above, the terminal device 2 may report to the base station device 1 a result of measurement of the received power, which is based on a second downlink reference signal. The terminal device 2 may perform the reporting periodically. Furthermore, the terminal device 2 may perform the reporting in a case where a certain condition is satisfied.

Moreover, according to each of the embodiments described above, in a case where received power that is based on the second downlink reference signal is measured, the terminal device 2 may perform the transmit power control for the uplink signal based on the received power. Furthermore, the terminal device 2 may determine the downlink path loss based on the received power.

Moreover, according to each of the embodiments described above, in a case where a sum of transmission powers for various uplink signals, which include the transmission powers for the first uplink reference signal and/or the second uplink reference signal, exceeds a maximum transmission power that is set for the terminal device 2, the terminal device 2 may not transmit the first uplink reference signal and/or the second uplink reference signal.

Moreover, a combination of the embodiments may be realized. For example, the first modification example of the first embodiment and the third modification example of the first embodiment may be combined. The first modification example of the second embodiment and the third modification example of the second embodiment may be combined.

Moreover, according to each of the embodiments described above, the subframe on which the uplink signal is actually transmitted and/or the subframe on which the downlink signal is actually received may be set based on the information (for example, information relating to a third configuration) that is set independently of the information relating to the first configuration and the information relating to the second configuration.

Moreover, according to each of the embodiments described above, the information relating to the first configuration and/or the information relating to the second configuration may be notified with the system information block type 1 (SIB 1) or the RRC message. Furthermore, the information relating to the first configuration and the information relating to the second configuration may be notified with the same SIB 1 or the RRC message.

Moreover, according to each of the embodiments described above, the information relating to the first configuration and the information relating to the second configuration may be set for the same RRC message, the same system information or the same information element. Furthermore, the information relating to the first configuration and the information relating to the second configuration may be set for a different RRC message, different system information, or a different information element. Furthermore, the information relating to the first configuration and the information relating to the second configuration are set independently as different parameters.

At this point, according to each of the embodiments described above, in a case where the information relating to the first configuration is the TDD UL/DL configuration that is notified with the system information block type 1 (SIB 1) or the RRC message, the information relating to the second configuration may be an additional TDD UL/DL configuration (the second TDD UL/DL configuration).

Furthermore, the information relating to the second configuration may information (flexible subframe pattern) that indicates the flexible subframe.

Furthermore, the information relating to the second configuration may be information (fixed subframe pattern) that indicates the fixed subframe.

Furthermore, the information relating to the second configuration may be information relating to Release 12 (r12) or a version 12 (v12).

Furthermore, the information relating to the second configuration may be information that indicates a subframe pattern which corresponds to the first subframe set described above.

Furthermore, the information relating to the second configuration may be information that indicates a subframe pattern which corresponds to the second subframe set described above.

Furthermore, the information relating to the second configuration may be information that indicates a subframe pattern to which the PDCCH/EPDCCH (the DCI format) which is accompanied by the TPC command for the flexible subframe is allocable.

Furthermore, the information relating to the second configuration may be information that indicates a pattern of a subframe on which the CRS is receivable.

Furthermore, the information relating to the second configuration may be information that indicates a pattern of a subframe on which the CSI-RS is receivable.

Furthermore, the information relating to the second configuration is information that indicates a pattern (set) of a subframe on which the reporting of the channel state information (the CSI, the CQI, the PMI, or the RI) is possible.

Furthermore, the information relating to the second configuration may be information that indicates a pattern of a subframe for limiting measurement in the time domain for measurement (received power RSRP, reception quality RSRQ, and radio link monitoring) in a primary cell. To be more precise, the information relating to the second configuration may be information that indicates a pattern of a subframe for performing measurement.

Furthermore, the information relating to the second configuration may be information that indicates a pattern of a subframe for limiting the measurement in the time domain for measurement in a neighboring cell.

Furthermore, the information relating to the second configuration may be information that indicates a pattern of a subframe for limiting the measurement in the time domain for measurement in the secondary cell.

Furthermore, the information relating to the second configuration may be set based on a measurement subframe pattern.

Furthermore, the information relating to the second configuration may be information that indicates a pattern of a subframe on which the downlink signal is receivable.

Furthermore, the information relating to the second configuration may be information that is addable.

Furthermore, the information relating to the first configuration may be information relating to whether or not the physical uplink control channel is transmitted in the second cell (the secondary cell).

Furthermore, the information relating to the second configuration may be information that indicates a pattern (set) of a subframe that is associated with the reporting of certain channel state information.

Furthermore, the information relating to the second configuration may be information that is different from the information relating to the second configuration and that is set separately from the information that indicates the pattern (set) of the subframe that is associated with the reporting of channel state information. To be more precise, the third configuration and a fourth configuration may be set separately from the second configuration, and either of the third configuration and the fourth configuration may be information that indicates a pattern (set) of a subframe in the same manner as the second configuration. To be more precise, the third configuration and the fourth configuration may be set separately from the second configuration, and either of the third configuration and the fourth configuration may be information that is set separately from the information that indicates a pattern (set) of the subframe that is associated with the reporting of a certain channel state information. Furthermore, such reporting may be on the channel state information that is calculated based on a CSI-RS, a zero power CSI-RS, and/or a CSI-IM resource, which is included in the associated subframe pattern (set). The same may also be applied to all the configurations up to and containing the n-th configuration, which are described above. Furthermore, multiple second configurations described above may be set, and the switching between the first uplink power control and the second uplink power control may be performed based on any one of the multiple second configurations. That is, the information relating to the second configuration may be the additional TDD UL/DL configuration (the second TDD UL/DL configuration). For the second configuration, information may be set that indicates a pattern (set) of a subframe which is associated with the reporting of a certain channel state information. Moreover, the information relating to the setting of the second configuration may be determined in a manner that is peculiarly in the system. Furthermore, the second configuration may be broadcast as the shared information or the system information. Furthermore, the second configuration may be notified individually, as UE-specific dedicated information, to every terminal device 2. Information (UE capability) indicating whether or not the second configuration can be set may be notified from the terminal device 2 to the base station device 1.

At this point, the information relating to the first configuration and/or the information relating to the second configuration may be set in a bitmap manner. A bitmap may be configured from 40 bits or 80 bits.

At this point, for the information relating to the first configuration and/or the information relating to the second configuration, a configuration that includes an uplink subframe, a downlink subframe, and a special subframe may be designated with an index (or an information bit or a sequence of bits that indicates an index) based on a table. For example, the table may the TDD UL/DL configuration. A table showing the TDD UL/DL configuration may be configured as illustrated in FIG. 3.

Moreover, according to each of the embodiments described above, the information relating to the second configuration may be the additional TDD UL/DL configuration (the second TDD UL/DL configuration). Furthermore, the information relating to the second configuration may be information that indicates the flexible subframe. Furthermore, the information relating to the second configuration may information (a flexible subframe pattern) that indicates the flexible subframe. Furthermore, the information relating to the second configuration may be information (a fixed subframe pattern) that indicates the fixed subframe. At this time, although an uplink reference UL-DL configuration and a downlink reference UL-DL configuration are calculated from the information relating to the first configuration and the information relating to the second configuration, this does not matter. In other words, in addition to the information relating to the first configuration and the information relating to the second configuration, the uplink reference UL-DL configuration and the downlink reference UL-DL configuration may be determined using a table or the like as the third configuration.

Moreover, according to each of the embodiments described above, the base station device 1 and the terminal device 2 may set one of the information relating to the first configuration and the information relating to the second configuration as the uplink reference UL-DL configuration, and set the other as the downlink reference UL-DL configuration. For example, the terminal device 2 may receive two configuration, that is, the information relating to the first configuration and the information relating to the second configuration, and then may set the two configurations for the uplink reference UL-DL configuration and the downlink reference UL-DL configuration. Moreover, the DCI format (for example, the DCI format 0/4) relating to the uplink may be transmitted on the downlink subframe that is set with the uplink reference UL-DL configuration.

Furthermore, each of the uplink reference UL-DL configuration and the downlink reference UL-DL configuration may be set using the same table. However, in a case where indexes for the uplink reference UL-DL configuration and the downlink reference UL-DL configuration are set based on the same table, it is preferable that the uplink reference UL-DL configuration and the downlink reference UL-DL configuration are set with different indexes. To be more precise, it is preferable that the uplink reference UL-DL configuration and the downlink reference UL-DL configuration are set with different subframe patterns.

According to each of the embodiments described above, both of the first configuration and the second configuration are indicated with the TDD UL/DL configuration, according to a condition, one may be set as the uplink reference UL-DL configuration, and the other may be set as the downlink reference UL-DL configuration. Moreover, the uplink reference UL-DL configuration may be used to determine a correspondence between a subframe in which at least a physical downlink control channel is arranged and a subframe in which a physical uplink shared channel to which the physical downlink control channel described above corresponds is arranged, and although the direction (to be more precise, uplink or downlink) in which a signal is actually transmitted is different, this does not matter. The downlink reference UL-DL configuration may be used to determine a correspondence between a subframe in which at least a physical downlink shared channel is arranged and a subframe on which a HARQ-ACK corresponding to the physical downlink shared channel described above is transmitted, and although the direction (to be more precise, uplink or downlink) in which a signal is actually transmitted is different, this does not matter. That is, the uplink reference UL-DL configuration is used to specify (select or determine) a correspondence between a subframe n in which the PDCCH/EPDCCH/PHICH is arranged and a subframe n+k in which the PUSCH to which the PDCCH/EPDCCH/PHICH described above corresponds is arranged. In a case where one primary cell is set, or in a case where one primary cell or one secondary cell is set and the uplink reference UL-DL configuration that corresponds to the primary cell and the uplink reference UL-DL configuration that corresponds to the secondary cell are the same, each of the two serving cells, the corresponding uplink reference UL-DL configuration is used to determine a correspondence between a subframe in which the PDCCH/EPDCCH/PHICH is arranged and a subframe in which the PUSCH to which the PDCCH/EPDCCH/PHICH described above corresponds is arranged. Furthermore, the downlink reference UL-DL configuration is used to specify (select or determine) a correspondence between a subframe n in which the PDSCH is arranged and a subframe n+k on which the HARQ-ACK corresponding to the PDSCH described above is transmitted. In the case where one primary cell is set, or in a case where one primary cell and one secondary cell are set and the downlink reference UL-DL configuration that corresponds to the primary cell and the downlink reference UL-DL configuration that corresponds to the secondary cell are the same, each of the two serving cells, the corresponding downlink reference UL-DL configuration is used to specify (select or determine) a correspondence between the subframe n in which the PDSCH is arranged and the subframe n+k on which the HARQ-ACK corresponding to the PDSCH described above is transmitted.

Furthermore, when a TDD UL/DL configuration (a first TDD UL/DL configuration) for an uplink transmission reference and a TDD UL/DL configuration (the second TDD UL/DL configuration) for a downlink transmission reference are set, and the information relating to the uplink transmit power control is set, in a case where the same type of subframe is set with the first TDD UL/DL configuration and the second TDD UL/DL configuration, the terminal device 2 sets the uplink power control for the subframe based on the parameter relating to the first power control. Furthermore, in a case where different types of subframes are set with the first TDD UL/DL configuration and the second TDD UL/DL configuration, the terminal device 2 sets the uplink power for the subframe based on the parameter relating to the second transmit power control.

In a case where as the information relating to the second configuration, the second TDD UL/DL configuration (for example, tdd-Config-v12, tdd-Config-r12, tdd-ConfigUL-reference-v12, or tdd-ConfigDLrefence-r12) is set/added as parameters, the terminal device 2 may transmit the uplink signal based on the first TDD UL/DL configuration, and may receive the downlink signal based on the second TDD UL/DL configuration. In a certain subframe, in a case where the transmission of the uplink signal and the transmission of the downlink signal occur, either may be preferentially determined based on transmission direction setting information (information relating to the third configuration).

Moreover, according to each of the embodiments described above, the first configuration and/or the second configuration may be the TDD UL/DL configuration (TDD configuration, tdd-Config, or uplink-downlink configuration(s)). Furthermore, the first configuration and/or the second configuration may be a subframe pattern that is indicated by a bitmap. Furthermore, one of the information relating to the first configuration and the information relating to the second configuration may be information that indicates the uplink subframe, and the other may be information that indicates the downlink subframe. These pieces of indication information may be defined using a table, and may be defined in a bitmap manner.

Moreover, the base station device 1 may instruct the terminal device 2 to which the information relating to the first configuration and the information relating to the second configuration can be notified, as to the uplink subframe, with one of the information relating to the first configuration and the information relating to the second configuration, and as to the downlink subframe, with the other. Furthermore, in a case where only either of the first configuration and the second configuration is set, the terminal device 2 recognizes a subframe other than the subframe that is indicated, as a different type of subframe and performs transmission and reception processing. For example, in a case where the uplink subframe is indicated with the information relating to the first configuration, and the downlink subframe is indicated with the information relating to the second configuration, the terminal device 2 in which only the first configuration is set recognizes a subframe other than the uplink subframe that is indicated based on the first configuration, as the downlink subframe or the special subframe, and performs the reception processing/transmission processing. The terminal device 2 in which only the second configuration is set recognizes a subframe other than the downlink subframe that is indicated with the second configuration, as the uplink subframe or the special subframe, based on the first configuration, and performs the transmission processing/reception processing. Moreover, with the first configuration and the second configuration, the uplink subframe and the downlink subframe may be set for the same subframe.

For example, in a case where the first configuration and the second configuration are set, the terminal device 2 may perform the transmission of the uplink signal based on the first configuration, and may perform the reception of the downlink signal based on the second configuration. Furthermore, in the case where the first configuration and the second configuration are set, the terminal device 2 may perform the reception of the downlink signal based on the first configuration, and may perform the transmission of the uplink signal based on the second configuration. Which configuration the performing of the transmission of the uplink signal and the reception of the downlink signal is based on may be determined based on the third configuration.

At this point, when the information relating to the first configuration is defined as the TDD UL/DL configuration, the information relating to the second configuration may be information that indicates the flexible subframe. Moreover, the information relating to the second configuration may be managed using a table. Furthermore, the information relating to the second configuration may be information that indicates the subframe that is set as the flexible subframe by a bitmap.

Moreover, according to each of the embodiments described above, the flexible subframe is a subframe that is an uplink subframe and a downlink subframe. Furthermore, the flexible subframe is a subframe that is a downlink subframe and a special subframe. Furthermore, the flexible subframe is a subframe that is an uplink subframe and a special subframe. To be more precise, the flexible subframe is a subframe that is the first subframe and the second subframe. For example, furthermore, a subframe that is set as the flexible subframe is processed as the first subframe (for example, the uplink subframe) in the case of condition 1, and is processed as the second subframe (for example, the downlink subframe) in the case of condition 2.

Moreover, the flexible subframe may be set based on the first configuration and the second configuration. For example, in a case where a certain subframe i is set as the uplink subframe with the first configuration and is set as the downlink subframe with the second configuration, the subframe i is the flexible subframe. The flexible subframe may be set based on information that indicates a subframe pattern of the flexible subframe.

Furthermore, according to each of the embodiment described above, the first configuration and the second configuration may not be two TDD UL/DL configurations, and may be one TDD UL/DL configuration and a flexible subframe pattern (a downlink candidate subframe pattern, an uplink candidate subframe pattern, or an additional subframe). In a subframe index that is indicated with the flexible subframe pattern, although it is indicated with the TDD UL/DL configuration that the uplink subframe is present, if the uplink signal is not transmitted on that subframe, the terminal device 2 can receive the downlink signal. Furthermore, although it is indicated with the TDD UL/DL configuration that the downlink subframe is present, if it is indicated in advance that the uplink signal is transmitted on that subframe, the terminal device 2 can transmit the uplink signal. A specific subframe may be indicated as a subframe for an uplink/downlink candidate.

When both of the information relating to the first configuration and the information relating to the second configuration are set, based on a certain condition, the terminal device 2 may recognize one as a subframe set for the uplink and may recognize the other as a subframe set for the downlink. At this point, the subframe set for the uplink is a set of subframes that are set for the transmission of the PUSCH and the PHICH, and the subframe set for the downlink is a set of subframes that are set for the transmission on the PDSCH and the HARQ. Information indicating a subframe relationship between the PUSCH and the PHICH and information indicating a subframe relationship between the PDSCH and the HARQ may be set in advance for the terminal device 2. To be more precise, one of the information relating to the first configuration and the information relating to the second configuration may be information that indicates a subframe pattern of the uplink subframe and the other may be information that indicates a subframe pattern of the downlink subframe. These pieces of information may be set in a bitmap manner.

Moreover, according to each of the embodiments described above, in a case where multiple subframe sets are configured, for every subframe set, it may be whether or not the accumulation of the TPC command is enabled. For example, with the first subframe set, the accumulation of the TPC command may be enabled, and with the second subframe set, the accumulation of the TPC command may not be enabled. In other words, in a case where the uplink signal is transmitted on the uplink subframe that belongs to the first subframe, the transmission power for the uplink signal is set based on the power control adjustment value that is obtained by accumulating the correction value which corresponds to a value that is set to be in the TPC command field. In a case where the uplink signal is transmitted on the uplink subframe that belongs to the second subframe set, the transmission power for the uplink signal is set based on the power control adjustment value that is obtained from an absolute value which corresponds to the value that is set to be in the TPC command field. At this point, the transmit power control in a case where the accumulation of the TPC command is enabled may be also referred to as accumulation transmit power control. The transmit power control in a case where the accumulation of the TPC command is not enabled may be also referred to as absolute transmit power control.

With the accumulation transmit power control, the transmission power is set considering the power control adjustment value obtained by the previously received TPC command. Furthermore, with the absolute transmit power control, the transmission power is set considering only the power control adjustment value obtained by a single TPC command, without considering the power control adjustment value obtained by the previously received TPC command.

Moreover, according to each of the embodiment described above, the power control may include a power control method, a power control procedure, a power control process, and the like. To be more precise, the first uplink power control may include a first uplink power control method, a first uplink power control procedure, and the like.

Moreover, according to each of the embodiment described above, multiple subframe sets may be set for one serving cell (the primary cell, the secondary cell, the carrier frequency, the transmission frequency, or the component carrier). There may be a cell for which multiple subframe sets are configured and a cell for which multiple subframe sets are not configured.

Moreover, according to each of the embodiments described above, in a case where the first configuration and the second configuration are set and thus two or more subframe sets are independently configured, the maximum transmission power ($P_{CMAX}$, and $P_{CMAX,\ c}$), which is set for every terminal device 2, may be set for each of the subframe sets. To be more precise, the terminal device 2 may set multiple transmission powers independently. To be more precise, multiple maximum transmission powers ($P_{CMAX}$, and $P_{CMAX,\ c}$) may be set for one serving cell. Furthermore, multiple maximum allowed output powers ($P_{EMAX,\ c}$) may be set for one serving cell.

Furthermore, in a case where resource allocation for various uplink signals is the same, the base station device 1 can detect the various uplink signals using a difference in a signal sequence between each of the uplink signals. To be more precise, the base station device 1 can identify each of the uplink signals using the difference in the signal sequence between the received uplink signals. Furthermore, the base station device 1 can determine whether or not the transmission is destined for the base station device 1 itself, using the difference in the signal sequence between the received uplink signals.

Moreover, in a case where, with the second downlink reference signal, the base station device 1 instructs the terminal device 2 to measure the received power, the terminal device 2 may calculate the downlink path loss based on a result of the measurement and may use the calculated the downlink path loss for the uplink transmit power control.

In some cases, the received power measurement here is referred to as reference signal received power (RSRP) measurement or reception signal power measurement. Furthermore, in some cases, the reception quality measurement is referred to as reference signal received quality (RSRQ) measurement or reception signal quality measurement.

Furthermore, the resource allocation (mapping to resource elements or mapping to physical resources) to the second downlink reference signal may be frequency-shifted. The frequency shift of the second downlink reference signal may be determined based on the physical cell ID. Furthermore, the frequency shift of the second downlink reference signal may be determined based on the virtual cell ID.

As one example, the base station device 1 notifies the terminal device 2 of information indicating whether or not the received power measurement of the second downlink reference signal is performed. In a case where the indication information indicates that the received power measurement of the second downlink reference signal can be performed, the terminal device 2 performs the received power measurement of the second downlink reference signal. At this time, the terminal device 2 may perform the received power measurement of the first downlink reference signal in a parallel manner. In a case where the indication information indicates that the received power measurement of the second downlink reference signal cannot be performed, the terminal device 2 performs only the received power measurement of the first downlink reference signal. Moreover, information indicating whether or not the received quality measurement of the second downlink reference signal is performed may be included in the indication information. Furthermore, the received power measurement of a third downlink reference signal may be performed without depending on the indication information.

Furthermore, as another example, the base station device 1 notifies the terminal device 2 of information indicating whether the received power measurement of the first downlink reference signal is performed or the received power measurement of the second downlink reference signal is performed. In a case where the indication information indicates that the received power measurement of the first downlink reference signal is performed, the terminal device 2 performs the received power measurement of the first downlink reference signal. In a case where the indication information indicates that the received power measurement of the second downlink reference signal is performed, the terminal device 2 performs the received power measurement of the second downlink reference signal. To be more precise, the indication information is information indicating switching of the received power measurement. Furthermore, the information indicating whether or not the received quality measurement is performed may be included in the indication information. In this example, the indication information is described as information that indicates the switching between the received power measurements of two downlink reference signals, but may be information that indicates the switching among the received power measurements of three or more downlink reference signals. Furthermore, the received power measurement of the third downlink reference signal may be performed without depending on the indication information. Furthermore, the transmission power for the second downlink reference signal and/or the transmission power for the third downlink reference signal may be set based on the transmission power for the first downlink reference signal. For example, a power ratio (the power offset) between the first downlink reference signal and the second downlink reference signal (or the third downlink reference signal) may be set.

In a case of the downlink, for the downlink subframe that belongs to the first subframe set, the received power measurement of the downlink signal may be performed without considering the power offset, and for the downlink subframe that belongs to the second subframe set, the received power measurement of the downlink signal may be performed considering the power offset. The power offset may be notified in advance from the base station device 1. Furthermore, the power offset may be notified in the DCI format relating to the downlink.

Moreover, according to each of the embodiments described above, even in a case where the first configuration and the second configuration are set, if multiple subframe sets are not configured, the accumulation/absolute transmit power control may be common.

Moreover, according to each of the embodiment described above, in a case where specific information is not notified to the terminal device 2, although multiple subframe sets are configured, the accumulation/absolute transmit power control may be common to the subframe sets.

Moreover, according to each of the embodiments described above, in the terminal device 2, for the flexible subframe, the power control (the uplink power control, or the downlink power control) may be performed differently than with the uplink subframe/downlink subframe/special subframe that is not set as the flexible subframe. Furthermore, for the flexible subframe and the uplink subframe/downlink subframe/special subframe, closed-loop transmit power control (the accumulation transmit power control) may be performed independently. For example, for that subframe, power may be controlled using a parameter that is different from that in a case of a different uplink subframe or downlink subframe. Furthermore, for the flexible subframe and the uplink subframe/downlink subframe, a parameter that is used for generating a signal may be set independently. For example, a virtual cell ID, a scramble ID, or the like may be set independently. At this point, the generating of the signal includes generating a signal sequence. Furthermore, the generating of the signal includes determining the radio resource that is allocated to the signal.

Moreover, according to each of the embodiments described above, the first subframe set may be configured from subframes each of which is a small interference source (to be more precise, causes a small amount of interference, or causes low interference) for the terminal device 2. The second subframe set may be configured from subframes each of which is a large interference source (to be more precise, causes a large amount of interference, or causes high interference) for the terminal device 2. At this point, the subframe that is a small interference source is a subframe that is not set to be the same subframe which is used as the downlink subframe and the uplink subframe. Furthermore, the subframe that is a large interference source is a subframe that is set to be the same subframe which is used as the downlink subframe and the uplink subframe.

Moreover, according to each of the embodiment described above, the same RSRP and path loss value may be applied as the parameter relating to the first uplink power control and the parameter relating to the second uplink power control. The received power measurement control may be shared among the downlink subframes that belong to two subframe sets.

Moreover, according to each of the embodiments described above, in a case where the PUSCH and the PUCCH are transmitted on the flexible subframe, if a sum of these transmission powers exceeds the maximum transmission power that is set for the terminal device 2, a maximum value of the transmission power for the PUSCH may be a value that results from subtracting the transmission power for the PUCCH from the maximum transmission power.

Moreover, according to each of embodiments described above, there may be parameters that are commonly used between the parameter sets relating to multiple types of uplink power control. To be more precise, some of the parameters may be common to the parameters relating to the multiple types of uplink power control. For example, parameters that are set only for a set of parameters relating to the first uplink power control can be used as a set of parameter relating to the second uplink power control or a set of parameter relating to the third uplink power control, whenever necessary.

Furthermore, according to each of the embodiments described above, the base station device 1 may control the terminal device 2 in such a manner that the uplink signal is transmitted on the subframe in which the uplink subframe and the downlink subframe collide with each other and on the subframe in which the uplink subframe and the downlink subframe do not collide with each other, using an uplink index.

With the two subframe sets, the accumulation control may be shared. The accumulation may be common without depending on the subframe set.

Moreover, according to each of the embodiments described above, the TPC command (TPC command for (scheduled) PUSCH) for the PUSCH that is used as one of the parameters relating to the first uplink power control may be set to be in the DCI format 0/4 or the DCI format 3/3A, and the TPC command for the PUSCH that is used as one of the parameters relating to the second uplink power control is notified in the DCI format 0/4. Furthermore, the TPC command (TPC command for PUCCH) for the PUCCH that is used as one of the parameters relating to the first uplink power control is notified in the DCI format 1/1A/1B/1D/2/2A/2B/2C/2D/3/3A, and the TPC command for the PUCCH that is used as one of the parameters relating to the second power control is notified, for example, in the DCI format 1/1A/1B/1D/2/2A/2B/2C/2D. For example, it is possible to decide, depending on to which subframe subset an uplink signal to be applied belongs, whether a detected TPC command will be applied to the first uplink power control or the second uplink power control. The accumulation control may be performed independently in a case where the power control adjustment value that is obtained by the TPC command that is included in the DCI format 0 corresponds to the uplink subframe that belongs to the first subframe set, and a case where the power control adjustment value that is obtained by the TPC command that is included in the DCI format 0 corresponds to the uplink subframe that belongs to the second subframe set. For example, in a case where the DCI format 0 and the DCI format 3 are detected in the same subframe, when it is assumed that the DCI format 0 schedules the uplink signal for the uplink subframe which belongs to the first subframe set, the terminal device 2 sets uplink power based on the power control adjustment value that is obtained by the TPC command that is included in the DCI format 0. Furthermore, when it assumed that the DCI format 0 schedules the uplink signal for the uplink subframe which belongs to the second subframe set, the terminal device 2 sets the uplink power based on the power control adjustment value that is obtained by the TPC command that is included in the DCI format and sets the transmission power for the uplink signal that corresponds to the uplink subframe which belongs to the first subframe set, based on the power control adjustment value that is obtained by the TPC command which is included in the DCI format 3. To be more precise, the first configuration and the second configuration are set, the subframe set and the DIC format may be associated with each other.

With the two subframe sets, a result of RSRP measurement may be shared. The RSRP may be common without depending on the subframe set.

Furthermore, the accumulation control may be performed independently with the subframe set. The accumulation by the TPC command that is received in the fixed subframe and the accumulation by the TPC command that is received on the flexible subframe are controlled independently.

For example, in the case where the first configuration and the second configuration are set, the accumulation transmit power control (the closed-loop transmit power control) may be performed independently for every subframe set.

In a case where the accumulation transmit power control is performed for every subframe set, the timing at which the DCI format that includes each TPC command field is received may be defined in advance.

Furthermore, the result of RSRP measurement may be independent with the subframe set. The measurement of the RSRP by the CRS that is received on the downlink subframe that is the fixed subframe and of the RSRP by the CRS that is received on the flexible subframe may be performed independently.

In a case where the two subframe sets are configured based on the first configuration and the second configuration, when it is assumed that the second subframe set is the subframe pattern of the flexible subframe, the information relating to the second configuration may be information that indicates the pattern of the subframe on which it is possible to receive the DCI format that includes the TPC command field for the flexible subframe.

Each of the pattern of the subframe on which the TPC command that is applicable to the uplink subframe which belongs to the first subframe set is transmitted and the pattern of the subframe on which the TPC command that is applicable to the uplink subframe which belongs to the second subframe set is transmitted may be set separately. Correspondence (linkage) between an uplink subframe and a downlink subframe on which the DCI format that includes the TPC command for the uplink subframe is transmitted may be managed using a table.

Moreover, according to each of the embodiments described above, the information relating to the first configuration and/or the information relating to the second configuration may be information that indicates a switching period of the uplink and the downlink and a configuration of each subframe.

Moreover, according to each of the embodiments described above, for the uplink signal and/or the downlink signal, the transmit power control may be performed in the flexible subframe and a subframe other than the flexible subframe.

Moreover, according to each of the embodiments described above, in the case where the first configuration is set, the terminal device 2 may not transmit the first uplink reference signal (for example, the P-SRS) to a cell (a serving cell) for which the first configuration is set. Furthermore, according to each of the embodiments described above, in the case where the first configuration is set, the terminal device 2 may not transmit the uplink reference signal for which a peculiar transmission subframe is set by the higher layer.

Moreover, according to each of the embodiments described above, the resource element or the resource block is described as being used as a mapping unit for various uplink signals or downlink signals and the symbol, the symbol, the subframe, or the radio frame is described as being used as a transmission unit for the time direction, but limitation to this is not imposed. Even if, instead of these, domain and time units are used that are configured from an arbitrary frequency and time, respectively, the same effect can be obtained. Moreover, according to each of the embodiments described above, the case where the demodulation is performed using the RS that is processed in a precoded manner is described, and for description, a port that is equivalent to a MIMO layer is used as a port corresponding to the RS that is processed in a precoded manner, but limitation to this is not imposed. In addition, the same effect can be obtained by applying the present invention to ports that correspond to different reference signals, respectively. For example, the unprecoded (non-precoded) RS can be used instead of the precoded RS, and a port that is equivalent to an output terminal after the precoding processing, or a port that is equivalent to a physical antenna (or a combination of antennas) can be used.

Moreover, according to each of the embodiment described above, in a case where only the DCI format 3/3A is received on a certain downlink subframe, the correction value (or the absolute value) that corresponds to a value that is set to be in the TPC command field which is included in the DCI format 3/3A is applied to the power control adjustment value for the transmission power for the PUSCH that is transmitted on a specific subframe set, without depending on which subframe set the downlink subframe belongs to. In a case where only the DCI format 3/3A is received on a certain downlink subframe, the accumulation of the TPC command that is included in the DCI format 3/3A may be applied to the power control adjustment value that is used for the transmission power for the PUSCH which is transmitted on a specific subframe set. Moreover, the specific subframe set may be a set of fixed subframes, may be a set of flexible subframes, and may be a set of arbitrary subframes.

Moreover, according to each of the embodiments described above, the parameter relating to the uplink power control is parameter that is used for the transmit power control for the uplink physical channel/physical signal (the PUSCH, the PUCCH, the PRACH, the SRS, the DMRS, or the like), and the parameters that are included in the transmit power control includes information that relates to the switching between or (re-)setting of various parameters that are used for the setting of the transmission power for various uplink physical channels. Furthermore, a parameter relating to the downlink transmit power control is a parameter that is used for the transmit power control for the downlink physical channel/physical signal (the CRS, the UERS (DL DMRS), the CSI-RS, the PDSCH, the PDCCH/EPDCCH, the PBCH, the PSS/SSS, the PMCH, the PRS, or the like), and the parameters that are used for the transmit power control include information that relates to the switching between or (re-)setting of various parameters that are used for the setting of the transmission power for various downlink physical channels.

Moreover, according to each of the embodiments described above, the base station device 1 may possibly set multiple virtual cell IDs for one terminal device 2. For example, the base station device 1 and a network that include at least one base station device 1 may possibly set the virtual cell ID independently for every physical channel/physical signal. Furthermore, multiple virtual cell IDs may possibly be set for one physical channel/physical signal. To be more precise, the virtual cell ID may possibly be set each time each of the physical channel/physical signal is set. Furthermore, with the multiple physical channels/physical signals, the virtual cell ID may be shared.

According to the present invention, the uplink power has been described so far, but the downlink power may also be applied in the same manner.

According to the present invention, the uplink power control has been described so far, but downlink channel estimation control may also be controlled in the same manner. Furthermore, according to the present invention, the uplink power control has been described so far, but the present invention may be applied to control of channel state information reporting. According to the present invention, the uplink power control has been described so far, but the present invention may be applied to control of the received power measurement.

Moreover, according to each of the embodiments described above, for example, the setting of the power includes setting a value of power, the calculating of the power includes calculating the value of the power, the measuring includes measuring the value of the power, and the reporting of the power includes reporting the value of the power. In this manner, the term power also includes a value of suitable power.

Moreover, according to each of the embodiments described above, for example, the calculating of the path loss includes calculating a value of the path loss. In this manner, the term path loss also includes a value of a suitable path loss.

Moreover, according to each of the embodiments described above, the setting of various parameters includes setting values of various parameters. In this manner, the expression various parameter also means values of various suitable parameters.

A program running on the base station device 1 and the terminal device 2 according to the present invention is a program (a program for causing a computer to operate) that controls a CPU and the like in such a manner as to realize the function according to the embodiments of the present invention. Then, pieces of information that are handled in these devices are temporarily stored in a RAM while being processed. Thereafter, the pieces of information are stored in various ROMs or HDDs, and whenever necessary, is read by the CPU to be modified or written. As a recording medium on which to store the program, among a semiconductor medium (for example, a ROM, a nonvolatile memory card, and the like), an optical storage medium (for example, a DVD, an MO, an MD, a CD, a BD, and the like), a magnetic storage medium (for example, a magnetic tape, a flexible disk, and the like), and the like, any one may be possible. Furthermore, in some cases, the functions according to the embodiments described above are realized by executing the loaded program, and in addition, the functions according to the present invention are realized by performing processing in conjunction with an operating system or other application programs, based on an instruction from the program.

Furthermore, in a case where programs are distributed on the market, the programs, each of which is stored on a portable recording medium, can be distributed, or the program can be transmitted to a server computer that is connected through a network such as the Internet. In this case, a storage device of the server computer is also included in the present invention. Furthermore, some or all portions of the base station device 1 and the terminal device 2 according to the embodiments described above may be realized as an LSI that is a typical integrated circuit. Each functional block of the base station device 1 and the terminal device 2 may be individually built into a chip, and some or all functional blocks may be integrated into a chip. Furthermore, a technique of the integrated circuit is not limited to an LSI, and an integrated circuit for the functional block may be realized as a dedicated circuit or a general-purpose processor. Furthermore, if with advances in a semiconductor technology, a circuit integration technology with which an LSI is replaced appears, it is also possible to use an integrated circuit to which such a technology is applied.

The embodiments of the invention are described in detail above referring to the drawings, but the specific configuration is not limited to the embodiments and includes an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which a constituent element that achieves the same effect is substituted for the one that is described according to each of the embodiments is also included in the technical scope of the present invention.

Moreover, the invention in the present application is not limited to the embodiments described above. Furthermore, application of the terminal device according to the disclosure in the present application is not limited to the mobile station. It goes without saying that the terminal device can be applied to a stationary-type electronic apparatus that is installed indoors or outdoors, or a non-movable-type electronic apparatus, for example, an AV apparatus, a kitchen apparatus, a cleaning or washing machine, an air-conditioning apparatus, office equipment, a vending machine, and other household apparatuses.

Furthermore, the present invention is suitable for use in a wireless base station device, a wireless terminal device, a wireless communication system, or a wireless communication method.

Wrap-Up

At least the following descriptions are also provided in the present specification.

(1) The present invention is made in view of the problems described above, and therefore according to an aspect of the present invention, there is provided a terminal device that communicates with a base station device, the terminal device including: a reception unit that receives information relating to a first configuration, information relating to a second configuration, and a downlink control information (DCI) format; and a transmission unit that transmits an uplink signal to the base station device in a case where the uplink signal is scheduled based on the DCI format, in which, in a case where both of the first configuration and the second configuration are set, the transmission unit sets transmission power for the uplink signal that is transmitted on an uplink subframe (a first subframe) which belongs to a first subframe set, based on a power control adjustment value that is obtained by a transmit power control (TPC) command which is included in a DCI format (a first DCI format) that is used for the scheduling of the uplink signal or a DCI format (a second DCI format) that is used for transfer of the TPC command, and sets the transmission power for the uplink signal that is transmitted on an uplink subframe (a second subframe) which belongs to a second subframe set, based on the power control adjustment value that is obtained by the TPC command which is included in the first DCI format.

(2) Furthermore, according to the aspect of the present invention, in the terminal device, when the first DCI format and the second DCI format are detected in the same subframe in the reception unit, in a case where the first DCI format schedules the uplink signal for the first subframe, the transmission unit sets the transmission power for the uplink signal, based on the power control adjustment value that is obtained by the TPC command which is included in the first DCI format, and in a case where the first DCI format schedules the uplink signal for the second subframe, the transmission unit sets the transmission power for the uplink signal based on the power control adjustment value that is obtained by the TPC command that is included in the first DCI format, and independently sets the transmission power based on the power control adjustment value that is obtained by the TPC command which is included in the second DCI format.

(3) Furthermore, according to the aspect of the present invention, in the terminal device, when only the second DCI format is detected in the reception unit, the transmission unit applies the power control adjustment value that is obtained by the TPC command which is included in the second DCI format, to the transmission power for the uplink signal that is transmitted on the second subframe, without depending on a subframe in which the second DCI format is detected.

(4) Furthermore, according to another aspect of the present invention, there is provided a communication method for use in a terminal device that performs communication with a base station device, the method including: a step of receiving information relating to a first configuration, information relating to a second configuration, and a downlink control information (DCI) format; and a step of transmitting an uplink signal to the base station device in a case where the uplink signal is scheduled based on the DCI format, in which, the step of transmitting the uplink signal includes a step of setting transmission power for the uplink signal that is transmitted on an uplink subframe (a first subframe) which belongs to a first subframe set, based on a transmit power control (TPC) command which is included in a DCI format (a first DCI format) that is used for the scheduling of the uplink signal or a DCI format (a second DCI format) that is used for the TPC command, and a step of setting the transmission power for the uplink signal that is transmitted on an uplink subframe (a second subframe) which belongs to a second subframe set, based on the TPC command which is included in the first DCI format, in a case where both of the first configuration and the second configuration are set.

(5) Furthermore, according to the aspect of the present invention, the communication method further includes: a step of setting the transmission power for the uplink signal, based on the power control adjustment value that is obtained by the TPC command which is included in the first DCI format, in a case where the first DCI format schedules the uplink signal for the first subframe, when the first DCI format and the second DCI format are detected in the same subframe; and a step of setting the transmission power for the uplink signal based on the power control adjustment value that is obtained by the TPC command which is included in the first DCI format, and independently setting the transmission power based on the power control adjustment value that is obtained by the TPC command which is included in the second DCI format, in a case where the first DCI format schedules the uplink signal for the second subframe, when the first DCI format and the second DCI format are detected in the same subframe.

(6) Furthermore, according to the aspect of the present invention, the communication method further includes: a step of applying the power control adjustment value that is obtained by the TPC command which is included in the second DCI format, to the transmission power for the uplink signal that is transmitted on the second subframe, without depending on a subframe in which the second DCI format is detected, when only the second DCI format is detected.

(7) Furthermore, according to still another aspect of the present invention, there is provided an integrated circuit which is built in a terminal device that performs communication with a base station device, and which causes the terminal device to perform: a function of receiving information relating to a first configuration, information relating to a second configuration, and a downlink control information (DCI) format; and a function of transmitting an uplink signal to the base station device in a case where the uplink signal is scheduled based on the DCI format, in which, the function of transmitting the uplink signal includes a function of setting transmission power for the uplink signal that is transmitted on an uplink subframe (a first subframe) which belongs to a first subframe set, based on a power control adjustment value that is obtained by a transmit power control (TPC) command which is included in a DCI format (a first DCI format) that is used for the scheduling of the uplink signal or a DCI format (a second DCI format) that is used for transfer of the TPC command, and a function of setting the transmission power for the uplink signal that is transmitted on an uplink subframe (a second subframe) which belongs to a second subframe set, based on the power control adjustment value that is obtained by the TPC command which is included in the first DCI format, in a case where both of the first configuration and the second configuration are set.

(8) Furthermore, according to the aspect of the present invention, the integrated circuit, causes the terminal device to further perform a function of setting the transmission power for the uplink signal, based on the power control adjustment value that is obtained by the TPC command which is included in the first DCI format, in a case where the first DCI format schedules the uplink signal for the first subframe, when the first DCI format and the second DCI format are detected in the same subframe; and a function of setting the transmission power for the uplink signal based on the power control adjustment value that is obtained by the TPC command which is included in the first DCI format, and independently setting the transmission power based on the power control adjustment value that is obtained by the TPC command which is included in the second DCI format, in a case where the first DCI format schedules the uplink signal for the second subframe, when the first DCI format and the second DCI format are detected in the same subframe.

(9) Furthermore, according to the aspect of the present invention, the integrated circuit causes the terminal device to further perform a function of applying the power control adjustment value that is obtained by the TPC command which is included in the second DCI format, to the transmission power for the uplink signal that is transmitted on the second subframe, without depending on a subframe in which the second DCI format is detected, when only the second DCI format is detected.

Accordingly, the terminal device can perform suitable transmit power control.

REFERENCE SIGNS LIST

1 BASE STATION DEVICE
2 TERMINAL DEVICE
101 HIGHER LAYER PROCESSING UNIT
103 CONTROL UNIT
105 RECEPTION UNIT
107 TRANSMISSION UNIT
109 CHANNEL MEASUREMENT UNIT
111 TRANSMIT AND RECEIVE ANTENNA
1051 DECODING UNIT
1053 DEMODULATION UNIT
1055 DEMULTIPLEXING UNIT
1057 RADIO RECEPTION UNIT
1071 CODING UNIT
1073 MODULATION UNIT
1075 MULTIPLEXING UNIT
1077 RADIO TRANSMISSION UNIT
1079 DOWNLINK REFERENCE SIGNAL GENERATION UNIT
201 HIGHER LAYER PROCESSING UNIT
203 CONTROL UNIT
205 RECEPTION UNIT
207 TRANSMISSION UNIT
209 CHANNEL MEASUREMENT UNIT
211 TRANSMIT AND RECEIVE ANTENNA
2051 DECODING UNIT
2053 DEMODULATION UNIT
2055 DEMULTIPLEXING UNIT
2057 RADIO RECEPTION UNIT
2071 CODING UNIT
2073 MODULATION UNIT
2075 MULTIPLEXING UNIT
2077 RADIO TRANSMISSION UNIT
2079 UPLINK REFERENCE SIGNAL GENERATION UNIT

The invention claimed is:

1. A terminal device that performs communication with a base station device, the terminal device comprising:
a reception unit that receives information relating to a first configuration, information relating to a second configuration, and a downlink control information (DCI) format; and
a transmission unit that transmits an uplink signal to the base station device in a case where the uplink signal is scheduled based on the DCI format,
wherein, in a case where both of the first configuration and the second configuration are set, the transmission unit
sets transmission power for the uplink signal that is transmitted on an uplink subframe (a first subframe) which belongs to a first subframe set, based on a power control adjustment value that is obtained by a transmit power control (TPC) command which is included in a DCI format (a first DCI format) that is used for the scheduling of the uplink signal or a DCI format (a second DCI format) that is used for transfer of the TPC command, and
sets the transmission power for the uplink signal that is transmitted on an uplink subframe (a second subframe) which belongs to a second subframe set, based on the power control adjustment value that is obtained by the TPC command which is included in the first DCI format.

2. The terminal device according to claim 1,
wherein, when the first DCI format and the second DCI format are detected in the same subframe in the reception unit,
in a case where the first DCI format schedules the uplink signal for the first subframe, the transmission unit sets the transmission power for the uplink signal, based on the power control adjustment value that is obtained by the TPC command which is included in the first DCI format, and
in a case where the first DCI format schedules the uplink signal for the second subframe, the transmission unit sets the transmission power for the uplink signal based on the TPC command that is included in the first DCI format, and independently sets the transmission power based on the power control adjustment value that is obtained by the TPC command which is included in the second DCI format.

3. The terminal device according to claim 1 or 2,
wherein, when only the second DCI format is detected in the reception unit, the transmission unit applies the power control adjustment value that is obtained by the TPC command which is included in the second DCI format, to the transmission power for the uplink signal that is transmitted on the second subframe, without depending on a subframe in which the second DCI format is detected.

4. A communication method for use in a terminal device that performs communication with a base station device, the method comprising:
a step of receiving information relating to a first configuration, information relating to a second configuration, and a downlink control information (DCI) format; and
a step of transmitting an uplink signal to the base station device in a case where the uplink signal is scheduled based on the DCI format,
wherein, in a case where both of the first configuration and the second configuration are set, the step of transmitting the uplink signal includes
a step of setting transmission power for the uplink signal that is transmitted on an uplink subframe (a first subframe) which belongs to a first subframe set, based on a power control adjustment value that is obtained by a transmit power control (TPC) command which is included in a DCI format (a first DCI format) that is used for the scheduling of the uplink signal or a DCI format (a second DCI format) that is used for transfer of the transmit power control (TPC) command, and
a step of setting the transmission power for the uplink signal that is transmitted on an uplink subframe (a second subframe) which belongs to a second subframe set, based on the power control adjustment value that is obtained by the TPC command which is included in the first DCI format.

5. The communication method according to claim 4, further comprising:
   a step of setting the transmission power for the uplink signal, based on the power control adjustment value that is obtained by the TPC command which is included in the first DCI format, in a case where the first DCI format schedules the uplink signal for the first subframe, when the first DCI format and the second DCI format are detected in the same subframe; and
   a step of setting the transmission power for the uplink signal based on the power control adjustment value that is obtained by the TPC command which is included in the first DCI format, and independently setting the transmission power based on the power control adjustment value that is obtained by the TPC command which is included in the second DCI format, in a case where the first DCI format schedules the uplink signal for the second subframe, when the first DCI format and the second DCI format are detected in the same subframe.

6. The communication method according to claim 4, further comprising:
   a step of applying the power control adjustment value that is obtained by the TPC command which is included in the second DCI format, to the transmission power for the uplink signal that is transmitted on the second subframe, without depending on a subframe in which the second DCI format is detected, when only the second DCI format is detected.

7. An integrated circuit which is built in a terminal device that performs communication with a base station device, and which causes the terminal device to perform:
   a function of receiving information relating to a first configuration, information relating to a second configuration, and a downlink control information (DCI) format; and
   a function of transmitting an uplink signal to the base station device in a case where the uplink signal is scheduled based on the DCI format,
   wherein, in a case where both of the first configuration and the second configuration are set, the function of transmitting the uplink signal includes
      a function of setting transmission power for the uplink signal that is transmitted on an uplink subframe (a first subframe) which belongs to a first subframe set, based on a power control adjustment value that is obtained by a transmit power control (TPC) command which is included in a DCI format (a first DCI format) that is used for the scheduling of the uplink signal or a DCI format (a second DCI format) that is used for transfer of the transmit power control (TPC) command, and
      a function of setting the transmission power for the uplink signal that is transmitted on an uplink subframe (a second subframe) which belongs to a second subframe set, based on the power control adjustment value that is obtained by the TPC command which is included in the first DCI format.

8. The integrated circuit according to claim 7, which causes the terminal device to further perform:
   a function of setting the transmission power for the uplink signal, based on the power control adjustment value that is obtained by the TPC command which is included in the first DCI format, in a case where the first DCI format schedules the uplink signal for the first subframe, when the first DCI format and the second DCI format are detected in the same subframe; and
   a function of setting the transmission power for the uplink signal based on the power control adjustment value that is obtained by the TPC command which is included in the first DCI format, and independently setting the transmission power based on the TPC command which is included in the second DCI format, in a case where the first DCI format schedules the uplink signal for the second subframe, when the first DCI format and the second DCI format are detected in the same subframe.

9. The integrated circuit according to claim 7, which causes the terminal device to further perform:
   a function of applying the power control adjustment value that is obtained by the TPC command which is included in the second DCI format, to the transmission power for the uplink signal that is transmitted on the second subframe, without depending on a subframe in which the second DCI format is detected, when only the second DCI format is detected.

* * * * *